United States Patent

Sato et al.

[11] Patent Number: 5,948,317
[45] Date of Patent: Sep. 7, 1999

[54] LIQUID CRYSTAL COMPOSITION, LIQUID CRYSTAL DEVICE USING THE COMPOSITION, LIQUID CRYSTAL APPARATUS AND DISPLAY METHOD

[75] Inventors: Koichi Sato, Atsugi; Hiroyuki Kitayama, Isehara; Kenji Shinjo, Atsugi; Shinichi Nakamura, Isehara; Katsutoshi Nakamura, Hiratsuka, all of Japan

[73] Assignee: Canon Kabushiki Kaisha, Tokyo, Japan

[21] Appl. No.: 08/971,163

[22] Filed: Nov. 14, 1997

Related U.S. Application Data

[63] Continuation of application No. 08/421,928, Apr. 14, 1995, abandoned.

[30] Foreign Application Priority Data

| Apr. 14, 1994 | [JP] | Japan | 6-075931 |
| Jul. 26, 1994 | [JP] | Japan | 6-174178 |

[51] Int. Cl.$^6$ .................................................. C09K 19/34
[52] U.S. Cl. ........................... 252/299.61; 252/299.01; 252/299.4; 252/299.67
[58] Field of Search .......................... 252/299.01, 299.4, 252/299.61, 299.67

[56] References Cited

U.S. PATENT DOCUMENTS

| 4,367,924 | 1/1983 | Clark et al. ............................ 350/334 |
| 4,798,680 | 1/1989 | Nohira et al. ...................... 252/299.01 |
| 4,876,027 | 10/1989 | Yoshinaga et al. ................ 252/299.65 |
| 4,879,059 | 11/1989 | Hanyu et al. ........................ 252/299.4 |
| 5,051,527 | 9/1991 | Suzuki et al. .................. 252/299.67 X |
| 5,082,587 | 1/1992 | Janulis .............................. 252/299.01 |
| 5,098,600 | 3/1992 | Nakamura et al. ................ 252/299.61 |
| 5,206,751 | 4/1993 | Escher et al. .................. 252/299.01 X |
| 5,231,528 | 7/1993 | Escher et al. ........................... 359/104 |
| 5,240,637 | 8/1993 | Shinjo et al. ...................... 252/299.61 |
| 5,244,595 | 9/1993 | Yamada et al. .................... 252/299.61 |
| 5,250,217 | 10/1993 | Shinjo et al. ...................... 252/299.61 |
| 5,262,082 | 11/1993 | Janulis et al. ...................... 252/299.01 |
| 5,310,499 | 5/1994 | Scherowsky et al. ............. 252/299.61 |
| 5,368,771 | 11/1994 | Namekawa et al. ................. 252/299.1 |
| 5,384,070 | 1/1995 | Hemmerling et al. ............. 252/299.61 |
| 5,385,692 | 1/1995 | Iwaki et al. ........................ 252/299.62 |

FOREIGN PATENT DOCUMENTS

| 0360521 | 3/1990 | European Pat. Off. . |
| 0392432 | 10/1990 | European Pat. Off. . |
| 0 404 081 | 12/1990 | European Pat. Off. . |
| 0625513 | 11/1994 | European Pat. Off. . |
| 56-107216 | 8/1981 | Japan . |
| 2091065 | 3/1990 | Japan . |
| 3151371 | 6/1991 | Japan . |
| 4364176 | 12/1992 | Japan . |
| 5230051 | 9/1993 | Japan . |
| 5310725 | 11/1993 | Japan . |
| 6145158 | 5/1994 | Japan . |
| 93/22396 | 11/1993 | WIPO . |

OTHER PUBLICATIONS

M. Schadt and W. Helfrich, Voltage–Dependent Optical Activity of a Twisted Nematic Liquid Crystal, Feb. 15, 1971, pp. 127–128, Applied Physics Letters, vol. 18, No. 4.

A.D. L. Chandani et al., Tristable Switching in Surface Stabilized Ferroelectric Liquid Crystals with a Large Spontaneous Polarization, May 1988, pp. L729–L732, Japanese Journal of Applied Physics, V. 27, No. 5.

*Primary Examiner*—Richard D. Lovering
*Attorney, Agent, or Firm*—Fitzpatrick, Cella, Harper & Scinto

[57] ABSTRACT

A liquid crystal composition includes at least one fluorine-containing mesomorphic compound (a) having a fluorocarbon terminal portion and a hydrocarbon terminal portion, and at least one optically active compound (b) having an optically active cyclic group and a terminal alkyl group free from a perfluorocarbon atom. The compound (a) and the compound (b) are mutually soluble readily to form a homogeneous liquid crystal composition. The liquid crystal composition shows a layer structure of so-called bookshelf or a layer structure having a small inclination angle (closer to bookshelf structure). The liquid crystal composition is useful in improving response characteristics and display characteristics, particularly a contrast ratio, of a liquid crystal device using the liquid crystal composition.

24 Claims, 4 Drawing Sheets

LIQUID CRYSTAL COMPOSITION, LIQUID CRYSTAL DEVICE USING THE COMPOSITION, LIQUID CRYSTAL APPARATUS AND DISPLAY METHOD

This application is a continuation of application Ser. No. 08/421,928, filed Apr. 14, 1995, now abandoned.

FIELD OF THE INVENTION AND RELATED ART

The present invention relates to a liquid crystal composition, particularly a chiral smectic liquid crystal composition, and a liquid crystal device using the liquid crystal composition, including a light-valve for use in flat-panel displays, projection displays, printers, etc. The present invention also relates to a liquid crystal apparatus using the device particularly as a display device, and a display method of using the composition.

There has been known a cathode ray tube (CRT) as a display device. The CRT has widely been used as a display terminal for outputting motion pictures of a television receiver or a video tape recording (VTR) apparatus or used as a monitor for a personal computer. However, the CRT encounters problems when outputs still images, in view of its characteristics, such that visibility or observability is liable to be lowered by, e.g., scanning fringe due to flicker or insufficient resolution and that degradation or deterioration of a fluorescent substance due to a surface memory is caused to occur in some cases. In recent years, it has been found that an electromagnetic wave generated by the CRT adversely affects the human body. As a result, the CRT can break the health of video display terminal (VDT) operators in some cases. In addition, the CRT has a structure including a large volume behind a picture area (display portion), whereby space-saving utilization of an office or a house in which the CRT is used is hindered.

Liquid crystal devices have been used as a display device having solved the above-mentioned problems of the CRT. For instance, there have been known liquid crystal devices using use TN (twisted nematic) type liquid crystals, as shown in "Voltage-Dependent Optical Activity of a Twisted Nematic Liquid Crystal" by M. Schadt and W. Helfrich "Applied Physics Letters" Vol. 18, No. 4 (Feb. 15, 1971) pp. 127–128.

One of the above-mentioned TN-type liquid crystal devices is a simple matrix-type liquid crystal device having the advantage of inexpensive production costs. When the liquid crystal device is driven by using an electrode matrix structure with an improved pixel density in accordance with a multiplex driving scheme, the liquid crystal device is liable to encounter a problem of occurrence of crosstalk, so that the number of pixels is restricted. Further, the uses of the device as a display device is also limited since the response speed is too slow, i.e., on the order of at least several milli-seconds.

In recent years, there have been proposed liquid crystal devices using a thin film transistor (TFT). These liquid crystal devices can control a display state pixel by pixel since each pixel is provided with a transistor, whereby the devices solve problems of crosstalk and response speed. However, as these devices have a larger picture area, it is industrially more difficult to prepare a liquid crystal device with no defective pixels. Even if it is possible to prepare such a liquid crystal device, the device is more expensive.

To overcome the above-mentioned drawbacks of such conventional liquid crystal devices, the use of liquid crystal devices using a liquid crystal material having bistability has been proposed by Clark and Lagerwall (e.g. Japanese Laid-Open Patent Appln. (JP-A) No. 56-107216; U.S. Pat. No. 4,367,924, etc.). In this instance, as the liquid crystal material having bistability, a ferroelectric liquid crystal having chiral smectic C-phase (SmC*) or H-phase (SmH*) is generally used. The ferroelectric liquid crystal can effect inversion switching due to its spontaneous polarization, thus showing a very high response speed. Further, the ferroelectric liquid crystal shows bistable states (bistability) having a memory characteristic and is excellent in view angle characteristics, so that a liquid crystal device using a ferroelectric liquid crystal is considered suitable for a display device or light-valve having properties including high-speed responsiveness, high resolution and a large picture area. In recent years, there has been proposed an anti-ferroelectric chiral smectic liquid crystal device using three stable states, as described in "Japanese Journal of Applied Physics" vol. 27, p. L729 (1988) by Chanani and Takezoe et al.

Such a liquid crystal device using a chiral smectic liquid crystal, however, encounters a problem such that a contrast ratio is lowered by occurrence of a zig-zag alignment defect in some cases, as described in "Structures and Properties of Ferroelectric Liquid Crystals" (1990) by Atsuo Fukuda and Hideo Takezoe issued by Corona Publishing Co. Ltd. (Tokyo Japan). The reason why the zigzag defect occurs may be attributable to the fact that a layer of a chiral smectic liquid crystal disposed between a pair of substrates constituting a cell structure includes two kinds of chevron layer structures.

On the other hand there has been the recent trend in layer structure of a (chiral smectic) liquid crystal wherein a high contrast ratio is intended to be realized by suppressing a chevron layer structure resulting in a low contrast ratio and providing the liquid crystal with a bookshelf layer structure (hereinafter referred to as "bookshelf structure") in which boundaries of each liquid crystal layer are disposed in parallel with each other or with a structure closer to the bookshelf structure (e.g., Atsuo Fukuda (Editor)) "Advanced Liquid Crystal Displays and Liquid Crystal Materials (Zisedai Ekisho Display To Ekisho Zairyo)" (1992), issued by K. K. CMC (Tokyo Japan). One of methods for realizing a bookshelf structure is a method of using a naphthalene-based liquid crystal material having a particular structure. In this method, however, the resultant liquid crystal device has a tilt angle of about 10 degrees, which is considerably smaller than an ideal tilt angle of 22.5 degrees providing a maximum transmittance, thus resulting in a low transmittance or a low contrast. In addition, such a liquid crystal material fails to exhibit a bookshelf structure reversibly with respect to temperature in many cases. Another method for giving a bookshelf structure may include one inducing a bookshelf structure by externally applying an electric field to a liquid crystal device. Such a method, however, involves a problem of unstability against external stimuli such as temperature. In addition, various other problems are presumably present in order to put a liquid crystal material exhibiting a bookshelf structure into practical use since such a material has just discovered or proposed.

Further, in recent years, there have been proposed a mesomorphic (liquid crystal) compound having a perfluoroether terminal portion (U.S. Pat. Nos. 5,082,587 and 5,262,082 and Internal Publication No. W093/22396) and a liquid crystal composition (Marc D. Radcliffe et al: The 4th Internal Ferroelectric Liquid Crystal Conference, P-46 (1993)) as materials exhibiting a bookshelf structure or a structure closer thereto. By using these liquid crystal materials, it is possible to provide a bookshelf structure or a structure showing a small layer inclination angle and being closer to the bookshelf structure without using external fields such as an external electric field. These liquid crystal materials also provide the optimum tilt angle.

However, these liquid crystal materials (compounds and compositions) are liable to exhibit poor solubility with other many mesomorphic (liquid crystal) compounds due to its particular denser molecular structure and provide an insufficient response speed in many cases.

Accordingly, there have been desired to provide a chiral smectic (or ferroelectric) liquid crystal device having good switching (driving) characteristics by using a liquid crystal material different from a chiral smectic liquid crystal composition comprising a mesomorphic (liquid crystal) compound exhibit a bookshelf structure of a liquid crystal layer or a structure having a layer inclination angle closer thereto and a chiral dopant (chiral doping substance) having a sufficient solubility with the mesomorphic compound and inducing a large spontaneous polarization in combination, or by using such a chiral smectic liquid crystal composition.

SUMMARY OF THE INVENTION

An object of the present invention is to provide a liquid crystal composition, particularly a chiral smectic liquid crystal composition showing a good alignment state and stably exhibiting a bookshelf structure or a structure, having a small layer inclination angle, closer to the bookshelf structure with respect to a liquid crystal layer structure, thereby to realize a liquid crystal device having improved properties such as high responsiveness, high contrast, high definition and high brightness.

Another object of the present invention is to provide a liquid crystal composition having an excellent mutual solubility between components thereof to stably exhibit the above required characteristics.

Another object of the present invention is to provide a large-area liquid crystal device having the above-mentioned improved properties by using the above liquid crystal composition, a liquid crystal apparatus particularly a liquid crystal display apparatus showing excellent display characteristics by using the above liquid crystal device, and a display method using the above liquid crystal composition or the liquid crystal device.

According to the present invention, there is provided a liquid crystal composition, comprising:

at least one fluorine-containing mesomorphic compound (a) comprising a fluorocarbon terminal portion and a hydrocarbon terminal portion, the terminal portions being connected by a central core, the compound (a) having smectic phase or having latent smectic phase; and at least one optically active compound (b) comprising a cyclic group having at least one asymmetric carbon atom and an unsubstituted or substituted terminal alkyl group free from a perfluorocarbon atom.

The present invention provides a liquid crystal device comprising a pair of electrode plates and the liquid crystal composition described above disposed between the electrode plates.

The present invention further provides a liquid crystal apparatus including the liquid crystal device, particularly including a display panel comprising the liquid crystal device.

The present invention still further provides a display method of using the liquid crystal composition described above and controlling the alignment direction of liquid crystal molecules in accordance with image data to effect display.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
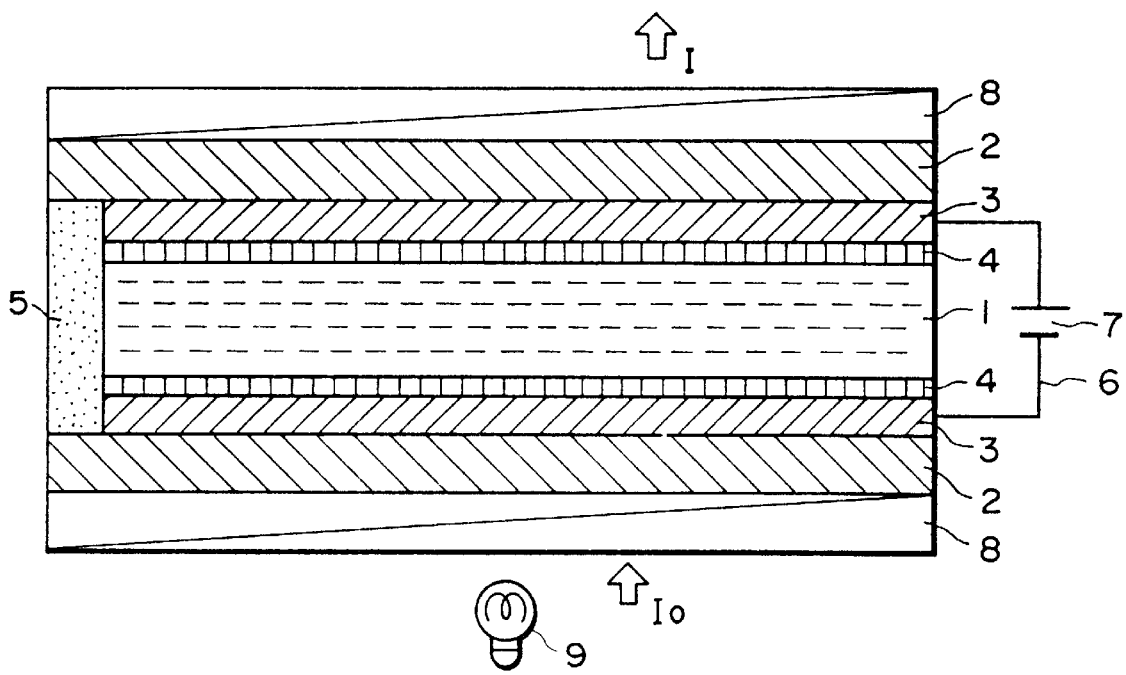
FIG. 1 is a schematic sectional view of a liquid crystal device using a liquid crystal composition according to the present invention.

The liquid crystal composition according to the present invention is characterized by using the fluorine-containing mesomorphic compound (a) and the optically active compound (b) respectively described above in combination.

The liquid crystal composition of the present invention has a good homogeneity (or uniformity) due to an excellent mutual solubility between the compound (a) and the compound (b). The liquid crystal composition may preferably be a chiral smectic liquid crystal composition and more preferably be a ferroelectric liquid crystal composition. When the liquid crystal composition of the present invention is used in a liquid crystal device, a liquid crystal layer can exhibit a bookshelf structure or a structure closer thereto having a small layer inclination angle without using, e.g., an external electric field.

The compound (a) used in the liquid crystal composition of the invention contains a fluorocarbon terminal portion, preferably a terminal perfluoroalkyl group or a terminal perfluoroether group. The compound (a) has a smectic (mesomorphic) phase or a latent smectic (mesomorphic) phase. Herein, the compound (a) having a latent smectic phase means a compound not showing a smectic phase by itself but showing a smectic phase when used together with a compound having a smectic phase or another compound having a latent smectic phase.

On the other hand, the compound (b) used in combination with the compound (a) described above is useful in providing a resultant liquid crystal composition with a chiral smectic phase, i.e., is used as a chiral doping substance or a chiral dopant. The compound (b) has a chiral (optically active) cyclic group and an alkyl group which has not a perfluorocarbon atom. Herein, "perfluorocarbon atom" means all of carbon atoms of an alkyl group in which a terminal chain (e.g., —$CH_3$) is trifluorinated (i.e., —$CF_3$) and an inner chain (e.g., —$CH_2$—) is difluorinated (i.e., —$CF_2$—). Examples of an alkyl group having perfluorocarbon atom may preferably include a perfluoroalkyl group, a perfluoroalkylene group and a perfluoroether group.

Hereinbelow, the fluorine-containing mesomorphic compound (a) will be explained more specifically.

The term "mesomorphic compound" used herein covers not only a compound assuming a mesomorphic (liquid crystal) phase but also a compound not assuming a mesomorphic phase per se as long as a liquid crystal composition containing such a compound assumes a mesomorphic phase.

The mesomorphic compound (a) used in the liquid crystal composition of the invention may preferably have a fluorocarbon terminal portion of the compound (a) is $-DC_xF_{2x+1}$ or $-D(C_{x'}F_{2x'+1}O)_zC_yF_{2y+1}$ in which x is 1–20;

x' is independently 1–10 for each $C_xF_{2x'+1}O$ group;

y is 1–10;

z is 1–10; and

D is a single bond, $-COO-C_rH_{2r}-$, $-OC_rH_{2r}-$, $-OC_rH_{2r}O-C_{r'}H_{2r'}-$, $-OSO_2-$, $-SO_2-$, $-SO_2-C_rH_{2r}-$, $-C_rH_{2r}-N(C_pH_{2p+1})-SO_2-$, or $-C_rH_{2r}-N(C_pH_{2p+1})-CO-$ wherein r and r' are independently 1–20, and p is 0–4.

The mesomorphip compound (a) may more preferably have a fluorocarbon terminal portion of $-D(C_{x40}F_{2x'+1}O)_zC_yF_{2y+1}$ (perfluoroether group) in view of ease of providing a bookshelf structure.

The mesomorphic compound (a) may preferably have a central core containing at least two ring structures capable of having a substituent and at least one linkage. Examples of the ring structures may include aromatic rings; heteroaromatic rings containing at least one heteroatom of N, O or S; alicycles (or cycloaliphatic rings) capable of having one or two non-adjacent $-CH_2-$ groups replaced by O or S; and fused rings of these rings. Examples of the linkage may include a single bond, $-COO-$, $-COS-$, $-HC=N-$ or $-COSe-$.

The mesomorphic compound (a) may preferably be replaced by the following formula (I):

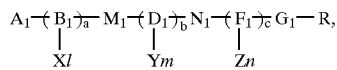

(I)

in which

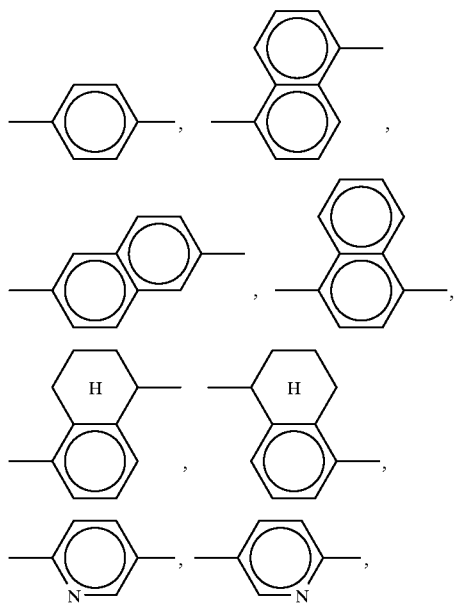

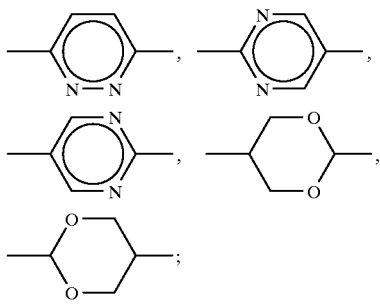

a, b and c independently denote an integer of 0–3 with the proviso that a+b+c is at least 2;

$M_1$ and $N_1$ independently denote $-COO-$, $-OCO-$, $-COS-$, $-SCO-$, $-COSe-$, $-SeCO-$, $-COTe-$, $-TeCO-$, $-CH_2CH_2-$, $-CH=CH-$, $-C\equiv C-$, $-CH=N-$, $-N=CH-$, $-CH_2O-$, $-OCH_2-$, $-CO-$, $-O-$ or a single bond;

X, Y and Z independently denote $-H$, $-Cl$, $-F$, $-Br$, $-I$, $-OH$, $-OCH_3$, $-CN$ or $-NO_2$ and l, m and n independently denote an integer of 0–4;

$G_1$ is $-COO-C_eH_{2e}-$, $-O-C_eH_{2e}-$, $-C_eH_{2e}-$, $-OSOO-$, $-OOSO-$, $-SOO-$, $-SOOC_eH_{2e}-$, $-OC_eH_{2e}-OC_eH_{2e'}-$, $-C_eH_{2e}-N(C_pH_{2p+1})-SO_2-$, $-C_eH_{2e}-N(C_pH_{2p+1})-CO-$ wherein e and e' independently denote an integer of 1–20 and p is an integer of 0–4;

$A_1$ is a linear or branched group represented by $-O-C_fH_{2f}-O-C_gH_{2g+1}$, $-C_fH_{2f}-O-C_gH_{2g+1}$, $-C_fH_{2f}-R'$, $-O-C_fH_{2f}-R'$, $-COO-C_fH_{2f}-R'$, $-OCO-C_fH_{2f}-R'$ wherein R' is $-Cl$, $-F$, $-CF_3$, $-NO_2$, $-CN$, $-H$, $-COO-C_fH_{2f+1}$ or $-OCO-C_fH_{2f+1}$ in which f' is an integer of 1–20, and f and g independently denote an integer of 1–20; and

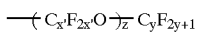

wherein x is an integer of 1–20, x' is independently an integer of 1–10 for each $C_{x'}F_{2x'}O$ group, y is an integer of 1–10, and z is an integer of 1–6.

R in the formula (I) may preferably be

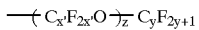

(perfluoroether group) since the group more readily provide the mesomorphic compound (a) with a bookshelf structure.

The mesomorphic compound (a) (preferably having the formula (I)) may be synthesized through processes similar to those descried in U.S. Pat. Nos. 5,082,587 and 5,262,082 and WO93/22936. Examples of the mesomorphic compound (a) of the formula (I) may include those (Example Compound Nos. I-1 to I-93) shown below.

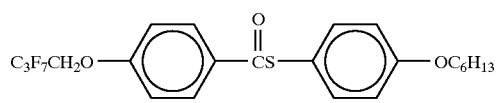 I-1
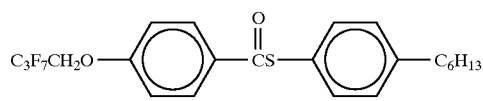 I-2
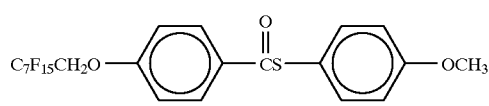 I-3
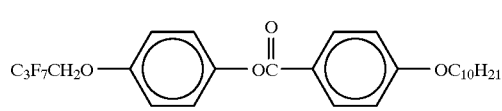 I-4
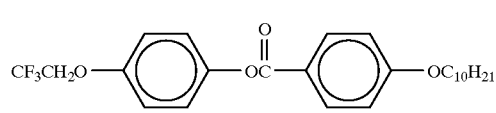 I-5
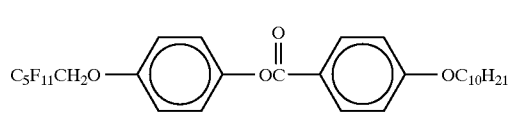 I-6
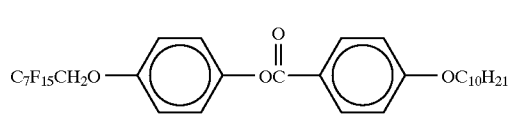 I-7
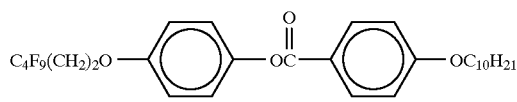 I-8
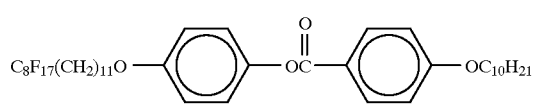 I-9
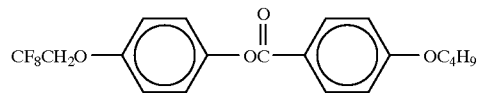 I-10
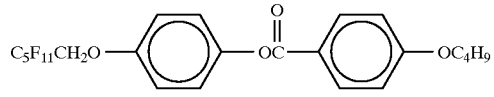 I-11
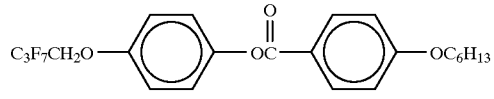 I-12
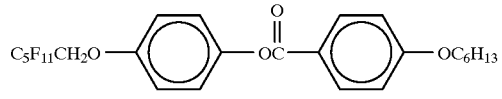 I-13

-continued
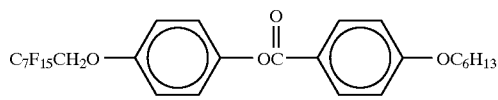
I-14
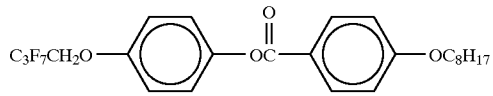
I-15
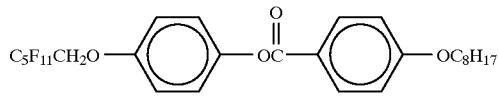
I-16
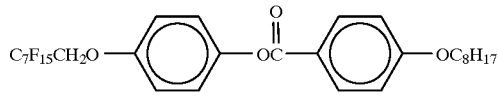
I-17
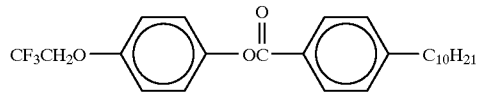
I-18
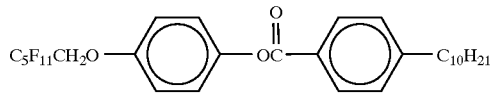
I-19
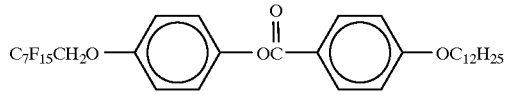
I-20
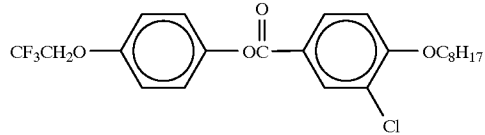
I-21
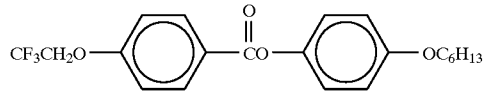
I-22
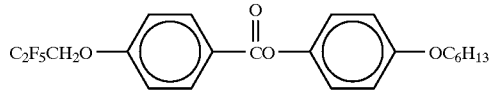
I-23
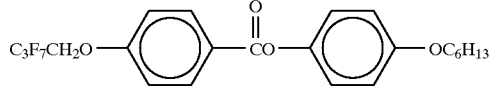
I-24
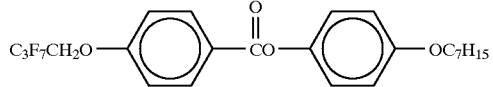
I-25
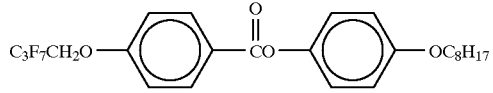
I-26

-continued
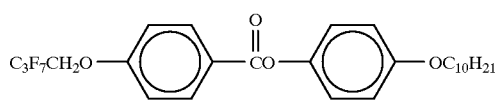
I-27
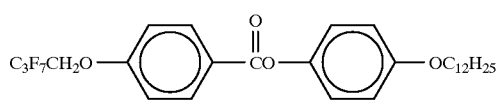
I-28
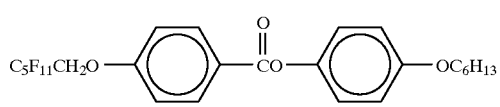
I-29
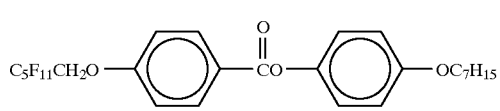
I-30
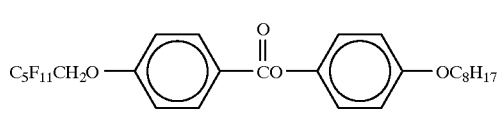
I-31
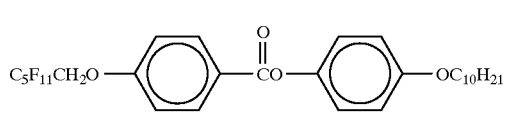
I-32
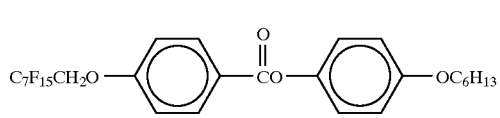
I-33
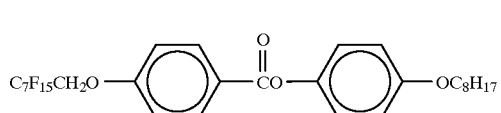
I-34
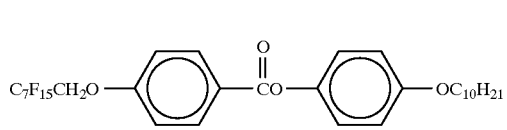
I-35
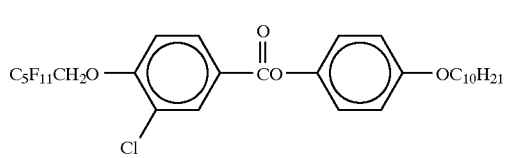
I-36
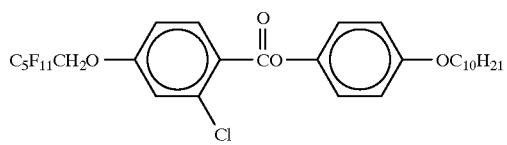
I-37
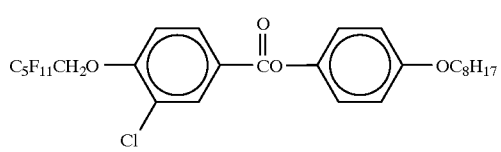
I-38

I-39
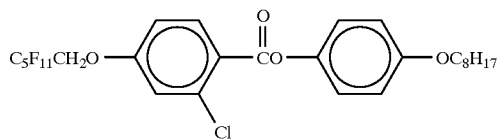
I-40
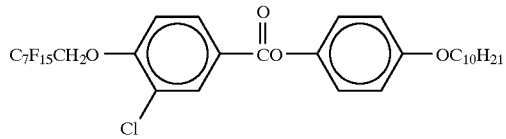
I-41
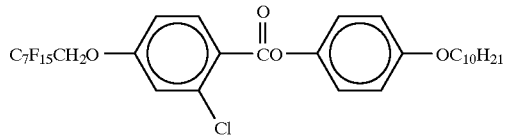
I-42
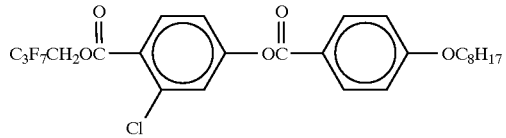
I-43
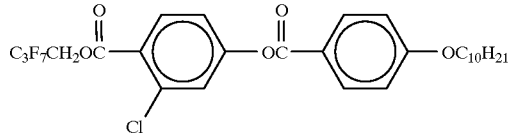
I-44
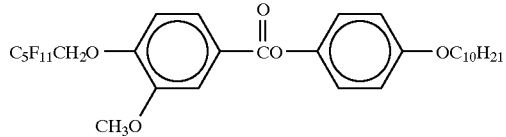
I-45
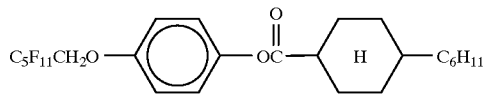
I-46
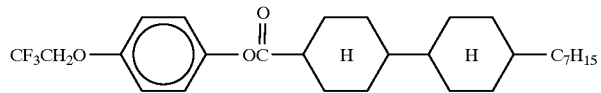
I-47
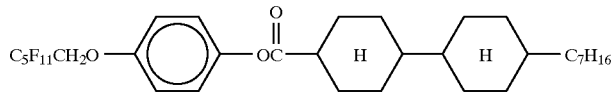
I-48
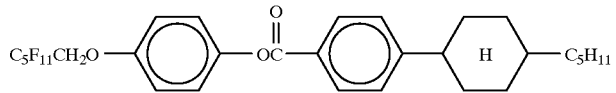
I-49
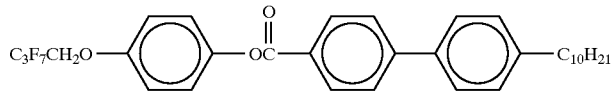

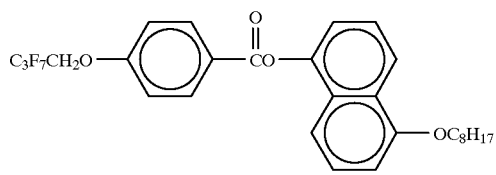
I-50
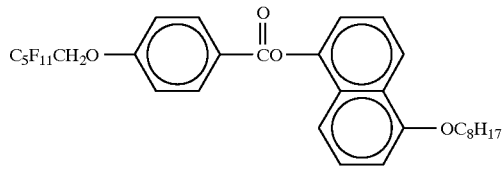
I-51
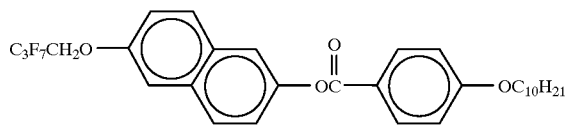
I-52
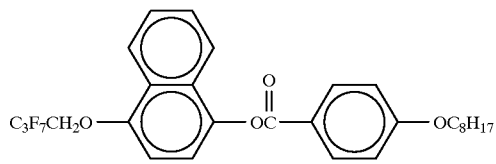
I-53
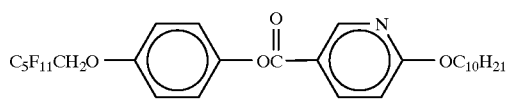
I-54
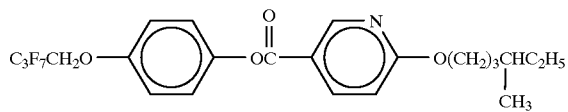
I-55
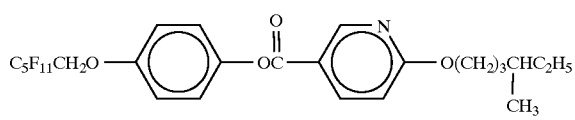
I-56
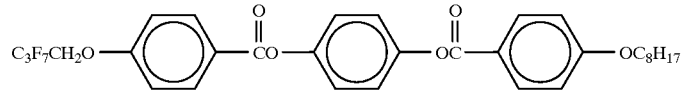
I-57
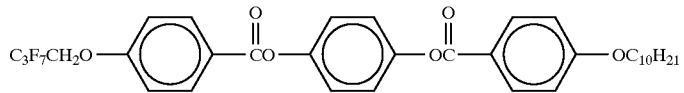
I-58
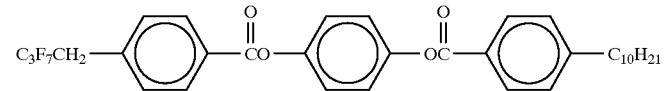
I-59
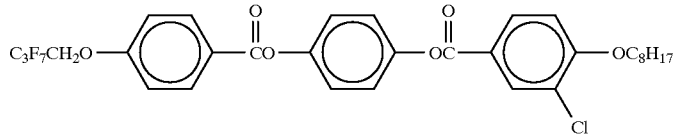
I-60

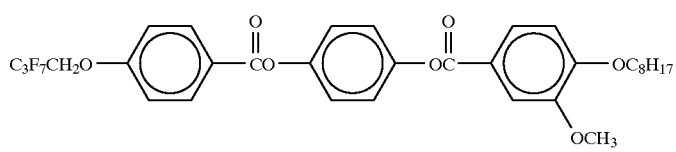
I-61
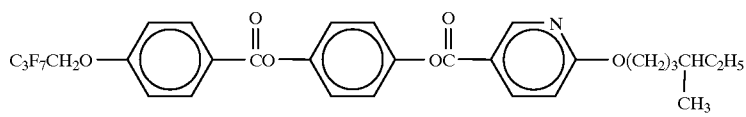
I-62
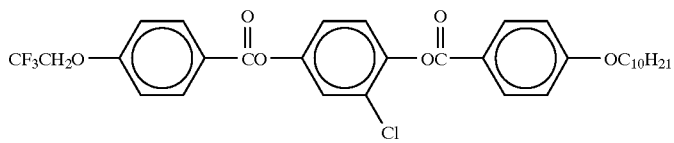
I-63
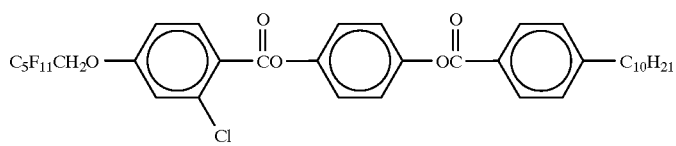
I-64
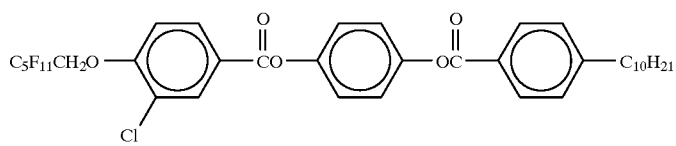
I-65
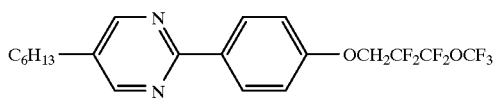
I-66
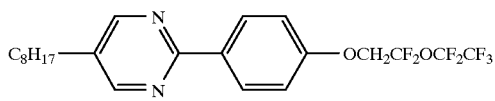
I-67
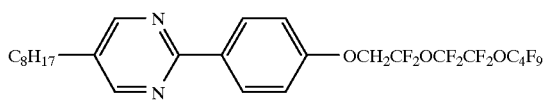
I-68
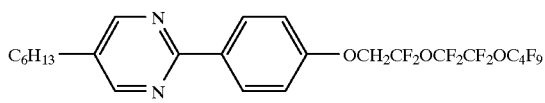
I-69
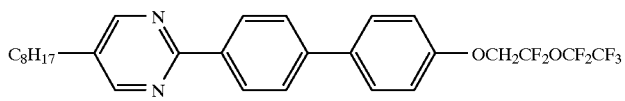
I-70
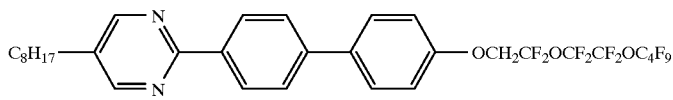
I-71
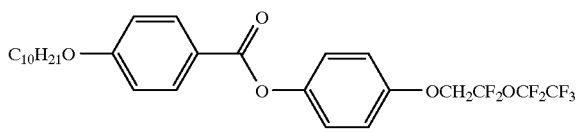
I-72

-continued
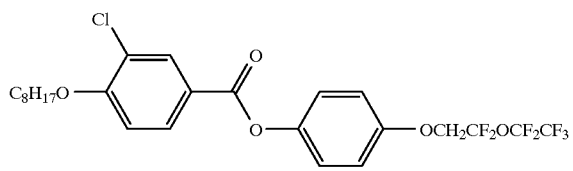
I-73
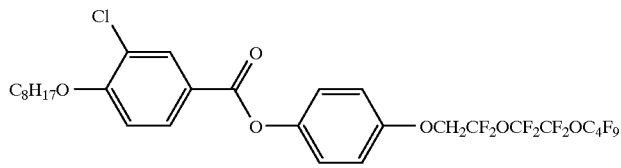
I-74
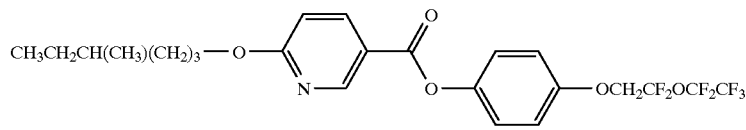
I-75
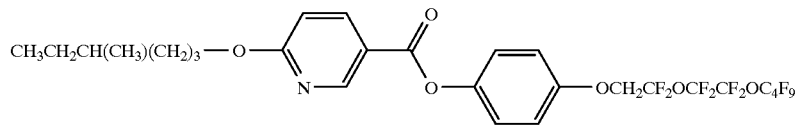
I-76
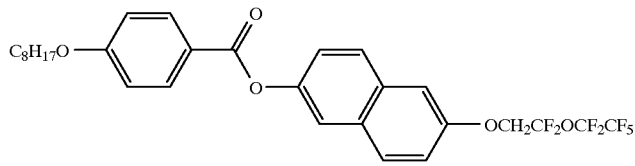
I-77
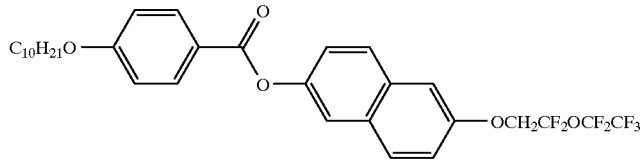
I-78
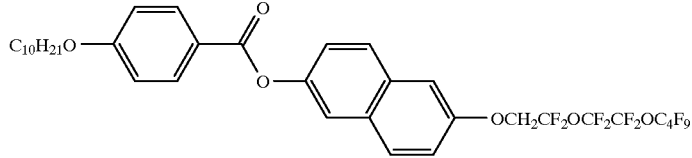
I-79
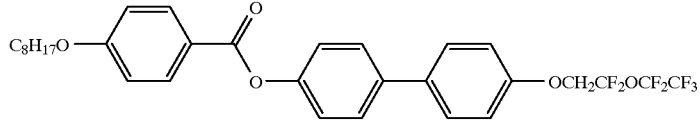
I-80
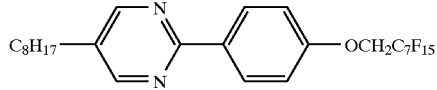
I-81
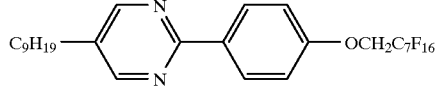
I-82

-continued
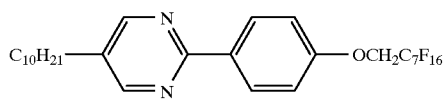
I-83
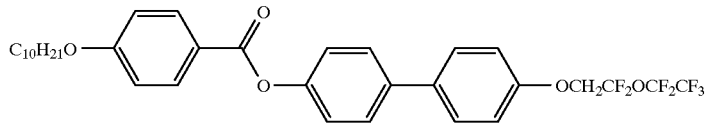
I-84
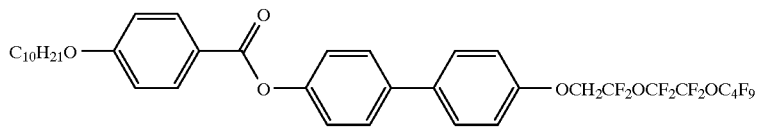
I-85
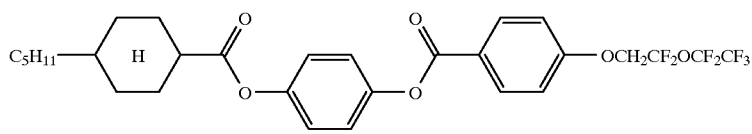
I-86
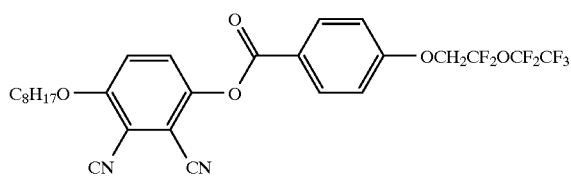
I-87
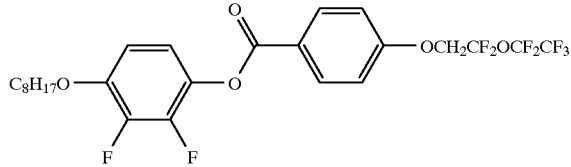
I-88
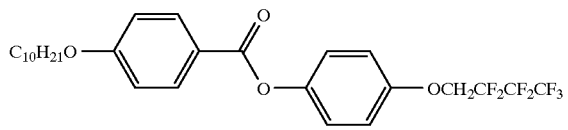
I-89
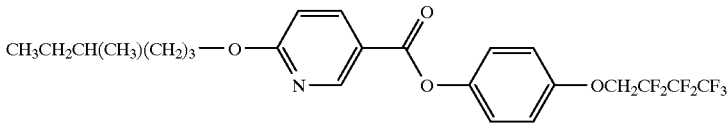
I-90
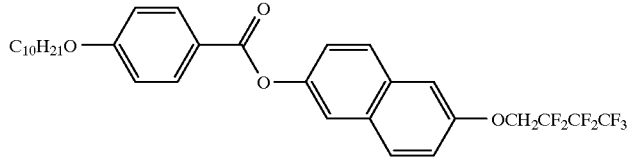
I-91
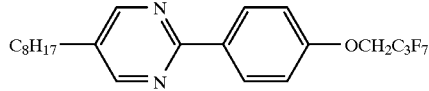
I-92

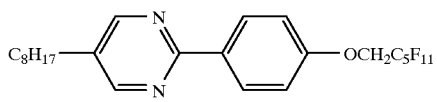

I-93

Among the mesomorphic compounds of the formula (I), a fluorine-containing mesomorphic compound having a phenyl-pyrimidine skeleton and represented by the formula (I') shown below may preferably be used since the compound of the formula (I') is effective in providing a resultant liquid crystal composition with a chiral smectic C phase in a wide temperature range including room temperature and with a low viscosity.
Formula (I')

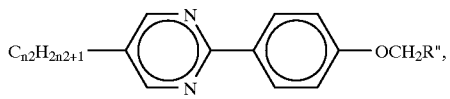

in which
n2 is an integer of 5–10; and
R" is —$C_xF_{2x+1}$ or

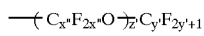

wherein x is an integer of 1–20, x" is independently an integer of 1–3 for each $C_{x"}F_{2x"}O$ group, y' is an integer of 1–4, and z' is an integer of 1–3.

By using the mesomorphic compound (a) (preferably having the formulae (I) and (I')), it is possible to provide a liquid crystal composition containing such a compound (a) with a bookshelf structure or a structure having a small layer inclination angle closer to that of the bookshelf structure without using an external electric field. The liquid crystal composition shows a high response speed due to its low viscosity and provides a larger pretilt angle to a liquid crystal device, whereby it is possible to realize a chiral smectic liquid crystal device showing a high transmittance.

Hereinbelow, the optically active compound (b) used together with the mesomorphic compound (a) will be explained in detail.

The optically active compound (b) may preferably be a mesomorphic compound, and the compound (b) is used as a chiral dopant and has a chiral cyclic group and a particular terminal alkyl group having no perfluoro group as mentioned above. Such a cyclic chiral dopant having the particular terminal group has a good solubility with the above-mentioned mesomorphic compound (a), particularly those of the formulae (I) and (I'), having a terminal perfluoroalkyl group or a terminal perfluoroether group and has a spontaneous polarization-imparting property. As a result, a resultant chiral smectic liquid crystal composition according to the present invention provides good driving characteristics including a high contrast ratio and a high response speed. With respect to the spontaneous polarization-imparting property, there are the following two advantages. First is that the compound (b) shows a large spontaneous polarization when used alone or in mixture of an ordinary base (or host) liquid crystal composition, thus naturally having a large spontaneous polarization-imparting property. Second is that the compound (b) particularly imparts a chiral smectic liquid crystal composition to a large spontaneous polarization when used in combination with the above-mentioned mesomorphic compound (a) having a terminal perfluoroalkyl group or a terminal perfluoroether group. As a result, a resultant (chiral smectic) liquid crystal composition provides a high response speed and a high contrast ratio. The compound (b) can also contribute toward providing a stable bookshelf structure.

The compound (b) may preferably be an optically active compound represented by the following formula (II):

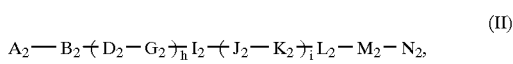

in which
$D_2$, $I_2$ and $K_2$ independently denote a group having an aromatic ring, a group having a heteroaromatic ring, an alicyclic group, a group having a fused ring comprising these rings, or a group formed by connecting these rings, each of these rings being optionally substituted with an appropriate group;

$B_2$, $G_2$, $J_2$ and $L_2$ independently denote a single bond, —O—, —COO—, —OCO—, —C≡C—, —CONR$_2$—, —NR$_2$CO—, —NR$_2$, —CH$_2$—, —CH=N—, —N=CH—, —CH=CH—, —COS—, —SCO—, —CH$_2$CH$_2$—, —CH$_2$O— or —OCH$_2$— wherein R$_2$ is an alkyl group having 1–5 carbon atoms;

$A_2$ and $N_2$ independently denote hydrogen or linear or branched alkyl group capable of including at least one —CH$_2$— group which can be replaced by —Y$_1$—, —Y$_1$CO—, —COY$_1$—, —CO—, —OCOO—, —CH=CH— or —C≡C— wherein Y$_1$ is O or S;

h and i are independently 0, 1 or 2, and $M_2$ is a divalent group having 3 to 7 membered ring comprising carbon atom, oxygen atom or nitrogen atom each of which has sp hybrid orbital, sp$^2$ hybrid orbital or sp$^3$ hybrid orbital and can be substituted with hydrogen or other elements, the ring having at least one asymmetric carbon atom.

The compound (b) of the formula (II) may preferably be used in combination with the above-mentioned mesomorphic compound of the formula (I) in view of improvements in mutual solubility and response speed. The compound (b) of the formula (II) may more preferably be used in combination with the compound (a) having a terminal perfluoroether group since a resultant liquid crystal composition of the invention has an improved alignment characteristic and a suppressed temperature-dependence of a layer structure (or a suppressed hysteresis phenomenon of a layer structure (layer inclination angle) with respect to temperature) and it is possible to control a tilt angle so as to improve a transmittance.

The compound (b) (preferably having the formula (II)) may more preferably be an optically active compound represented by any one of the following formulae (III) to (VIII).

Formula (III)

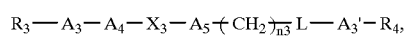
(III)

in which

R$_3$ is hydrogen, —CN, or a linear or branched alkyl group having 1–20 carbon atoms, and R$_4$ is a linear or branched alkyl group having 1–18 carbon atoms, each of alkyl groups of R$_3$ and R$_4$ being capable of including at least one —CH$_2$— group which can be replaced by —O—, —S—, —CO—, —CH(CN)—, —CH=CH—, —C≡C—, —COO— or —OCO— with the proviso that heteroatoms are not connected with each other;

A$_5$ is 1,4-phenylene capable of having one or two substituents comprising F, Cl, Br, CH$_3$, CF$_3$ and/or CN; pyridine-2,5-diyl; pyrimidine-2,5-diyl; pyrazine-2,5diyl; pyridazine-3,6-diyl; 1,4-cyclohexylene; 1,3-dioxane-2,5-diyl; 1,3-dithiane-2,5-diyl; thiophene-2,5-diyl, thiazole-2,5-diyl; thiadiazole-2,5-diyl; benzoxazole-2,5-diyl; benzoxazole-2,6-diyl; benzothiazole-2,5-diyl; benzothiazole-2,6-diyl; benzofuran-2,5-diyl; benzofuran-2,6-diyl; quinoxaline-2,6-diyl; quinoline-2,6-diyl; 2,6-naphthylene; indan-2,5-diyl; 2-alkylindan-2,5-diyl having a linear or branched alkyl group having 1–18 carbon atom; indanone-2,6-diyl; 2-alkylindanone-2,6-diyl having a linear or branched alkyl group having 1–18 carbon atoms; coumaran-2,5-diyl; or 2-alkylcoumaran-2,5-diyl having a linear or branched alkyl group having 1–18 carbon atoms;

A$_3$, A$_3$' and A$_4$ independently denote a single bond or a group selected from those for A$_5$ independently of A$_5$;

X$_3$ is a single bond, —COO—, —OCO—, —CH$_2$O—, —OCH$_2$—, —CH$_2$CH$_2$—, —CH=CH— or —C≡C—;

n3 is an integer of 1–10; and

L is optically active butanolide-2,4-diyl; optically active 4-alkylbutanolide-2,4-diyl having a linear or branched alkyl group having 1–5 carbon atoms; or optically active 2-alkylbutanolide-2,4-diyl having a linear or branched alkyl group having 1–5 carbon atoms.

Specific examples of the optically active compound of the formula (III) may include those represented by the following structural formulae (Ex. Comp. Nos. III-1 to III-418 indicated as Nos. 1–418 in Table 1 below) including abbreviations used for respective cyclic groups listed below.

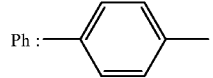

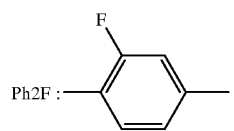

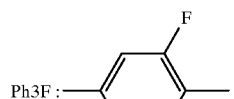

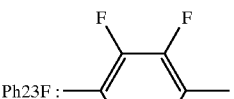

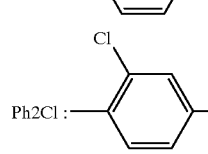

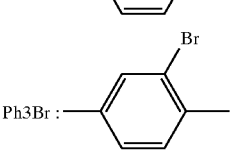

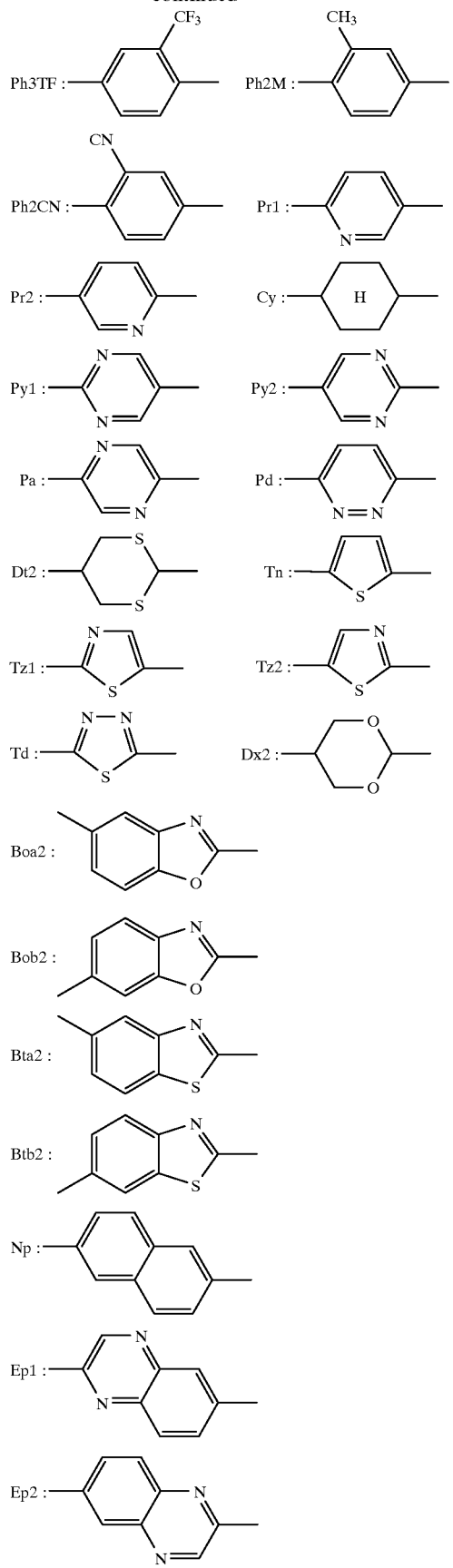

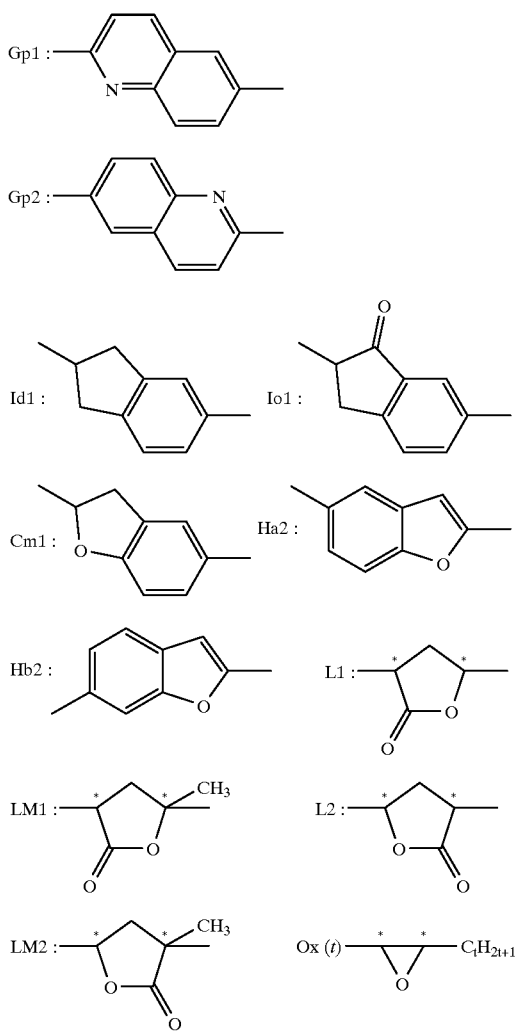

TABLE 1

| | $R_3-A_3-A_4-X_3-A_5-(CH_2)_{n3}-L-A_3'-R_4$ (III) | | | | | | | |
|---|---|---|---|---|---|---|---|---|
| No. | $R_3$ | $A_3$ | $A_4$ | $X_3$ | $A_5$ | $n^3$ | L | $A_3'$ | $R_4$ |
| 1 | $C_6H_{13}$ | — | — | — | Ph | 2 | L1 | — | $C_8H_{17}$ |
| 2 | $C_8H_{17}O$ | — | — | — | Ph | 2 | L1 | — | $C_{18}H_{37}$ |
| 3 | $C_5H_{11}O$ | — | — | — | Ph2F | 2 | L1 | — | $C_6H_{13}$ |
| 4 | $CH_3O$ | — | Ph | — | Ph | 2 | L1 | — | $C_6H_{13}$ |
| 5 | $C_7H_{15}O$ | — | Ph | — | Ph23F | 2 | L1 | — | $C_6H_{13}$ |
| 6 | $C_6H_{13}$ | — | Ph | —$OCH_3$— | Ph | 2 | L1 | — | $C_9H_{19}$ |
| 7 | $C_8H_{17}O$ | — | Ph | —COO— | Ph | 2 | L1 | — | $C_6H_{13}$ |
| 8 | $C_8H_{17}$ | — | Pr1 | — | Ph | 2 | L1 | — | $C_8H_{17}$ |
| 9 | $C_{10}H_{21}$ | — | Pr2 | — | Ph | 2 | L1 | — | $C_4H_9$ |
| 10 | $C_{11}H_{23}$ | — | Pr2 | — | Ph | 2 | L1 | — | $C_6H_{13}$ |
| 11 | $C_{12}H_{25}$ | — | Pr2 | —COO— | Ph | 2 | L1 | — | $C_8H_{17}$ |
| 12 | $C_4H_9O$ | — | Py1 | — | Ph | 2 | L1 | — | $C_{10}H_{21}$ |
| 13 | $C_{13}H_{27}$ | — | Py2 | — | Ph | 2 | L1 | — | $C_5H_{11}$ |
| 14 | $C_6H_{13}O$ | — | Py2 | — | Ph | 2 | L1 | — | $C_8H_{17}$ |
| 15 | $C_5H_{11}O$ | — | Py2 | — | Ph23F | 2 | L1 | — | $C_4H_9$ |
| 16 | $C_{10}H_{21}$ | — | Py2 | — | Ph | 2 | L1 | — | $C_6H_{13}$ |
| 17 | $C_8H_{17}$ | — | Py2 | — | Ph3F | 2 | L1 | — | $C_7H_{15}$ |
| 18 | $C_6H_{13}$ | — | Cy | — | Ph | 2 | L1 | — | $C_4H_8OC_4H_9$ |
| 19 | $C_7H_{15}OCO$ | — | Cy | — | Ph | 2 | L1 | — | $C_{14}H_{29}$ |
| 20 | $C_6H_{13}$ | — | Cy | —CH=CH— | Ph | 2 | L1 | — | $C_{10}H_{21}$ |
| 21 | $C_3H_7$ | — | Cy | —COO— | Ph | 2 | L1 | — | $C_6H_{13}$ |

TABLE 1-continued $R_3-A_3-A_4-X_3-A_5-(CH_2)_{n3}-L-A_3'-R_4$ (III)

| No. | $R_3$ | $A_3$ | $A_4$ | $X_3$ | $A_5$ | $n^3$ | L | $A_3'$ | $R_4$ |
|---|---|---|---|---|---|---|---|---|---|
| 22 | $C_5H_{11}$ | — | Pa | — | Ph | 2 | L1 | — | $C_8H_{17}$ |
| 23 | $C_{10}H_{21}$ | — | Pd | — | Ph | 2 | L1 | — | $C_6H_{13}$ |
| 24 | $C_6H_{13}$ | — | Dt2 | — | Ph | 2 | L1 | — | $(CH_2)_7CH=CH_2$ |
| 25 | $C_8H_{17}$ | — | Tn | — | Ph | 2 | L1 | — | $C_9H_{19}$ |
| 26 | $C_5H_{11}$ | — | Tz1 | — | Ph | 2 | L1 | — | $C_8H_{17}$ |
| 27 | $C_9H_{19}O$ | — | Tz2 | — | Ph | 2 | L1 | — | $C_5H_{11}$ |
| 28 | $C_2H_5$ | — | Td | — | Ph | 2 | L1 | — | $C_8H_{17}$ |
| 29 | $C_{10}H_{21}$ | — | Dx2 | — | Ph | 2 | L1 | — | $C_7H_{16}$ |
| 30 | $C_6H_{13}$ | — | Boa2 | — | Ph | 2 | L1 | — | $C_{10}H_{21}$ |
| 31 | $C_7H_{15}$ | — | Bob2 | — | Ph | 2 | L1 | — | $C_6H_{13}$ |
| 32 | $C_{16}H_{33}O$ | — | Bta2 | — | Ph | 2 | L1 | — | $C_6H_{13}$ |
| 33 | $C_6H_{13}$ | — | Btb2 | — | Ph | 2 | L1 | — | $C_{14}H_{29}$ |
| 34 | $C_5H_{11}$ | — | Np | —COO— | Ph | 2 | L1 | — | $C_7H_{15}$ |
| 35 | $C_4H_9$ | — | Ep2 | — | Ph | 2 | L1 | — | $C_6H_{13}$ |
| 36 | $C_6H_{13}$ | — | Gp1 | — | Ph | 2 | L1 | — | $C_{12}H_{25}$ |
| 37 | $C_7H_{15}$ | — | Gp2 | — | Ph | 2 | L1 | — | $C_6H_{13}$ |
| 38 | $C_6H_{13}$ | — | Cm1 | — | Ph | 2 | L1 | — | $C_8H_{17}$ |
| 39 | $C_8H_{17}$ | — | Io1 | — | Ph | 2 | L1 | — | $C_6H_{13}$ |
| 40 | $C_{20}H_{41}$ | — | Id1 | —COO— | Ph | 2 | L1 | — | $C_4H_9$ |
| 41 | $C_{11}H_{23}$ | — | Id1 | — | Ph | 2 | L1 | — | $C_8H_{17}$ |
| 42 | $C_8H_{17}$ | — | Id1 | — | Ph | 2 | L1 | — | $C_8H_{17}$ |
| 43 | $C_5H_{11}$ | — | Id1 | — | Ph2F | 2 | L1 | — | $C_6H_{13}$ |
| 44 | $C_6H_{13}$ | — | Tn | — | Ph | 2 | L1 | — | $C_7H_{15}$ |
| 45 | $C_4H_9O$ | — | Tz2 | — | Ph | 2 | L1 | — | $C_8H_{19}$ |
| 46 | $C_{12}H_{25}$ | — | Btb2 | — | Ph | 2 | L1 | — | $C_6H_{13}$ |
| 47 | $C_6H_{13}O$ | — | Btb2 | — | Ph | 2 | L1 | — | $C_8H_{19}$ |
| 48 | $CH_2=CH(CH_2)_3O$ | — | Ep2 | — | Ph | 2 | L1 | — | $C_6H_{13}$ |
| 49 | $C_9H_{19}$ | — | Gp2 | — | Ph | 2 | L1 | — | $C_5H_{11}$ |
| 50 | $C_5H_{11}O$ | — | Np | — | Ph | 2 | L1 | — | $C_{10}H_{21}$ |
| 51 | $C_6H_{13}$ | Ph | Ph | — | Ph | 2 | L1 | — | $C_3H_7$ |
| 52 | $C_3H_7$ | Py2 | Ph | — | Ph | 2 | L1 | — | $C_8H_{17}$ |
| 53 | $C_5H_{11}$ | — | Ha2 | — | Ph | 2 | L1 | — | $C_{11}H_{23}$ |
| 54 | $C_6H_{13}$ | Ph | Pr2 | — | Ph | 2 | L1 | — | $C_6H_{13}$ |
| 55 | $C_9H_{19}$ | Ph | Pr1 | — | Ph | 2 | L1 | — | $C_5H_{11}$ |
| 56 | $C_{13}H_{27}$ | Ph | Cy | — | Ph3Br | 2 | L1 | — | $C_7H_{15}$ |
| 57 | $C_{10}H_{21}O$ | Ph | Py1 | — | Ph | 2 | L1 | — | $C_6H_{13}$ |
| 58 | $C_7H_{15}$ | Ph | Py2 | — | Ph | 2 | L1 | — | $C_{10}H_{21}$ |
| 59 | $C_4H_9$ | Ph3TF | Pa | — | Ph | 2 | L1 | — | $(CH_2)_3CH(CH_3)_2$ |
| 60 | H | — | Hb2 | — | Ph | 2 | L1 | — | $C_8H_{17}$ |
| 61 | $C_8H_{17}$ | Ph | Tn | — | Ph | 2 | L1 | — | $C_5H_{11}$ |
| 62 | $C_2H_5$ | Ph | Tz1 | — | Ph2M | 2 | L1 | — | $C_3H_7$ |
| 63 | $C_6H_{13}$ | Ph | Tz2 | — | Ph | 2 | L1 | — | $C_6H_{13}$ |
| 64 | $C_{10}H_{21}$ | Ph | Td | — | Ph | 2 | L1 | — | $C_7H_{15}$ |
| 65 | $C_{10}H_{21}$ | — | Ph | — | Py1 | 2 | L1 | — | $C_6H_{13}$ |
| 66 | $C_6H_{13}$ | — | Ph | — | Py1 | 2 | L1 | — | $C_5H_{11}$ |
| 67 | $C_6H_{13}OCO$ | — | Ph | — | Py1 | 2 | L1 | — | $C_5H_{11}$ |
| 68 | $C_7H_{15}$ | — | — | — | Pr2 | 2 | L1 | — | $C_{10}H_{21}$ |
| 69 | $C_9H_{19}$ | — | Ph | — | Pr2 | 2 | L1 | — | $C_8H_{17}$ |
| 70 | $C_3H_7$ | — | Ph | — | Pr2 | 2 | L1 | — | $C_6H_{13}$ |
| 71 | $C_5H_{11}O$ | — | — | — | Cy | 2 | L1 | — | $C_4H_9$ |
| 72 | $C_4H_9$ | — | Ph | —$CH_2O$— | Cy | 2 | L1 | — | $C_7H_{15}$ |
| 73 | $C_{12}H_{25}$ | — | Ph | — | Cy | 2 | L1 | — | $C_3H_7$ |
| 74 | $C_6H_{13}C≡C$ | — | Ph | — | Pa | 2 | L1 | — | $C_6H_{13}$ |
| 75 | $C_8H_{17}O$ | — | Ph | — | Pd | 2 | L1 | — | $C_5H_{11}$ |
| 76 | $C_3H_7$ | — | Ph2C1 | — | Tn | 2 | L1 | — | $C_{10}H_{21}$ |
| 77 | $C_4H_9$ | — | Ph | — | Tn | 2 | L1 | — | $C_7H_{15}$ |
| 78 | $C_8H_{17}$ | — | Ph | — | Tz1 | 2 | L1 | — | $C_{12}H_{25}$ |
| 79 | $C_4H_9OCH(CH_3)COO$ | — | Ph | — | Tz1 | 2 | L1 | — | $C_5H_{11}$ |
| 80 | $C_6H_{13}$ | — | Ph2F | — | Td | 2 | L1 | — | $(CH_2)_3CH(CH_3)C_6H_{13}$ |
| 81 | $C_5H_{11}$ | — | — | — | Np | 2 | L1 | — | $C_9H_{19}$ |
| 82 | $C_8H_{17}OCH_2CH_2$ | — | Ph | — | Np | 2 | L1 | — | $C_8H_{11}$ |
| 83 | $C_{11}H_{23}$ | — | Ph | — | Np | 2 | L1 | — | $C_6H_{13}$ |
| 84 | $C_5H_{11}$ | — | — | — | Ep1 | 2 | L1 | — | $C_4H_9$ |
| 85 | $CH_3$ | — | Ph | — | Ep1 | 2 | L1 | — | $C_7H_{15}$ |
| 86 | $C_6H_{13}$ | — | Ph | — | Ep1 | 2 | L1 | — | $C_6H_{13}$ |
| 87 | $C_9H_{19}O$ | — | — | — | Gp1 | 2 | L1 | — | $C_8H_{17}$ |
| 88 | $C_8H_{17}$ | — | Ph | — | Gp1 | 2 | L1 | — | $C_{10}H_{21}$ |
| 89 | $C_3H_7COO$ | — | Ph | — | GP1 | 2 | L1 | — | $C_{11}H_{23}$ |
| 90 | $C_4H_9$ | — | Ph | — | Id1 | 2 | L1 | — | $C_7H_{15}$ |
| 91 | $C_{12}H_{25}$ | — | Ph | — | Io1 | 2 | L1 | — | $C_6H_{13}$ |
| 92 | $C_{10}H_{21}$ | — | Ph | — | Cm1 | 2 | L1 | — | $C_5H_{11}$ |
| 93 | $C_3H_7$ | Ph | Ph | — | Py1 | 2 | L1 | — | $C_7H_{15}$ |
| 94 | $C_4H_9$ | Ph2CN | Ph | — | Pr1 | 2 | L1 | — | $C_4H_9$ |
| 95 | $C_5H_{11}$ | Ph | Ph3F | — | Tz1 | 2 | L1 | — | $C_3H_7$ |
| 96 | CN | Ph | Ph | — | Tn | 2 | L1 | — | $CH_3$ |

TABLE 1-continued $$R_3-A_3-A_4-X_3-A_5-(CH_2)_{n3}-L-A_3'-R_4 \text{ (III)}$$

| No. | $R_3$ | $A_3$ | $A_4$ | $X_3$ | $A_5$ | $n^3$ | L | $A_3'$ | $R_4$ |
|---|---|---|---|---|---|---|---|---|---|
| 97 | $C_7H_{15}$ | Th | Ph | — | Py1 | 2 | L1 | — | $C_8H_{17}$ |
| 98 | $C_{10}H_{21}$ | Ph | Ph | — | Cy | 2 | L1 | — | $C_6H_{13}$ |
| 99 | $C_6H_{13}$ | — | — | — | Ph | 8 | L1 | — | $C_6H_{17}$ |
| 100 | $C_8H_{17}O$ | — | — | — | Ph | 12 | L1 | — | $C_{18}H_{37}$ |
| 101 | $C_5H_{11}O$ | — | — | — | Ph2F | 4 | L1 | — | $C_6H_{13}$ |
| 102 | $CH_3O$ | — | Ph | — | Ph | 3 | L1 | — | $C_6H_{13}$ |
| 103 | $C_7H_{15}O$ | — | Ph | — | Ph23F | 6 | L1 | — | $C_6H_{13}$ |
| 104 | $C_6H_{13}$ | — | Ph | —$OCH_2$— | Ph | 11 | L1 | — | $C_9H_{19}$ |
| 105 | $C_8H_{17}O$ | — | Ph | —COO— | Ph | 6 | L1 | — | $C_6H_{13}$ |
| 106 | $C_8H_{17}$ | — | Pr1 | — | Ph | 5 | L1 | — | $C_8H_{17}$ |
| 107 | $C_{10}H_{21}$ | — | Pr2 | — | Ph | 4 | L1 | — | $C_4H_9$ |
| 108 | $C_{11}H_{23}$ | — | Pr2 | — | Ph | 8 | L1 | — | $C_6H_{13}$ |
| 109 | $C_{12}H_{25}$ | — | Pr2 | —COO— | Ph | 10 | L1 | — | $C_8H_{17}$ |
| 110 | $C_4H_9O$ | — | Py1 | — | Ph | 9 | L1 | — | $C_{10}H_{21}$ |
| 111 | $C_{13}H_{27}$ | — | Py2 | — | Ph | 7 | L1 | — | $C_5H_{11}$ |
| 112 | $C_6H_{13}O$ | — | Py2 | — | Ph | 3 | L1 | — | $C_8H_{17}$ |
| 113 | $C_5H_{11}O$ | — | Py2 | — | Ph23F | 4 | L1 | — | $C_4H_9$ |
| 114 | $C_{10}H_{21}$ | — | Py2 | — | Ph | 6 | L1 | — | $C_6H_{13}$ |
| 115 | $C_8H_{17}$ | — | Py2 | — | Ph3F | 7 | L1 | — | $C_7H_{15}$ |
| 116 | $C_8H_{17}$ | — | Py2 | — | Ph | 4 | L1 | — | $CH_2OC_6H_{13}$ |
| 117 | $C_{10}H_{21}$ | — | Py2 | — | Ph | 8 | L1 | — | $C_6H_{13}$ |
| 118 | $C_{10}H_{21}$ | — | Py2 | — | Ph | 5 | L1 | — | $C_6H_{13}$ |
| 119 | $C_3H_7$ | — | Cy | —COO— | Ph | 6 | L1 | — | $C_6H_{13}$ |
| 120 | $C_5H_{11}$ | — | Pa | — | Ph | 4 | L1 | — | $C_8H_{17}$ |
| 121 | $C_{10}H_{21}$ | — | Pd | — | Ph | 7 | L1 | — | $C_6H_{13}$ |
| 122 | $C_6H_{13}$ | — | Dt2 | — | Ph | 9 | L1 | — | $(CH_2)_5CH=CH_2$ |
| 123 | $C_8H_{17}$ | — | Tn | — | Ph | 4 | L1 | — | $C_9H_{19}$ |
| 124 | $C_5H_{11}$ | — | Tz1 | — | Ph | 8 | L1 | — | $C_8H_{17}$ |
| 125 | $C_9H_{19}O$ | — | Tz2 | — | Ph | 9 | L1 | — | $C_5H_{11}$ |
| 126 | $C_2H_5$ | — | Td | — | Ph | 8 | L1 | — | $C_8H_{17}$ |
| 127 | $C_{10}H_{21}$ | — | Dx2 | — | Ph | 5 | L1 | — | $C_7H_{15}$ |
| 128 | $C_6H_{13}$ | — | Boa2 | — | Ph | 4 | L1 | — | $C_{10}H_{21}$ |
| 129 | $C_7H_{15}$ | — | Bob2 | — | Ph | 6 | L1 | — | $C_6H_{13}$ |
| 130 | $C_{16}H_{33}O$ | — | Bta2 | — | Ph | 4 | L1 | — | $C_6H_{13}$ |
| 131 | $C_6H_{13}$ | — | Btb2 | — | Ph | 6 | L1 | — | $C_{14}H_{29}$ |
| 132 | $C_5H_{11}$ | — | Np | —COO— | Ph | 4 | L1 | — | $C_7H_{15}$ |
| 133 | $C_4H_9$ | — | Ep2 | — | Ph | 8 | L1 | — | $C_6H_{13}$ |
| 134 | $C_6H_{13}$ | — | Gp1 | — | Ph | 12 | L1 | — | $C_{12}H_{25}$ |
| 135 | $C_7H_{15}$ | — | Gp2 | — | Ph | 7 | L1 | — | $C_6H_{13}$ |
| 136 | $C_6H_{13}$ | — | Cm1 | — | Ph | 4 | L1 | — | $C_6H_{13}$ |
| 137 | $C_8H_{17}$ | — | Io1 | — | Ph | 8 | L1 | — | $C_6H_{13}$ |
| 138 | $C_{20}H_{41}$ | — | Id1 | —COO— | Ph | 4 | L1 | — | $C_4H_9$ |
| 139 | $C_{11}H_{23}$ | — | Id1 | — | Ph | 9 | L1 | — | $C_8H_{17}$ |
| 140 | $C_8H_{17}$ | — | Id1 | — | Ph | 10 | L1 | — | $C_8H_{17}$ |
| 141 | $C_5H_{11}$ | — | Id1 | — | Ph2F | 3 | L1 | — | $C_6H_{13}$ |
| 142 | $C_6H_{13}$ | — | Tn | — | Ph | 4 | L1 | — | $C_7H_{15}$ |
| 143 | $C_4H_9O$ | — | Tz2 | — | Ph | 6 | L1 | — | $C_9H_{19}$ |
| 144 | $C_{12}H_{25}$ | — | Btb2 | — | Ph | 8 | L1 | — | $C_6H_{13}$ |
| 145 | $C_6H_{13}O$ | — | Btb2 | — | Ph | 7 | L1 | — | $C_9H_{19}$ |
| 146 | $CH_3=CH(CH_2)_3O$ | — | Ep2 | — | Ph | 5 | L1 | — | $C_6H_{13}$ |
| 147 | $C_9H_{19}$ | — | Gp2 | — | Ph | 4 | L1 | — | $C_5H_{11}$ |
| 148 | $C_5H_{11}O$ | — | Np | — | Ph | 4 | L1 | — | $C_{10}H_{21}$ |
| 149 | $C_6H_{13}$ | Ph | Ph | — | Ph | 6 | L1 | — | $C_3H_7$ |
| 150 | $C_3H_7$ | Py2 | Ph | — | Ph | 9 | L1 | — | $C_8H_{17}$ |
| 151 | $C_5H_{11}$ | — | Ha2 | — | Ph | 14 | L1 | — | $C_{11}H_{23}$ |
| 152 | $C_6H_{13}$ | Ph | Pr2 | — | Ph | 3 | L1 | — | $C_6H_{13}$ |
| 153 | $C_9H_{19}$ | Ph | Pr1 | — | Ph | 4 | L1 | — | $C_6H_{13}$ |
| 154 | $C_{13}H_{27}$ | Ph | Cy | — | Ph3Br | 6 | L1 | — | $C_7H_{15}$ |
| 155 | $C_{10}H_{21}O$ | Ph | Py1 | — | Ph | 4 | L1 | — | $C_6H_{13}$ |
| 156 | $C_7H_{15}$ | Ph | Py2 | — | Ph | 6 | L1 | — | $C_{10}H_{21}$ |
| 157 | $C_4H_9$ | Ph3TF | Pa | — | Ph | 6 | L1 | — | $(CH_2)_3CH(CH_3)_2$ |
| 158 | H | — | Hb2 | — | Ph | 8 | L1 | — | $C_8H_{17}$ |
| 159 | $C_8H_{17}$ | Ph | Tn | — | Ph | 10 | L1 | — | $C_5H_{11}$ |
| 160 | $C_2H_5$ | Ph | Tz1 | — | Ph2M | 11 | L1 | — | $C_3H_7$ |
| 161 | $C_6H_{13}$ | Ph | Tz2 | — | Ph | 4 | L1 | — | $C_6H_{13}$ |
| 162 | $C_{10}H_{21}$ | Ph | Td | — | Ph | 4 | L1 | — | $C_7H_{15}$ |
| 163 | $C_{10}H_{21}$ | — | Ph | — | Py1 | 4 | L1 | — | $C_6H_{13}$ |
| 164 | $C_6H_{13}$ | — | Ph | — | Py1 | 5 | L1 | — | $C_6H_{13}$ |
| 165 | $C_6H_{13}OCO$ | — | Ph | — | Py1 | 6 | L1 | — | $C_5H_{11}$ |
| 166 | $C_7H_{15}$ | — | — | — | Pr2 | 18 | L1 | — | $C_{10}H_{21}$ |
| 167 | $C_9H_{19}$ | — | Ph | — | Pr2 | 4 | L1 | — | $C_8H_{17}$ |
| 168 | $C_3H_7$ | — | Ph | — | Pr2 | 8 | L1 | — | $C_6H_{13}$ |
| 169 | $C_5H_{11}O$ | — | — | — | Cy | 20 | L1 | — | $C_4H_9$ |
| 170 | $C_4H_9$ | — | Ph | —$CH_2O$— | Cy | 4 | L1 | — | $C_7H_{15}$ |
| 171 | $C_{12}H_{25}$ | — | Ph | — | Cy | 6 | L1 | — | $C_3H_7$ |

TABLE 1-continued $$R_3-A_3-A_4-X_3-A_5-(CH_2)_{n3}-L-A_3'-R_4 \text{ (III)}$$

| No. | $R_3$ | $A_3$ | $A_4$ | $X_3$ | $A_5$ | $n^3$ | L | $A_3'$ | $R_4$ |
|---|---|---|---|---|---|---|---|---|---|
| 172 | $C_6H_{15}C\equiv C$ | — | Ph | — | Pa | 5 | L1 | — | $C_6H_{13}$ |
| 173 | $C_8H_{17}O$ | — | Ph | — | Pd | 7 | L1 | — | $C_5H_{11}$ |
| 174 | $C_3H_7$ | — | Ph2Cl | — | Tn | 13 | L1 | — | $C_{10}H_{21}$ |
| 175 | $C_4H_9$ | — | Ph | — | Tn | 4 | L1 | — | $C_7H_{15}$ |
| 176 | $C_8H_{17}$ | — | Ph | — | Tz1 | 6 | L1 | — | $C_{12}H_{25}$ |
| 177 | $C_4H_9OCH(CH_3)COO$ | — | Ph | — | Tz1 | 4 | L1 | — | $C_5H_{11}$ |
| 178 | $C_6H_{13}$ | — | Ph2F | — | Td | 4 | L1 | — | $(CH_2)_3CH(CH_3)C_6H_{13}$ |
| 179 | $C_5H_{11}$ | — | — | — | Np | 6 | L1 | — | $C_9H_{19}$ |
| 180 | $C_8H_{17}OCH_2CH_2$ | — | Ph | — | Np | 6 | L1 | — | $C_5H_{11}$ |
| 181 | $C_{11}H_{23}$ | — | Ph | — | Np | 8 | L1 | — | $C_6H_{13}$ |
| 182 | $C_5H_{11}$ | — | — | — | Ep1 | 8 | L1 | — | $C_4H_9$ |
| 183 | $CH_3$ | — | Ph | — | Ep1 | 9 | L1 | — | $C_7H_{15}$ |
| 184 | $C_6H_{13}$ | — | Ph | — | Ep1 | 10 | L1 | — | $C_6H_{13}$ |
| 185 | $C_9H_{19}O$ | — | — | — | Gp1 | 4 | L1 | — | $C_8H_{17}$ |
| 186 | $C_8H_{17}$ | — | Ph | — | Gp1 | 5 | L1 | — | $C_{10}H_{21}$ |
| 187 | $C_3H_7COO$ | — | Ph | — | Gp1 | 7 | L1 | — | $C_{11}H_{23}$ |
| 188 | $C_4H_9$ | — | Ph | — | Id1 | 12 | L1 | — | $C_7H_{15}$ |
| 189 | $C_{12}H_{25}$ | — | Ph | — | Io1 | 4 | L1 | — | $C_6H_{13}$ |
| 190 | $C_{10}H_{21}$ | — | Ph | — | Cm1 | 4 | L1 | — | $C_6H_{13}$ |
| 191 | $C_3H_7$ | Ph | Ph | — | Py1 | 8 | L1 | — | $C_7H_{15}$ |
| 192 | $C_4H_9$ | Ph2CN | Ph | — | Pr1 | 7 | L1 | — | $C_4H_9$ |
| 193 | $C_5H_{11}$ | Ph | Ph3F | — | Tz1 | 4 | L1 | — | $C_3H_7$ |
| 194 | CN | Ph | Ph | — | Tn | 6 | L1 | — | $CH_3$ |
| 195 | $C_7H_{15}$ | Th | Ph | — | Py1 | 4 | L1 | — | $C_8H_{17}$ |
| 196 | $C_{10}H_{21}$ | Ph | Ph | — | Cy | 4 | L1 | — | $C_6H_{13}$ |
| 197 | $C_6H_{13}$ | — | — | — | Ph | 2 | L1 | Ph | H |
| 198 | $C_8H_{17}O$ | — | — | — | Ph | 8 | L2 | Ph | $OCH_3$ |
| 199 | $C_5H_{11}O$ | — | — | — | Ph2F | 2 | L1 | Ph2F | $C_6H_{13}$ |
| 200 | $CH_3O$ | — | Ph | — | Ph | 4 | L2 | Ph | H |
| 201 | $C_7H_{15}O$ | — | Ph | — | Ph23F | 2 | L1 | Ph | $C_6H_{13}$ |
| 202 | $C_6H_{13}$ | — | Ph | —$OCH_2$— | Ph | 4 | L1 | Ph | H |
| 203 | $C_8H_{17}O$ | — | Ph | —COO— | Ph | 7 | L2 | Pr1 | H |
| 204 | $C_8H_{17}$ | — | Pr1 | — | Ph | 7 | L2 | Ph | $OCH_3$ |
| 205 | $C_{10}H_{21}$ | — | Pr2 | — | Ph | 2 | L1 | Ph | H |
| 206 | $C_{11}H_{23}$ | — | Pr2 | — | Ph | 4 | L1 | Ph | $C_6H_{13}$ |
| 207 | $C_{12}H_{25}$ | — | Pr2 | —COO— | Ph | 8 | L2 | Ph | $OC_6H_{13}$ |
| 208 | $C_4H_9O$ | — | Py1 | — | Ph | 2 | L1 | Cy | H |
| 209 | $C_{13}H_{27}$ | — | Py2 | — | Ph | 2 | L1 | Ph | $C_5H_{11}$ |
| 210 | $C_6H_{13}O$ | — | Py2 | — | Ph | 6 | L2 | Ph | $C_6H_{13}$ |
| 211 | $C_5H_{11}O$ | — | Py2 | — | Ph23F | 2 | L1 | Ph | $C_4H_9$ |
| 212 | $C_{10}H_{21}$ | — | Py2 | — | Ph | 2 | L1 | Ph | H |
| 213 | $C_8H_{17}$ | — | Py2 | — | Ph3F | 2 | L1 | Ph | $C_6H_{13}$ |
| 214 | $C_6H_{13}$ | — | Cy | — | Ph | 4 | L2 | Ph | $C_2H_4OC_4H_9$ |
| 215 | $C_8H_{17}OCO$ | — | Cy | — | Ph | 2 | L1 | Pd | H |
| 216 | $C_6H_{13}$ | — | Cy | —CH=CH— | Ph | 5 | L1 | Ph | $OC_{10}H_{21}$ |
| 217 | $C_3H_7$ | — | Cy | —COO— | Ph | 2 | L1 | Tz2 | H |
| 218 | $C_5H_{11}$ | — | Pa | — | Ph | 5 | L2 | Ph | $C_8H_{17}$ |
| 219 | $C_{10}H_{21}$ | — | Pd | — | Ph | 2 | L1 | Ph | $OCH_3$ |
| 220 | $C_6H_{13}$ | — | Dt2 | — | Ph | 6 | L2 | Ph | $(CH_2)_5CH=CH_3$ |
| 221 | $C_8H_{17}$ | — | Tn | — | Ph | 2 | L1 | Ph | H |
| 222 | $C_5H_{11}$ | — | Tz1 | — | Ph | 2 | L1 | Ph | H |
| 223 | $C_9H_{19}O$ | — | Tz2 | — | Ph | 2 | L1 | Ph | $C_6H_{13}$ |
| 224 | $C_2H_5$ | — | Td | — | Ph | 2 | L2 | Ph | H |
| 225 | $C_{10}H_{21}$ | — | Dx2 | — | Ph | 4 | L2 | Ph | $C_7H_{15}$ |
| 226 | $C_6H_{13}$ | — | Boa2 | — | Ph | 2 | L1 | Ph | H |
| 227 | $C_7H_{15}$ | — | Bob2 | — | Ph | 2 | L1 | Ph | $OCH_3$ |
| 228 | $C_{16}H_{33}O$ | — | Bta2 | — | Ph | 2 | L1 | Ph | H |
| 229 | $C_6H_{13}$ | — | Btb2 | — | Ph | 4 | L2 | Tn | $C_{14}H_{29}$ |
| 230 | $C_5H_{11}$ | — | Np | —COO— | Ph | 2 | L1 | Ph | H |
| 231 | $C_4H_9$ | — | Ep2 | — | Ph | 2 | L1 | Ph | $C_6H_{13}$ |
| 232 | $C_6H_{13}$ | — | Gp1 | — | Ph | 6 | L2 | Ph | $OCH_3$ |
| 233 | $C_7H_{15}$ | — | Gp2 | — | Ph | 2 | L1 | Ph | H |
| 234 | $C_6H_{13}$ | — | Cm1 | — | Ph | 10 | L2 | Ph | $C_6H_{13}$ |
| 235 | $C_8H_{17}$ | — | Io1 | — | Ph | 4 | L1 | Ph | H |
| 236 | $C_{20}H_{41}$ | — | Id1 | —COO— | Ph | 2 | L1 | Ph | $C_4H_9$ |
| 237 | $C_{11}H_{23}$ | — | Id1 | — | Ph | 4 | L2 | Ph | H |
| 238 | $C_8H_{17}$ | — | Id1 | — | Ph | 2 | L1 | Ph | H |
| 239 | $C_5H_{11}$ | — | Id1 | — | Ph2F | 2 | L1 | Ph | $C_6H_{13}$ |
| 240 | $C_6H_{13}$ | — | Tn | — | Ph | 8 | L2 | Ph | $C_7H_{15}$ |
| 241 | $C_4H_9O$ | — | Tz2 | — | Ph | 2 | L1 | Ph | $C_9H_{19}$ |
| 242 | $C_{12}H_{25}$ | — | Btb2 | — | Ph | 9 | L1 | Ph | H |
| 243 | $C_6H_{13}O$ | — | Btb2 | — | Ph | 2 | L1 | Ph | $C_6H_{13}$ |
| 244 | $CH_3=CH(CH_2)_5O$ | — | Ep2 | — | Ph | 7 | L2 | Ph | H |
| 245 | $C_9H_{19}$ | — | Gp2 | — | Ph | 2 | L1 | Ph | $OCH_3$ |
| 246 | $C_5H_{11}O$ | — | Np | — | Ph | 2 | L1 | Np | $C_{10}H_{21}$ |

TABLE 1-continued $$R_3—A_3—A_4—X_3—A_5—(CH_2)_{n3}—L—A_3'—R_4 \text{ (III)}$$

| No. | $R_3$ | $A_3$ | $A_4$ | $X_3$ | $A_5$ | $n^3$ | L | $A_3'$ | $R_4$ |
|---|---|---|---|---|---|---|---|---|---|
| 247 | $C_6H_{13}$ | Ph | Ph | — | Ph | 2 | L1 | Ph | $C_3H_7$ |
| 248 | $C_3H_7$ | Py2 | Ph | — | Ph | 7 | L1 | Ph | H |
| 249 | $C_5H_{11}$ | — | Ha2 | — | Ph | 7 | L2 | Ph | $C_{11}H_{23}$ |
| 250 | $C_6H_{13}$ | Ph | Pr2 | — | Ph | 4 | L2 | Ph | H |
| 251 | $C_9H_{19}$ | Ph | Pr1 | — | Ph | 2 | L1 | Ph | $C_6H_{13}$ |
| 252 | $C_{13}H_{27}$ | Ph | Cy | — | Ph3Br | 2 | L1 | Ph | $C_7H_{15}$ |
| 253 | $C_{10}H_{21}O$ | Ph | Py1 | — | Ph | 2 | L1 | Ph | H |
| 254 | $C_7H_{15}$ | Ph | Py2 | — | Ph | 2 | L1 | Ph | $C_{10}H_{21}$ |
| 255 | $C_4H_9$ | Ph3TF | Pa | — | Ph | 6 | L2 | Ph | $C_6H_{13}$ |
| 256 | H | — | Hb2 | — | Ph | 2 | L1 | Ph | H |
| 257 | $C_8H_{17}$ | Ph | Tn | — | Ph | 4 | L1 | Ph3F | $C_5H_{11}$ |
| 258 | $C_2H_5$ | Ph | Tz1 | — | Ph2M | 2 | L1 | Ph | H |
| 259 | $C_6H_{13}$ | Ph | Tz2 | — | Ph | 8 | L2 | Ph | H |
| 260 | $C_{10}H_{21}$ | Ph | Td | — | Ph | 2 | LM1 | Ph | $C_6H_{13}$ |
| 261 | $C_{10}H_{21}$ | — | Ph | — | Py1 | 2 | L1 | Ph | H |
| 262 | $C_6H_{13}$ | — | Ph | — | Py1 | 3 | L2 | Ph | $C_6H_{13}$ |
| 263 | $C_6H_{13}OCO$ | — | Ph | — | Py1 | 2 | L1 | Ph | H |
| 264 | $C_7H_{15}$ | — | — | — | Pr2 | 2 | L1 | Ph | $C_6H_{13}$ |
| 265 | $C_9H_{19}$ | — | Ph | — | Pr2 | 6 | L2 | Ph | H |
| 266 | $C_3H_7$ | — | Ph | — | Pr2 | 2 | L1 | Ph | $OCH_3$ |
| 267 | $C_5H_{11}O$ | — | — | — | Cy | 6 | L1 | Ep1 | H |
| 268 | $C_4H_9$ | — | Ph | —$CH_2O$— | Cy | 2 | L1 | Ph | $C_7H_{15}$ |
| 269 | $C_{12}H_{25}$ | — | Ph | — | Cy | 4 | L2 | Ph | H |
| 270 | $C_6H_{13}C\equiv C$ | — | Ph | — | Pa | 2 | L1 | Ph | H |
| 271 | $C_8H_{17}O$ | — | Ph | — | Pd | 8 | L2 | Ph | $C_5H_{11}$ |
| 272 | $C_3H_7$ | — | Ph2C1 | — | Tn | 2 | L1 | Ph | H |
| 273 | $C_4H_9$ | — | Ph | — | Tn | 2 | L1 | Ph | H |
| 274 | $C_8H_{17}$ | — | Ph | — | Tz1 | 2 | L1 | Ph | H |
| 275 | $C_4H_9OCH(CH_3)COO$ | — | Ph | — | Tz1 | 6 | L1 | Ph | $C_5H_{11}$ |
| 276 | $C_6H_{13}$ | — | Ph2F | — | Td | 2 | L1 | Ph | $C_6H_{13}$ |
| 277 | $C_5H_{11}$ | — | — | — | Np | 2 | L1 | Gp1 | H |
| 278 | $C_8H_{17}OCH_2CH_3$ | — | Ph | — | Np | 5 | L2 | Ph | $C_5H_{11}$ |
| 279 | $C_{11}H_{23}$ | — | Ph | — | Np | 2 | L1 | Ph | $C_6H_{13}$ |
| 280 | $C_5H_{11}$ | — | — | — | Ep1 | 2 | L1 | Ph | $OC_4H_9$ |
| 281 | $CH_3$ | — | Ph | — | Ep1 | 7 | L2 | Ph | $C_7H_{15}$ |
| 282 | $C_6H_{13}$ | — | Ph | — | Ep1 | 2 | L1 | Ph | H |
| 283 | $C_9H_{19}O$ | — | — | — | Gp1 | 2 | L1 | Ph | $C_6H_{13}$ |
| 284 | $C_8H_{17}$ | — | Ph | — | Gp1 | 4 | L1 | Ph | H |
| 285 | $C_3H_7COO$ | — | Ph | — | Gp1 | 8 | L2 | Ph | $OCH_3$ |
| 286 | $C_4H_9$ | — | Ph | — | Id1 | 2 | L1 | Ph | H |
| 287 | $C_{12}H_{25}$ | — | Ph | — | Io1 | 2 | L1 | Ph | $C_6H_{13}$ |
| 288 | $C_{10}H_{21}$ | — | Ph | — | Cm1 | 2 | L2 | Ph | H |
| 289 | $C_6H_{13}$ | — | Ph | — | Ph | 2 | L1 | Ph | $C_6H_{13}$ |
| 290 | $C_{10}H_{21}$ | — | Py2 | — | Ph | 2 | LM1 | — | $C_7H_{15}$ |
| 291 | $C_8H_{17}$ | — | Py2 | — | Ph | 4 | LM1 | — | $C_6H_{13}$ |
| 292 | $C_5H_{11}$ | — | Ph | — | Ph | 2 | LM1 | — | $C_5H_{11}$ |
| 293 | $C_6H_{13}$ | Py2 | Ph | — | Ph | 3 | LM1 | — | $C_8H_{17}$ |
| 294 | $C_7H_{15}$ | — | Ph | — | Ph | 6 | LM2 | — | $C_8H_{17}$ |
| 295 | $C_{10}H_{21}$ | Py2 | Ph | — | Ph | 2 | LM2 | — | $C_6H_{13}$ |
| 296 | $C_6H_{13}$ | — | — | — | Ph | 10 | L2 | — | $C_8H_{17}$ |
| 297 | $C_8H_{17}O$ | — | — | — | Ph | 8 | L2 | — | $C_{18}H_{37}$ |
| 298 | $C_5H_{11}O$ | — | — | — | Ph2F | 6 | L2 | — | $C_6H_{13}$ |
| 299 | $CH_3O$ | — | Ph | — | Ph | 4 | L2 | — | $C_6H_{13}$ |
| 300 | $C_7H_{15}O$ | — | Ph | — | Ph23F | 12 | L2 | — | $C_6H_{13}$ |
| 301 | $C_6H_{13}$ | — | Ph | —$OCH_2$— | Ph | 4 | L2 | — | $C_6H_{19}$ |
| 302 | $C_8H_{17}O$ | — | Ph | —COO— | Ph | 8 | L2 | — | $C_6H_{13}$ |
| 303 | $C_8H_{17}$ | — | Pr1 | — | Ph | 9 | L2 | — | $C_8H_{17}$ |
| 304 | $C_{10}H_{21}$ | — | Pr2 | — | Ph | 6 | L2 | — | $C_4H_9$ |
| 305 | $C_{11}H_{23}$ | — | Pr2 | — | Ph | 4 | L2 | — | $C_6H_{13}$ |
| 306 | $C_{12}H_{25}$ | — | Pr2 | —COO— | Ph | 5 | L2 | — | $C_8H_{17}$ |
| 307 | $C_4H_9O$ | — | Py1 | — | Ph | 6 | L2 | — | $C_{10}H_{21}$ |
| 308 | $C_{13}H_{27}$ | — | Py2 | — | Ph | 2 | L2 | — | $C_5H_{11}$ |
| 309 | $C_6H_{13}O$ | — | Py2 | — | Ph | 4 | L2 | — | $C_8H_{17}$ |
| 310 | $C_5H_{11}O$ | — | Py2 | — | Ph23F | 8 | L2 | — | $C_4H_9$ |
| 311 | $C_{10}H_{21}$ | — | Py2 | — | Ph | 2 | L2 | — | $C_6H_{13}$ |
| 312 | $C_8H_{17}$ | — | Py2 | — | Ph3F | 7 | L2 | — | $C_7H_{15}$ |
| 313 | $C_6H_{13}$ | — | Cy | — | Ph | 8 | L2 | — | $C_3H_5OC_4H_9$ |
| 314 | $C_6H_{13}OCO$ | — | Cy | — | Ph | 2 | L2 | — | $C_{14}H_{29}$ |
| 315 | $C_6H_{13}$ | — | Cy | —CH=CH— | Ph | 5 | L2 | — | $C_{10}H_{21}$ |
| 316 | $C_3H_7$ | — | Cy | —COO— | Ph | 6 | L2 | — | $C_6H_{13}$ |
| 317 | $C_5H_{11}$ | — | Pa | — | Ph | 4 | L2 | — | $C_8H_{17}$ |
| 318 | $C_{10}H_{21}$ | — | Pd | — | Ph | 5 | L2 | — | $C_6H_{13}$ |
| 319 | $C_6H_{13}$ | — | Dt2 | — | Ph | 3 | L2 | — | $(CH_2)_2CH=CH_3$ |
| 320 | $C_8H_{17}$ | — | Tn | — | Ph | 8 | L2 | — | $C_9H_{19}$ |
| 321 | $C_5H_{11}$ | — | Tz1 | — | Ph | 6 | L2 | — | $C_8H_{17}$ |

TABLE 1-continued $$R_3-A_3-A_4-X_3-A_5-(CH_2)_{n3}-L-A_3'-R_4 \quad (III)$$

| No. | $R_3$ | $A_3$ | $A_4$ | $X_3$ | $A_5$ | $n^3$ | L | $A_3'$ | $R_4$ |
|---|---|---|---|---|---|---|---|---|---|
| 322 | $C_9H_{19}O$ | — | Tz2 | — | Ph | 4 | L2 | — | $C_5H_{11}$ |
| 323 | $C_2H_5$ | — | Td | — | Ph | 8 | L2 | — | $C_8H_{17}$ |
| 324 | $C_{10}H_{21}$ | — | Dx2 | — | Ph | 10 | L2 | — | $C_5H_{15}$ |
| 325 | $C_6H_{13}$ | — | Boa2 | — | Ph | 11 | L2 | — | $C_{10}H_{21}$ |
| 326 | $C_7H_{15}$ | — | Bob2 | — | Ph | 2 | L2 | — | $C_6H_{13}$ |
| 327 | $C_{16}H_{33}O$ | — | Bta2 | — | Ph | 4 | L2 | — | $C_6H_{13}$ |
| 328 | $C_6H_{13}$ | — | Btb2 | — | Ph | 6 | L2 | — | $C_{14}H_{29}$ |
| 329 | $C_5H_{11}$ | — | Np | —COO— | Ph | 8 | L2 | — | $C_7H_{15}$ |
| 330 | $C_4H_9$ | — | Ep2 | — | Ph | 2 | L2 | — | $C_6H_{13}$ |
| 331 | $C_6H_{13}$ | — | Gp1 | — | Ph | 3 | L2 | — | $C_{12}H_{25}$ |
| 332 | $C_7H_{15}$ | — | Gp2 | — | Ph | 6 | L2 | — | $C_6H_{13}$ |
| 333 | $C_6H_{13}$ | — | Cm1 | — | Ph | 4 | L2 | — | $C_8H_{17}$ |
| 334 | $C_8H_{17}$ | — | Io1 | — | Ph | 8 | L2 | — | $C_6H_{13}$ |
| 335 | $C_{20}H_{41}$ | — | Id1 | —COO— | Ph | 10 | L2 | — | $C_4H_9$ |
| 336 | $C_{11}H_{23}$ | — | Id1 | — | Ph | 2 | L2 | — | $C_8H_{17}$ |
| 337 | $C_8H_{17}$ | — | Id1 | — | Ph | 4 | L2 | — | $C_8H_{17}$ |
| 338 | $C_5H_{11}$ | — | Id1 | — | Ph2F | 6 | L2 | — | $C_6H_{13}$ |
| 339 | $C_6H_{13}$ | — | Tn | — | Ph | 18 | L2 | — | $C_7H_{15}$ |
| 340 | $C_4H_9O$ | — | Tz2 | — | Ph | 9 | L2 | — | $C_9H_{19}$ |
| 341 | $C_{12}H_{25}$ | — | Btb2 | — | Ph | 8 | L2 | — | $C_6H_{13}$ |
| 342 | $C_6H_{13}O$ | — | Btb2 | — | Ph | 5 | L2 | — | $C_9H_{19}$ |
| 343 | $CH_2=CH(CH_2)_8O$ | — | Ep2 | — | Ph | 4 | L2 | — | $C_6H_{13}$ |
| 344 | $C_9H_{19}$ | — | Gp2 | — | Ph | 4 | L2 | — | $C_5H_{11}$ |
| 345 | $C_5H_{11}O$ | — | Np | — | Ph | 6 | L2 | — | $C_{10}H_{21}$ |
| 346 | $C_6H_{13}$ | Ph | Ph | — | Ph | 2 | L2 | — | $C_3H_7$ |
| 347 | $C_3H_7$ | Py2 | Ph | — | Ph | 2 | L2 | — | $C_8H_{17}$ |
| 348 | $C_5H_{11}$ | — | Ha2 | — | Ph | 5 | L2 | — | $C_{11}H_{23}$ |
| 349 | $C_6H_{13}$ | Ph | Pr2 | — | Ph | 6 | L2 | — | $C_5H_{11}$ |
| 350 | $C_9H_{19}$ | Ph | Pr1 | — | Ph | 8 | L2 | — | $C_5H_{11}$ |
| 351 | $C_{13}H_{27}$ | Ph | Cy | — | Ph3Br | 9 | L2 | — | $C_7H_{15}$ |
| 352 | $C_{10}H_{21}O$ | Ph | Py1 | — | Ph | 4 | L2 | — | $C_6H_{13}$ |
| 353 | $C_7H_{15}$ | Ph | Py2 | — | Ph | 6 | L2 | — | $C_{10}H_{21}$ |
| 354 | $C_4H_9$ | Ph3TF | Pa | — | Ph | 7 | L2 | — | $(CH_2)_6CH(CH_3)_2$ |
| 355 | H | — | Hb2 | — | Ph | 8 | L2 | — | $C_8H_{17}$ |
| 356 | $C_8H_{17}$ | Ph | Tn | — | Ph | 8 | L2 | — | $C_5H_{11}$ |
| 357 | $C_2H_5$ | Ph | Tz1 | — | Ph2M | 3 | L2 | — | $C_3H_7$ |
| 358 | $C_6H_{13}$ | Ph | Tz2 | — | Ph | 4 | L2 | — | $C_6H_{13}$ |
| 359 | $C_{10}H_{21}$ | Ph | Td | — | Ph | 6 | L2 | — | $C_7H_{16}$ |
| 360 | $C_{10}H_{21}$ | — | Ph | — | Py1 | 2 | L2 | — | $C_6H_{13}$ |
| 361 | $C_6H_{13}$ | — | Ph | — | Py1 | 4 | L2 | — | $C_6H_{13}$ |
| 362 | $C_6H_{13}OCO$ | — | Ph | — | Py1 | 6 | L2 | — | $C_5H_{11}$ |
| 363 | $C_7H_{15}$ | — | — | — | Pr2 | 4 | L2 | — | $C_{10}H_{21}$ |
| 364 | $C_9H_{19}$ | — | Ph | — | Pr2 | 8 | L2 | — | $C_8H_{17}$ |
| 365 | $C_3H_7$ | — | Ph | — | Pr2 | 11 | L2 | — | $C_6H_{13}$ |
| 366 | $C_5H_{11}O$ | — | — | — | Cy | 4 | L2 | — | $C_4H_9$ |
| 367 | $C_4H_9$ | — | Ph | —$CH_2O$— | Cy | 6 | L2 | — | $C_7H_{15}$ |
| 368 | $C_{12}H_{25}$ | — | Ph | — | Cy | 8 | L2 | — | $C_3H_7$ |
| 369 | $C_6H_{13}C\equiv C$ | — | Ph | — | Pa | 9 | L2 | — | $C_6H_{13}$ |
| 370 | $C_8H_{17}$ | — | Ph | — | Ph | 4 | L2 | — | $C_5H_{11}$ |
| 371 | $C_3H_7$ | — | Ph2C1 | — | Tn | 5 | L2 | — | $C_{10}H_{21}$ |
| 372 | $C_4H_9$ | — | Ph | — | Tn | 6 | L2 | — | $C_7H_{15}$ |
| 373 | $C_8H_{17}$ | — | Ph | — | Tz1 | 8 | L2 | — | $C_{12}H_{25}$ |
| 374 | $C_4H_9OCH(CH_3)COO$ | — | Ph | — | Tz1 | 4 | L2 | — | $C_5H_{11}$ |
| 375 | $C_6H_{13}$ | — | Ph2F | — | Td | 6 | L2 | — | $CH_2CH(CH_3)C_6H_{13}$ |
| 376 | $C_5H_{11}$ | — | — | — | Np | 8 | L2 | — | $C_6H_{19}$ |
| 377 | $C_8H_{17}OCH_2CH_2$ | — | Ph | — | Np | 7 | L2 | — | $C_5H_{11}$ |
| 378 | $C_{11}H_{23}$ | — | Ph | — | Np | 10 | L2 | — | $C_6H_{13}$ |
| 379 | $C_5H_{11}$ | — | — | — | Ep1 | 15 | L2 | — | $C_4H_9$ |
| 380 | $CH_3$ | — | Ph | — | Ep1 | 2 | L2 | — | $C_7H_{15}$ |
| 381 | $C_6H_{13}$ | — | Ph | — | Ep1 | 4 | L2 | — | $C_6H_{13}$ |
| 382 | $C_9H_{19}O$ | — | — | — | Gp1 | 14 | L2 | — | $C_8H_{17}$ |
| 383 | $C_8H_{17}$ | — | Ph | — | Gp1 | 3 | L2 | — | $C_{10}H_{21}$ |
| 384 | $C_3H_7COO$ | — | Ph | — | Gp1 | 4 | L2 | — | $C_{11}H_{23}$ |
| 385 | $C_4H_9$ | — | Ph | — | Id1 | 6 | L2 | — | $C_7H_{15}$ |
| 386 | $C_{12}H_{25}$ | — | Ph | — | Io1 | 8 | L2 | — | $C_6H_{13}$ |
| 387 | $C_{10}H_{21}$ | — | Ph | — | Cm1 | 4 | L2 | — | $C_5H_{11}$ |
| 388 | $C_3H_7$ | Ph | Ph | — | Py1 | 8 | L2 | — | $C_7H_{15}$ |
| 389 | $C_4H_9$ | Ph2CN | Ph | — | Pr1 | 3 | L2 | — | $C_4H_9$ |
| 390 | $C_5H_{11}$ | Ph | Ph3F | — | Tz1 | 8 | L2 | — | $C_3H_7$ |
| 391 | CN | Ph | Ph | — | Tn | 4 | L2 | — | $CH_3$ |
| 392 | $C_7H_{15}$ | Tn | Ph | — | Py1 | 6 | L2 | — | $C_8H_{17}$ |
| 393 | $C_{10}H_{11}$ | Ph | Ph | — | Cy | 8 | L2 | — | $C_6H_{13}$ |
| 394 | $C_5H_{11}O$ | — | Ph | — | Ph | 4 | L2 | Ph | CN |
| 395 | $C_{10}H_{21}$ | — | Py2 | — | Ph | 8 | L2 | — | $CH_3$ |
| 396 | $C_8H_{17}$ | — | Id1 | — | Ph | 2 | L1 | Ph | $OCH_3$ |

TABLE 1-continued $$R_3-A_3-A_4-X_3-A_5-(CH_2)_{n3}-L-A_3'-R_4 \text{ (III)}$$

| No. | $R_3$ | $A_3$ | $A_4$ | $X_3$ | $A_5$ | $n^3$ | L | $A_3'$ | $R_4$ |
|---|---|---|---|---|---|---|---|---|---|
| 397 | $C_{10}H_{21}$ | — | Py2 | — | Ph | 2 | L1 | — | $(CH_2)_5CH=CH_3$ |
| 398 | $C_{10}H_{21}$ | — | Py2 | — | Ph | 2 | L1 | — | $CH_2OC_6H_{13}$ |
| 399 | $C_8H_{17}$ | — | Ep2 | — | Ph | 2 | L1 | — | $C_6H_{13}$ |
| 400 | $C_8H_{17}$ | — | Gp2 | — | Ph | 4 | L1 | — | $C_6H_{13}$ |
| 401 | $C_{10}H_{21}O$ | — | Py2 | — | Ph | 2 | L1 | — | $C_6H_{13}$ |
| 402 | $C_{10}H_{21}O$ | — | Py2 | — | Ph | 2 | L1 | — | $C_5H_{11}$ |
| 403 | $C_{10}H_{21}O$ | — | Py2 | — | Ph | 2 | L1 | — | $C_8H_{17}$ |
| 404 | $C_8H_{17}$ | — | Py2 | — | Ph | 2 | L1 | — | $C_8H_{17}$ |
| 405 | $C_8H_{17}$ | — | Py2 | — | Ph | 2 | L1 | — | $C_6H_{13}$ |
| 406 | $C_8H_{17}$ | — | Py2 | — | Ph | 2 | L1 | — | $C_5H_{11}$ |
| 407 | $C_{10}H_{21}O$ | — | Py2 | — | Ph | 4 | L1 | — | $C_6H_{13}$ |
| 408 | $C_{10}H_{21}O$ | — | Py2 | — | Ph | 5 | L1 | — | $C_6H_{13}$ |
| 409 | La1 (0.6) $CH_2CH_2$ | — | Py2 | — | Ph | 2 | L1 | — | $C_6H_{13}$ |
| 410 | La2 (0.6) $CH_2O$ | — | Ph | — | Ph | 4 | L1 | — | $C_6H_{13}$ |
| 411 | Lc1 (0.5) | — | Ph | — | Ph | 2 | L1 | — | $C_7H_{15}$ |
| 412 | Lc2 (1.1) OCO | — | Ph | — | Ph | 5 | L1 | — | $C_{10}H_{21}$ |
| 413 | Pla —OCO | — | Ph | — | Ph | 2 | L2 | — | $C_6H_{13}$ |
| 414 | Thf (0) —COO | — | Ph | — | Ph | 2 | L1 | — | $C_{10}H_{21}$ |
| 415 | Dp (2) —$CH_2O$ | — | Ph | — | Ph | 6 | L2 | — | $C_{10}H_{21}$ |
| 416 | Ox (3) —$CH_2O$ | — | Ph | — | Ph | 2 | L1 | — | $C_8H_{17}$ |
| 417 | Ox (4) —COO | — | Ph | — | Ph | 8 | L2 | — | $C_6H_{13}$ |
| 418 | La1 (0.6) | — | Ph | — | Ph | 2 | L1 | — | $C_4H_9$ |

The optically active compound of the formula (III) may preferably satisfy any one of the following conditions (IIIa), (IIIb) and (IIIc):

(IIIa) $A_3$ and $A_4$ are independently selected from a single bond;

1,4-phenylene capable of having one or two substituents comprising F, Cl, Br, $CH_3$, $CF_3$ and/or CN; pyridine-2,5-diyl; pyrimidine-2,5-diyl; pyrazine-2,5-diyl; pyridazine-3,6-diyl; 1,4-cyclohexylene; thiophene-2,5-diyl, thiazole-2,5-diyl; thiadiazole-2,5-diyl; benzoxazole-2,6-diyl; benzothiazole-2,5-diyl; benzothiazole-2,6-diyl; benzofuran-2,5-diyl; benzofuran-2,6-diyl; quinoxaline-2,6-diyl; quinoline-2,6-diyl; 2,6-naphthylene; indan-2,5-diyl; and coumaran-2,5-diyl; and $A_5$ is 1,4-phenylene capable of having one or two substituents comprising F, Cl, Br, $CH_3$, $CF_3$ and/or CN;

(IIIb) $X_3$ is A single bond;

$A_4$ is pyridine-2,5-diyl; pyrimidine-2,5-diyl; 1,4-cyclohexylene; thiophene-2,5-diyl; thiazole-2,5-diyl; thiadiazole-2,5-diyl; benzothiazole-2,6-diyl; quinoxaline-2,6-diyl; quinoline-2,6-diyl; 2,6-naphthylene; or indan-2,5-diyl; and $A_3$ is 1,4-phenylene capable of having one or two substituents comprising F, Cl, Br, $CH_3$, $CF_3$ and/or CN; and (IIIc) $A_3$ and $X_3$ are a single bond;

$A_4$ is pyrimidine-2,5-diyl or indan-2,5-diyl; and $A_5$ is 1,4-phenylene.

Formula (IV)

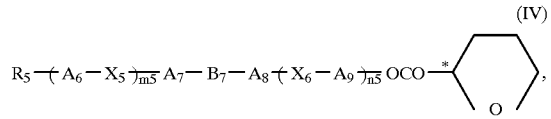

in which $R_5$ is a linear or branched alkyl group having 1–18 carbon atoms;

$A_6$ and $A_9$ independently denote 1,4-phenylene capable of having one or two substituents comprising F, Cl, Br, $CH_3$, $CF_3$ and/or CN; 1,4-cyclohexylene; pyrimidine-2,5-diyl; pyridine-2,5-diyl; thiadiazole-2,5-diyl; thiazole-2,5-diyl; thiophene-2,5-diyl; or 2,6-naphthylene;

$A_7$ and $A_8$ independently denote a single bond or any one of the groups for $A_6$ and $A_9$;

$B_7$ is benzoxazole-2,6-diyl, benzothiazole-2,5-diyl or benzothiazole-2,6-diyl;

$X_5$ and $X_6$ independently denote a single bond, —COO—, —OCO—, —$CH_2O$— or —$OCH_2$—;

m5 and n5 are independently 0 or 1; and

* denotes an optically active center.

The compound (b) of the formula (II) may be an optically active compound represented by the following formula (IV');

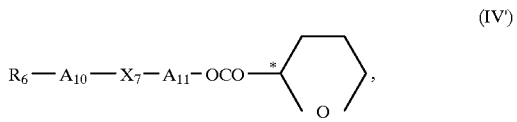

in which $R_6$ is a linear or branched alkyl group having 1–18 carbon atoms;

$A_{11}$ is 1,4-phenylene capable of having one or two substituents comprising F, Cl, Br, $CH_3$, $CF_3$ and/or CN; 1,4-cyclohexylene; pyrimidine-2,5-diyl; pyridine-2,5-diyl; thiadiazole-2,5-diyl; benzothiazole-2,6-diyl; thiophene-2,5-diyl; or 2,6-naphthylene;

$A_{10}$ is a single bond or any one of the groups for $A_{11}$;

$X_7$ is a single bond, —COO—, —OCO—, —$CH_2O$— or —$OCH_2$—; and

* denotes an optically active center.

Specific examples of the compound (b) of the formulae (IV) and (IV') may include those (Ex. Comp. Nos. IV-1 to IV-230) shown below.

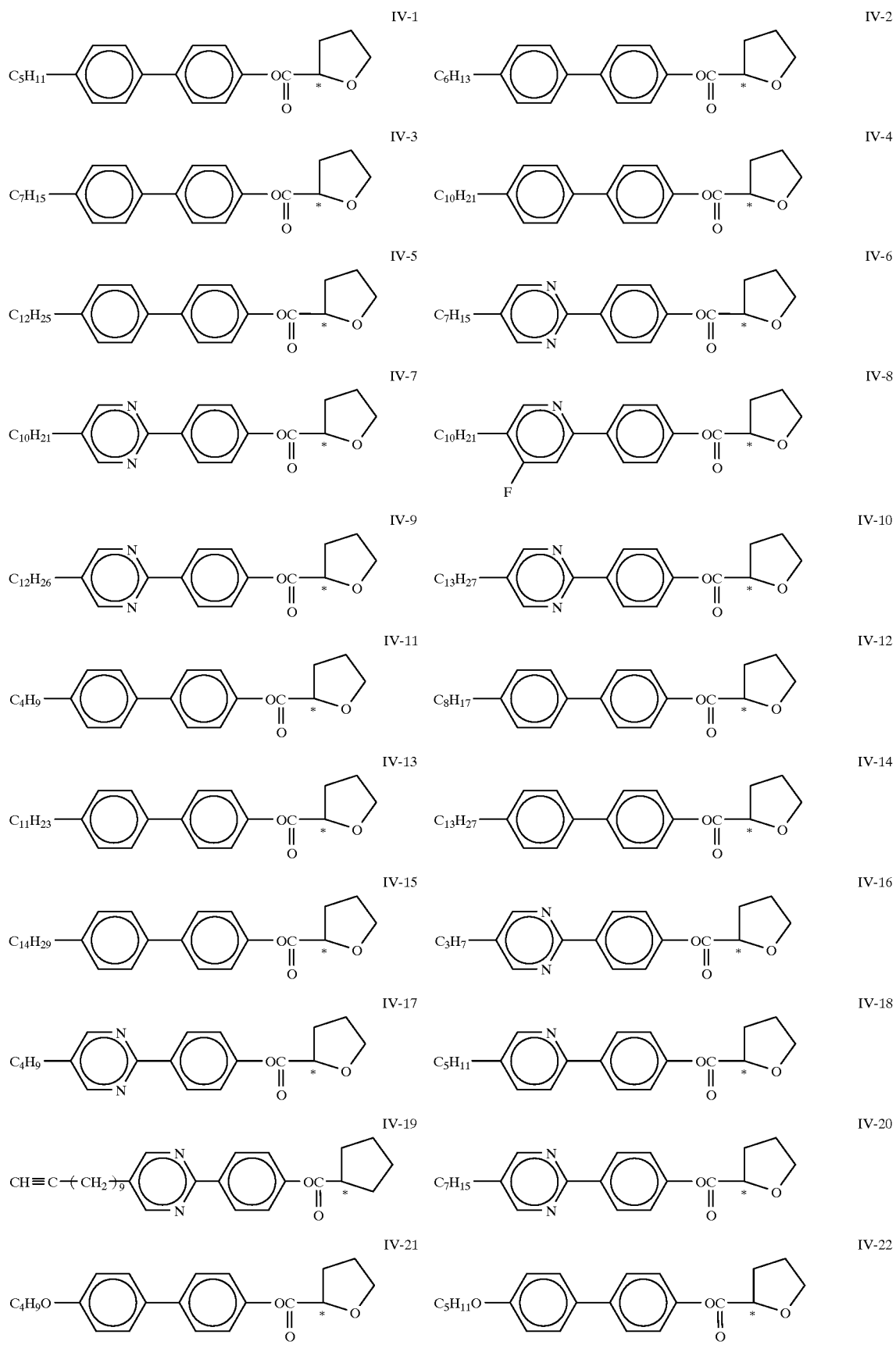

-continued
IV-23
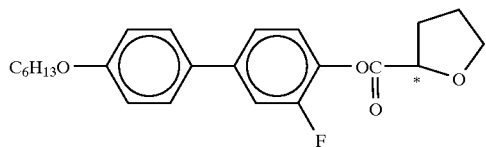
IV-24
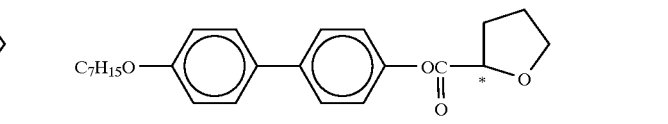
IV-25
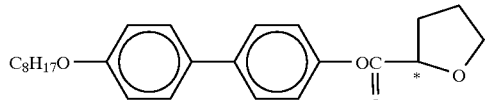
IV-26
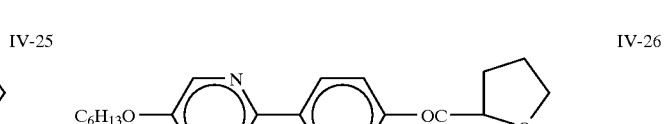
IV-27
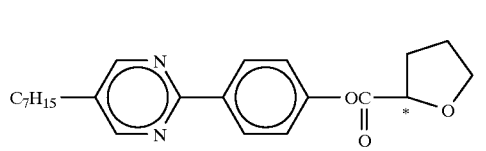
IV-28
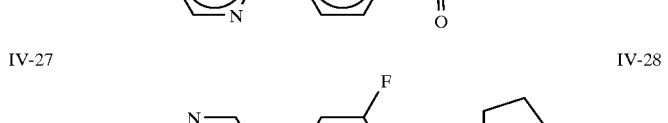
IV-29
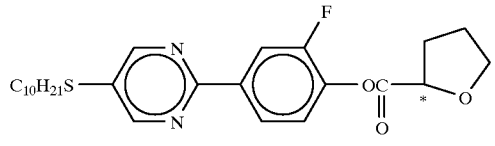
IV-30
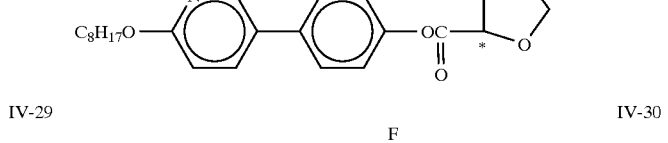
IV-31
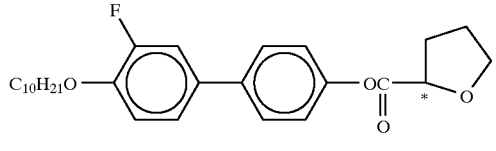
IV-32
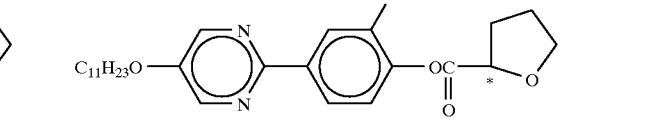
IV-33
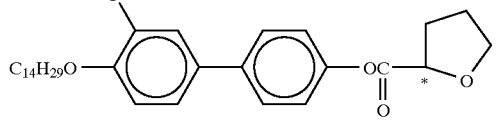
IV-34
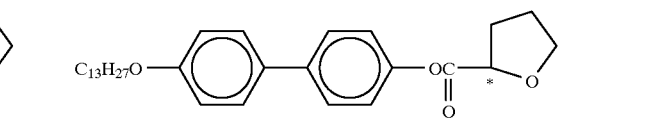
IV-35
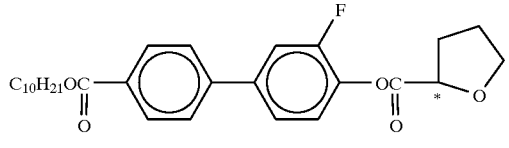
IV-36
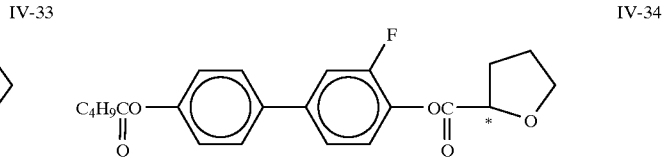
IV-37
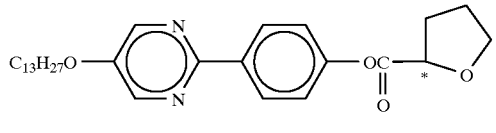
IV-38
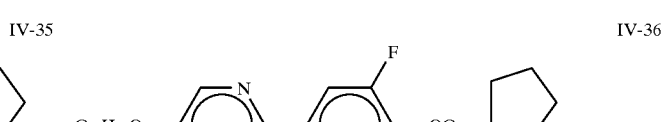
IV-39
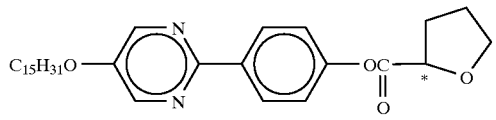
IV-40
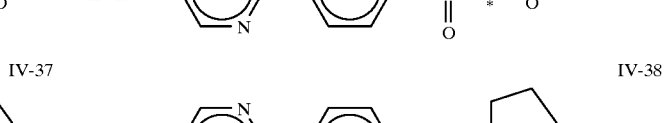
IV-41
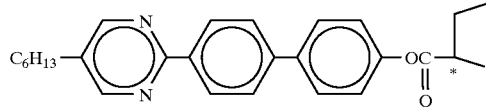
IV-42

-continued
IV-43
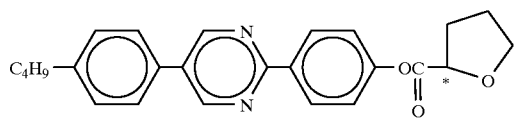
IV-44
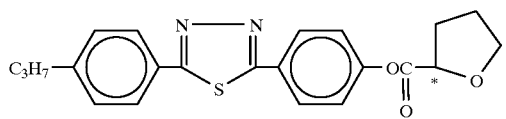
IV-45
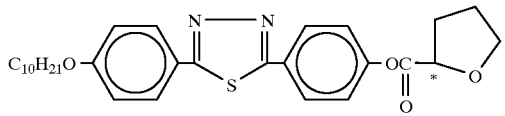
IV-46
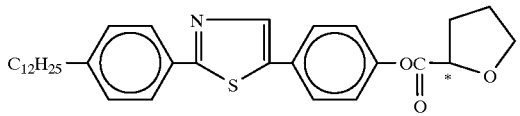
IV-47
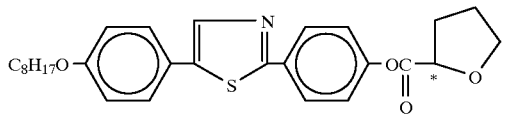
IV-48
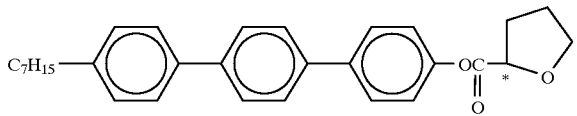
IV-49
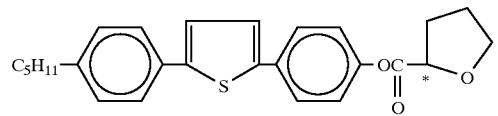
IV-50
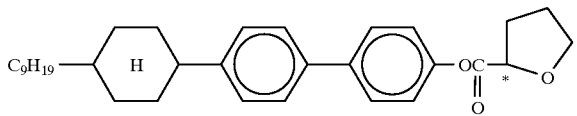
IV-51
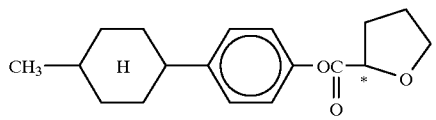
IV-52
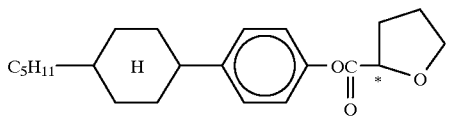
IV-53
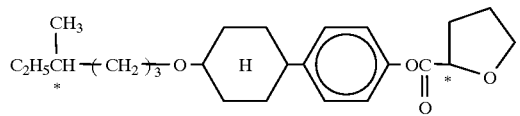
IV-54
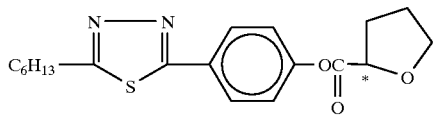
IV-55
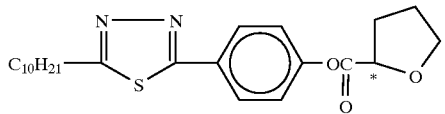
IV-56
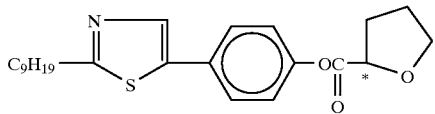
IV-57
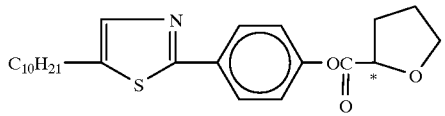
IV-58
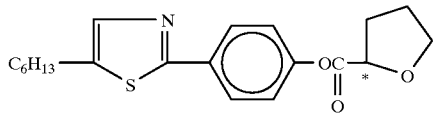
IV-59
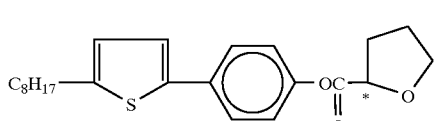
IV-60
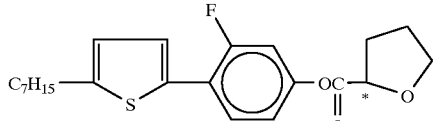
IV-61
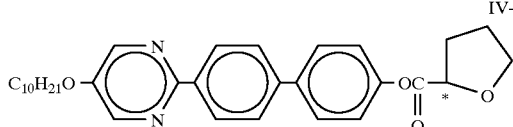
IV-62
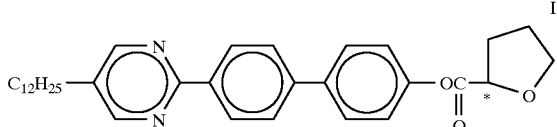
IV-63
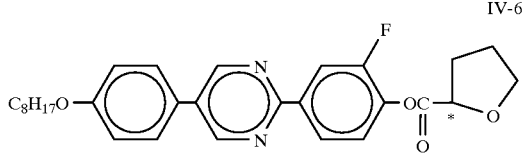
IV-64
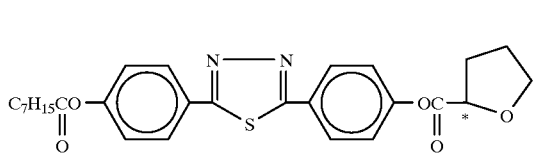

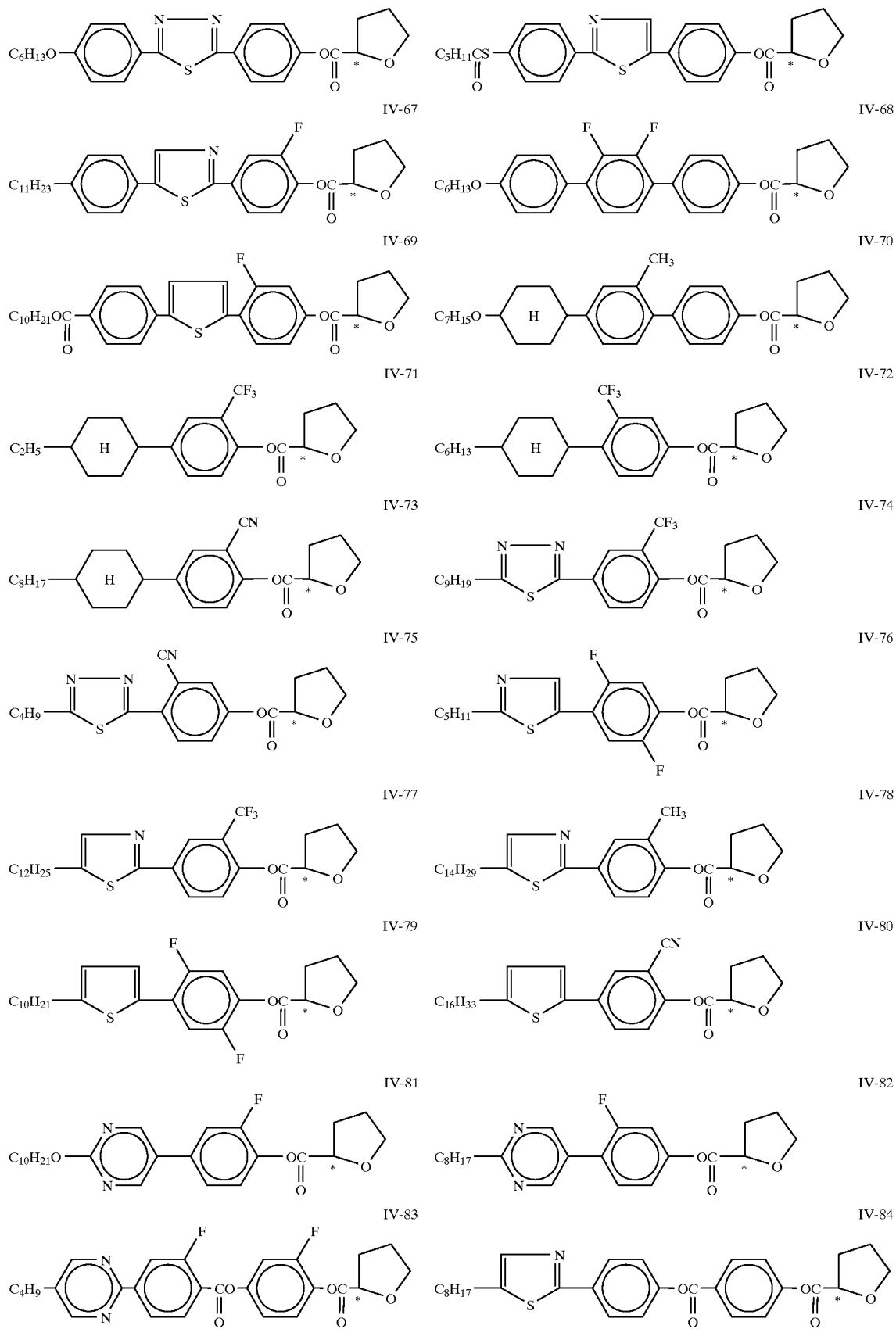

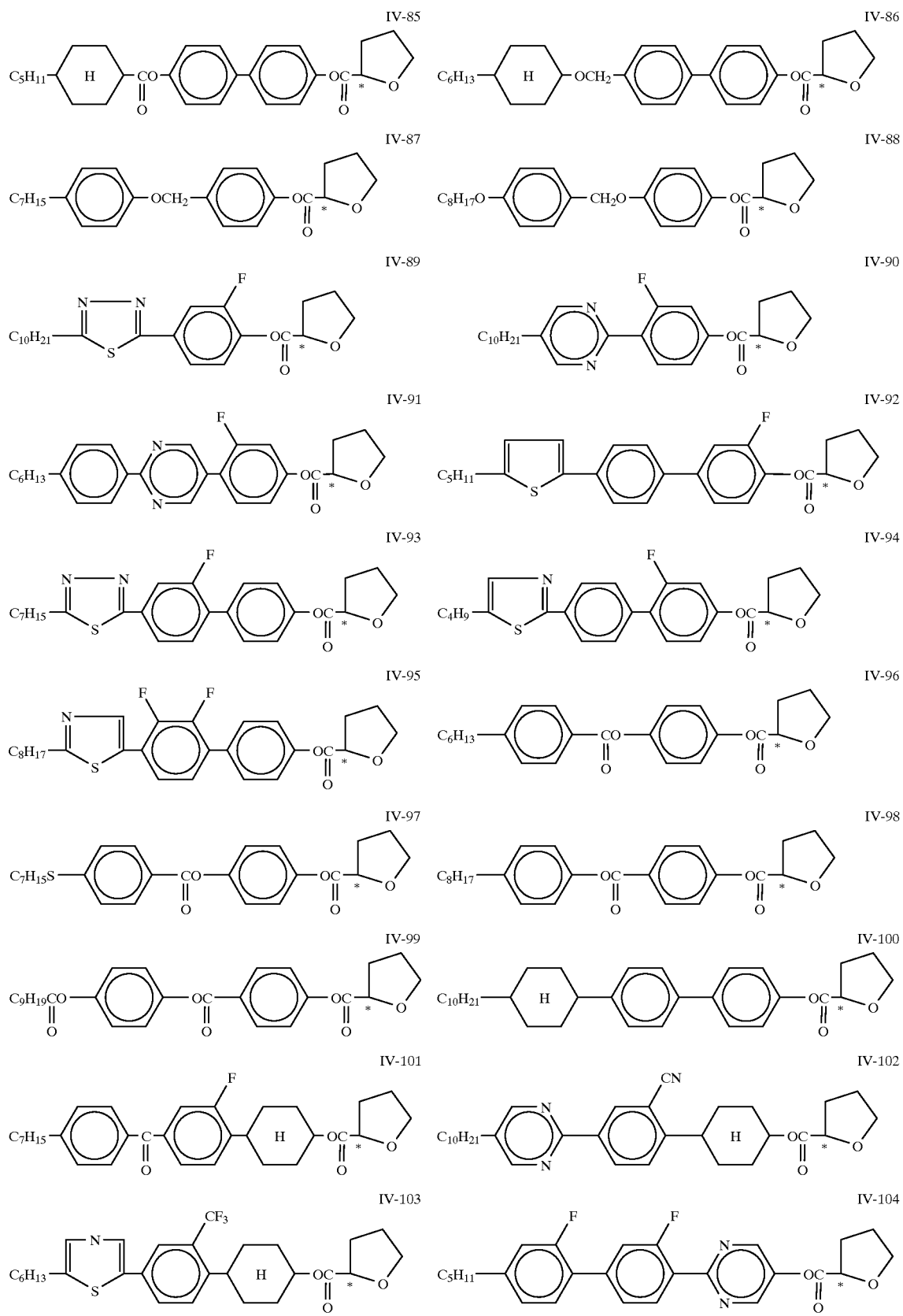

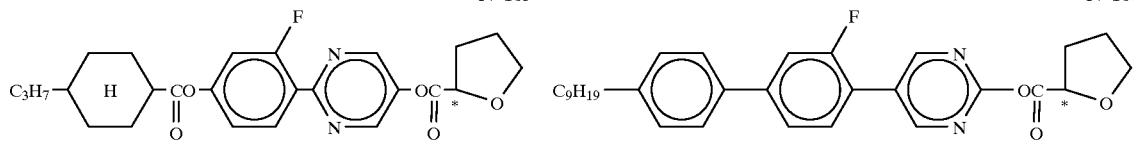
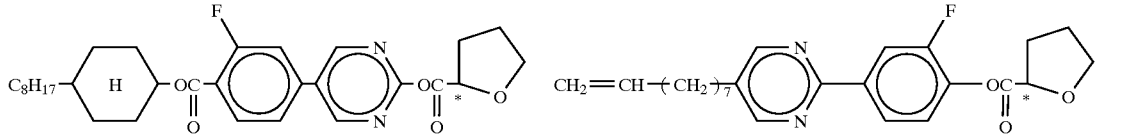
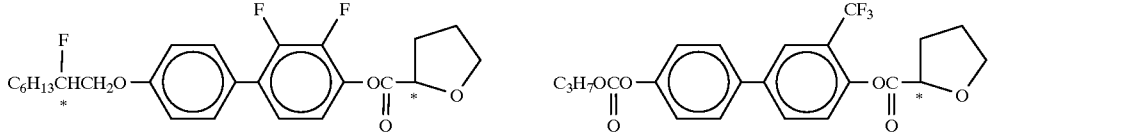
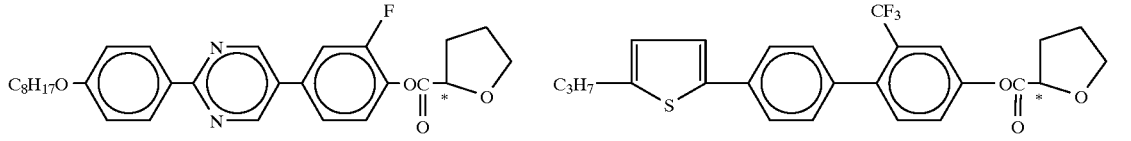
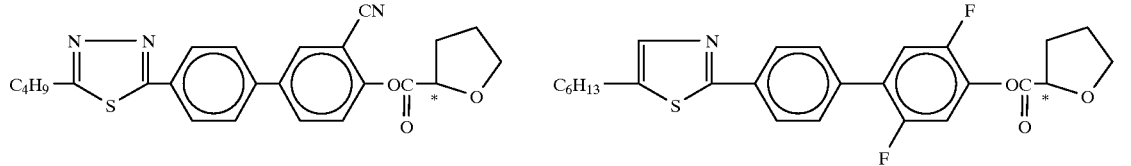
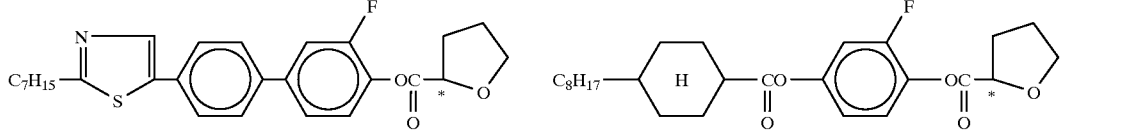
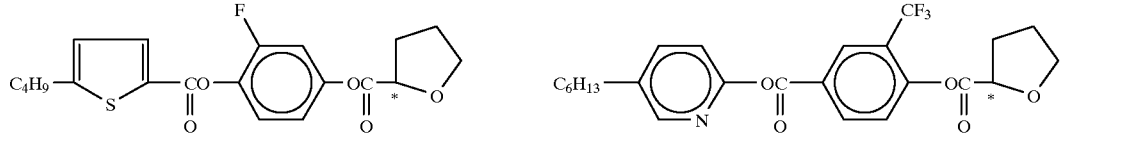
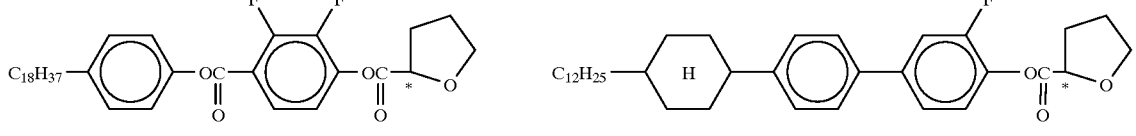
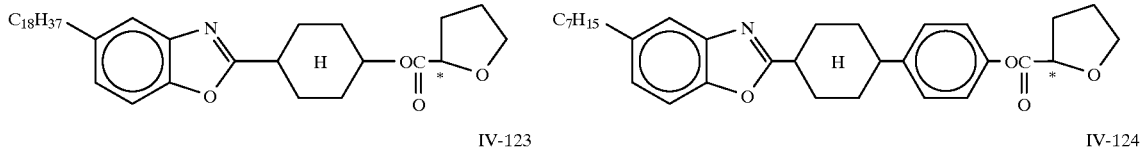
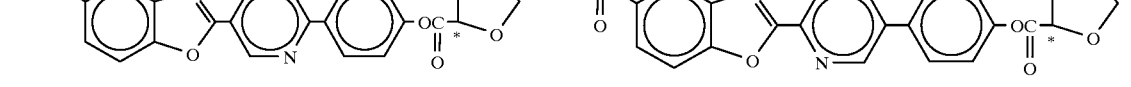

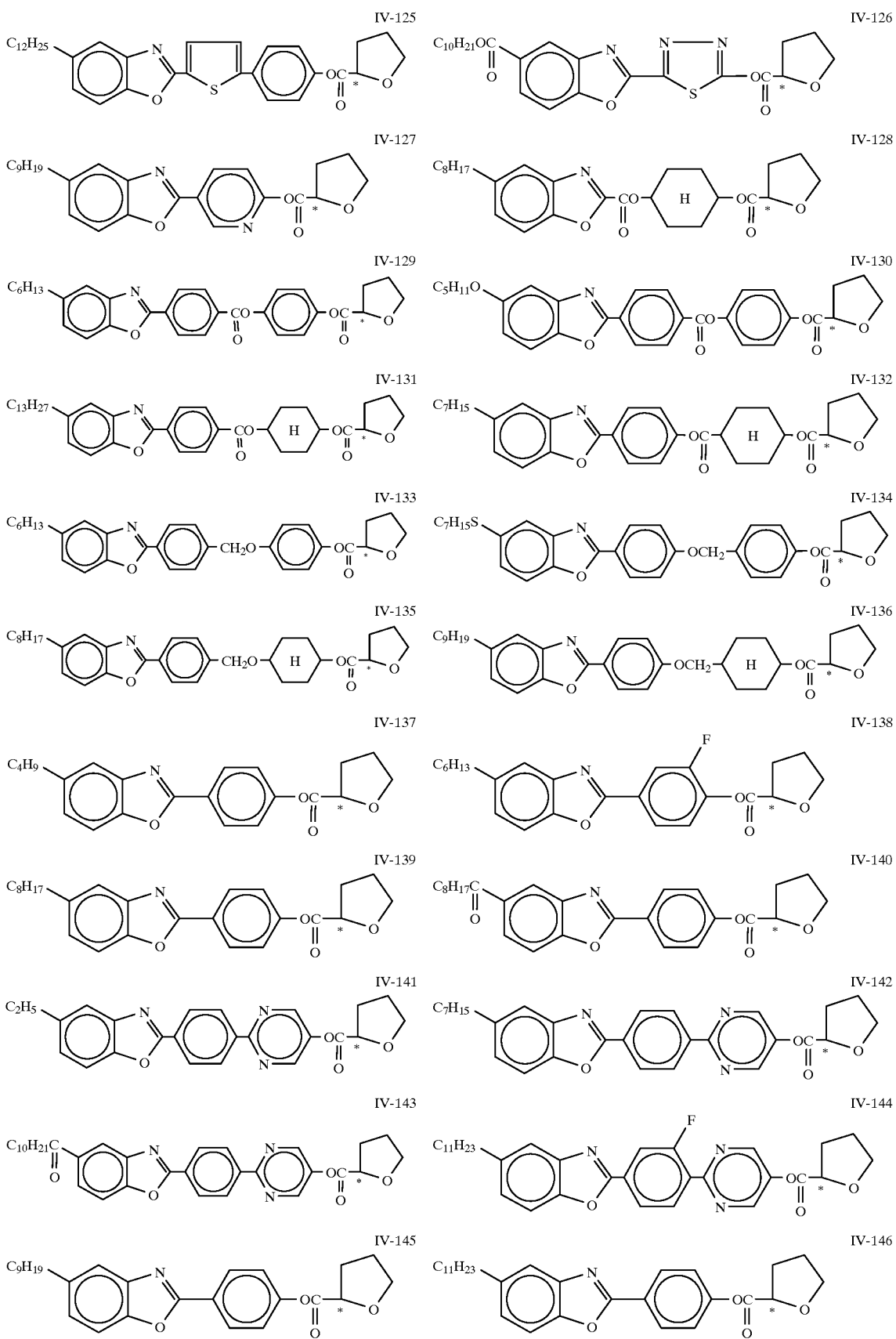

-continued
IV-147
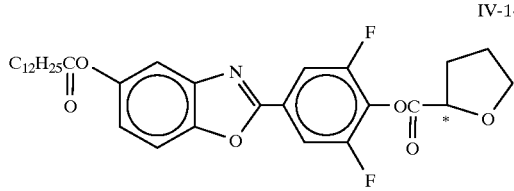
IV-148
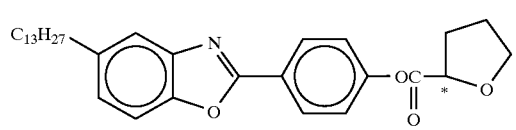
IV-149
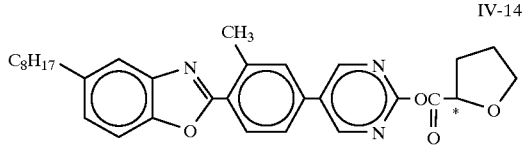
IV-150
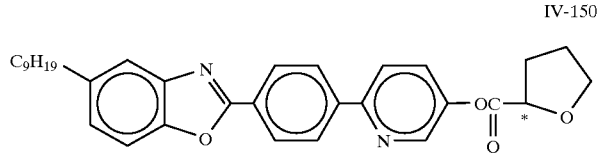
IV-151
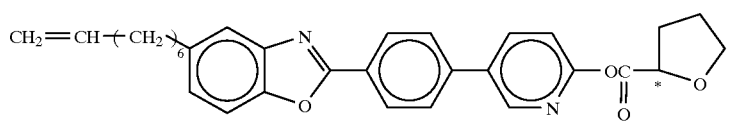
IV-152
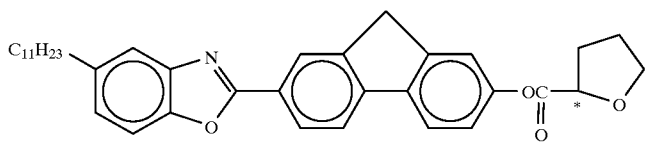
IV-153
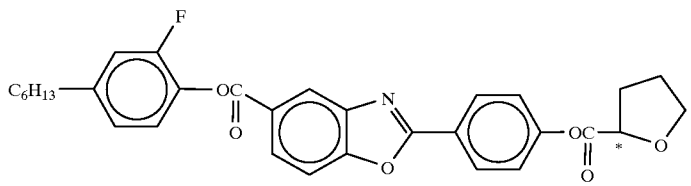
IV-154
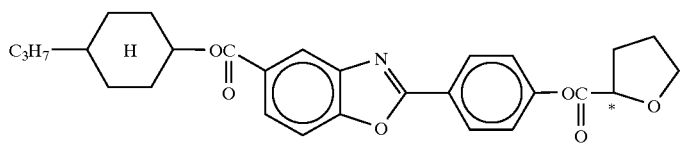
IV-155
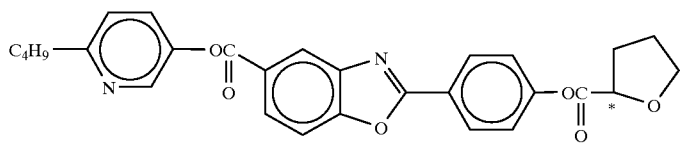
IV-156
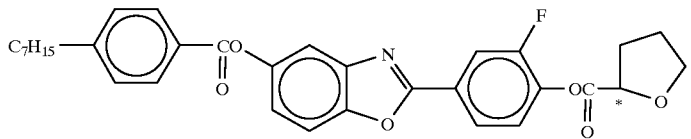
IV-157
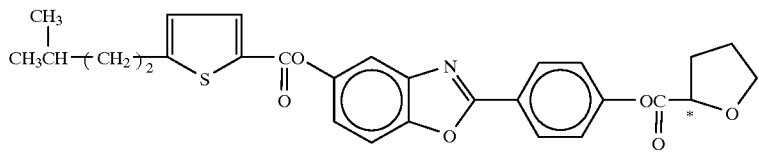

-continued
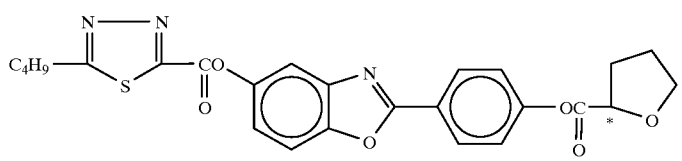
IV-158
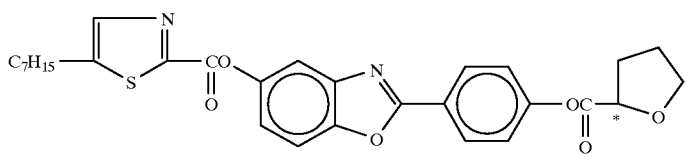
IV-159
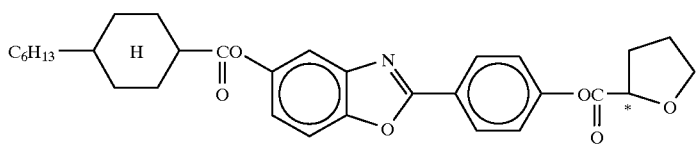
IV-160
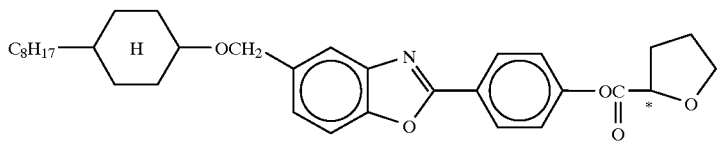
IV-161
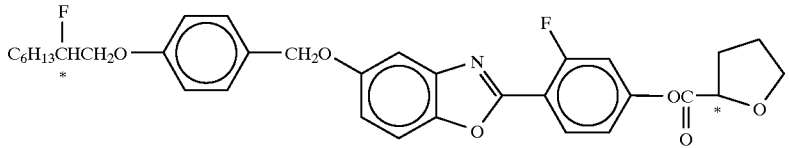
IV-162
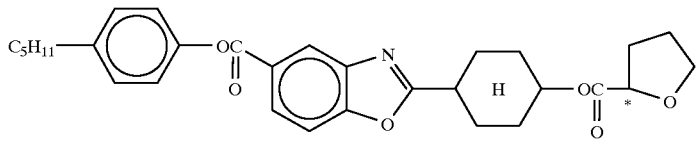
IV-163
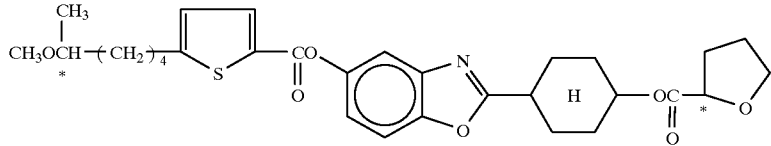
IV-164
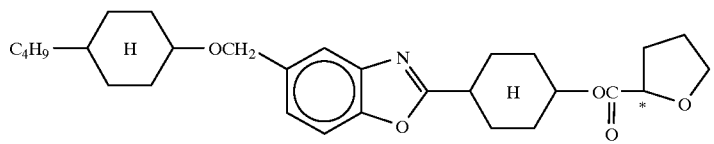
IV-165
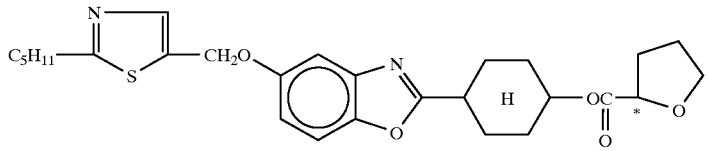
IV-166
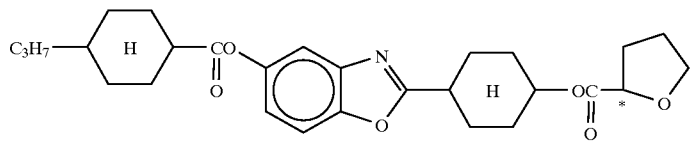
IV-167

-continued
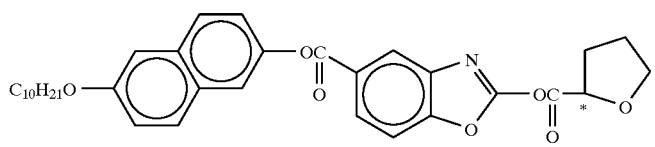
IV-168
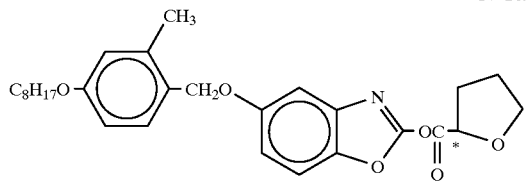
IV-169
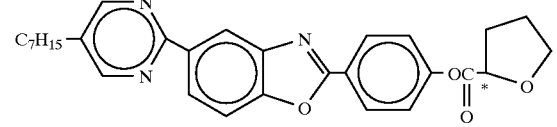
IV-170
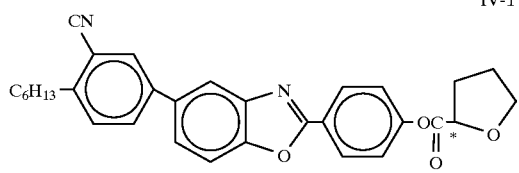
IV-171
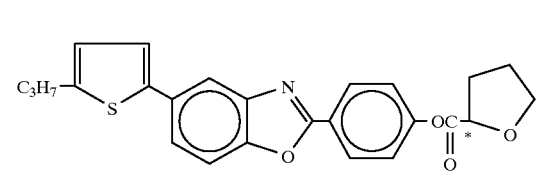
IV-172
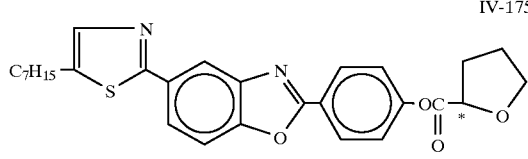
IV-173
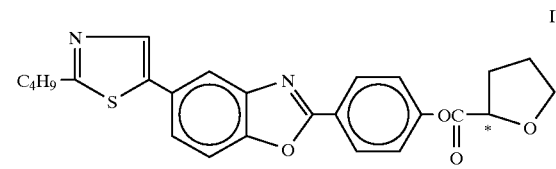
IV-174
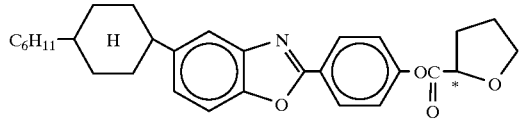
IV-175
IV-176
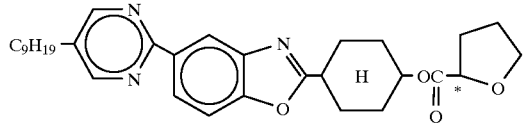
IV-177
IV-178
IV-179
IV-180
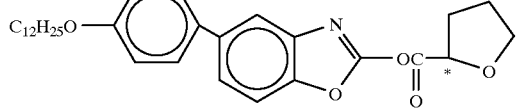
IV-181
IV-182
IV-183
IV-184

-continued
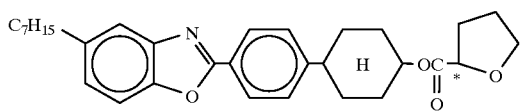
IV-185
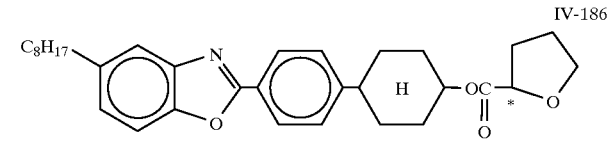
IV-186
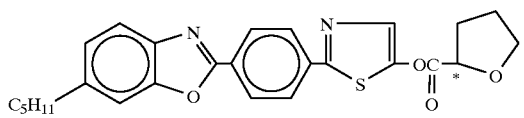
IV-187
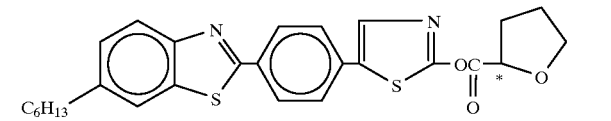
IV-188
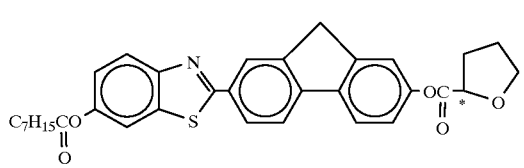
IV-189
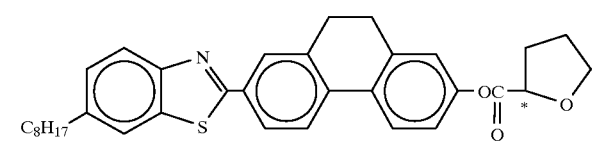
IV-190
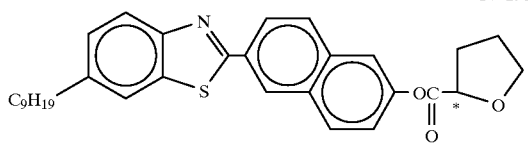
IV-191
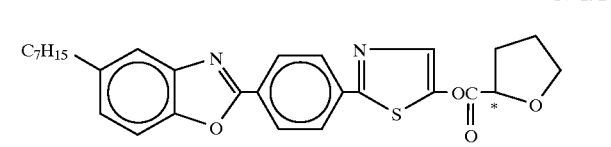
IV-192
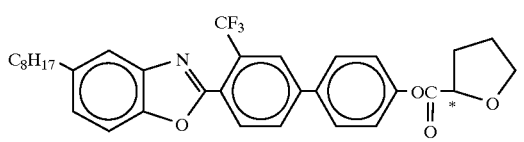
IV-193
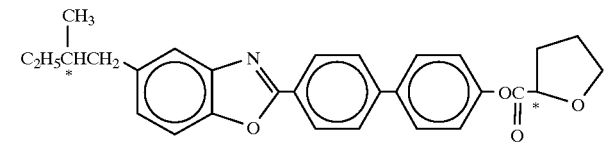
IV-194
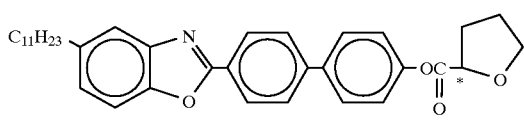
IV-195
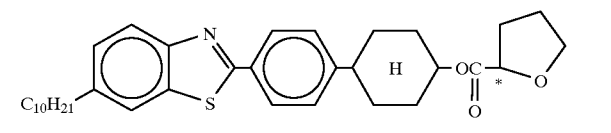
IV-196
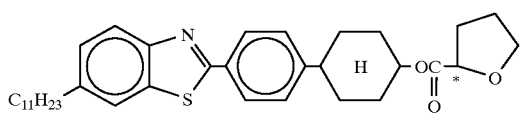
IV-197
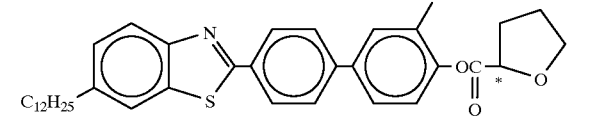
IV-198
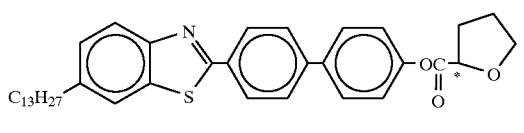
IV-199
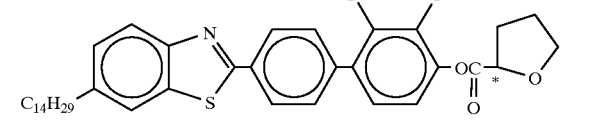
IV-200
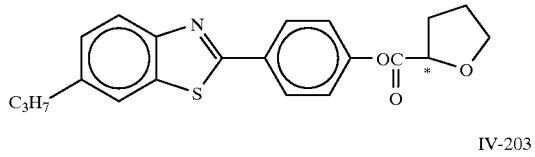
IV-201
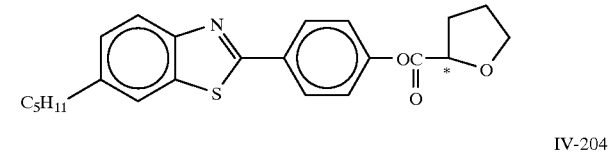
IV-202
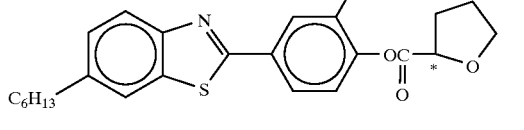
IV-203
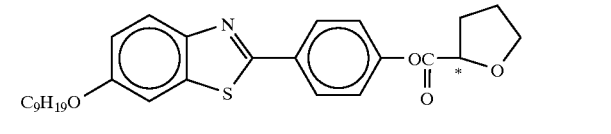
IV-204

-continued

-continued

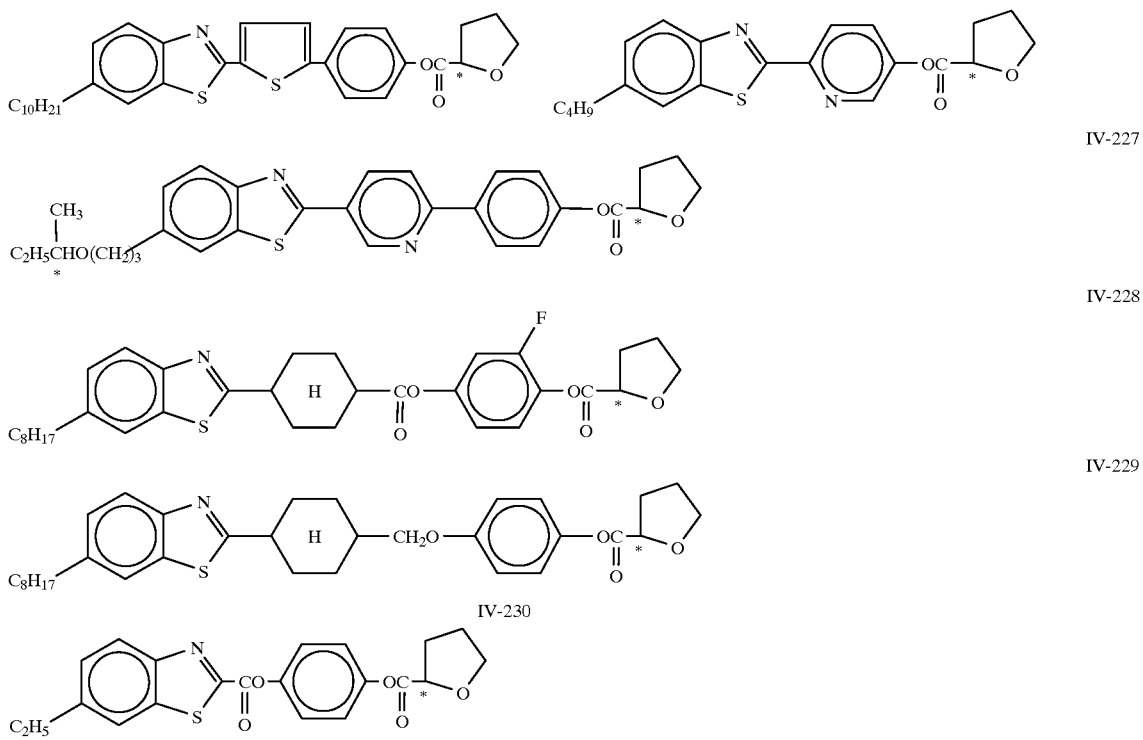

Formula (V)

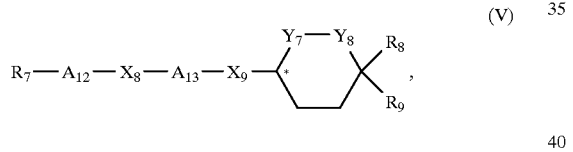

in which

R$_7$, R$_8$ and R$_9$ independently denote hydrogen, or a linear or branched alkyl group having 1–18 carbon atoms;

A$_{12}$ and A$_{13}$ independently denote 1,4-phenylene capable of having one or two substituents comprising F, Cl, Br, CH$_3$, CF$_3$ and/or CN; 1,4-cyclohexylene; pyrimidine-2,5-diyl; pyridine-2, 5-diyl; thiadiazole-2,5-diyl; thiazole-2, 5-diyl; thiophene-2,5-diyl; or 2,6-naphthylene;

X$_8$ and X$_9$ independently denote a single bond, —COO—, —OCO—, —CH$_2$O— or —OCH$_2$—;

\* denotes an optically active center; and either one of Y$_7$ and Y$_8$ is —CO— and the other is —O—.

Specific examples of the compound (b) of the formula (V) may include those (Ex. Comp. Nos. V-1 to V-17) shown below.

V-3: n=4, 2R, 5R
V-4: n=4, 2S, 5R
V-5: n=3, 2R, 5R
V-6: n=2, 2R, 5R
V-7: n=2, 2S, 5R
V-8: n=1, 2R, 5R
V-9: n=1, 2S, 5R

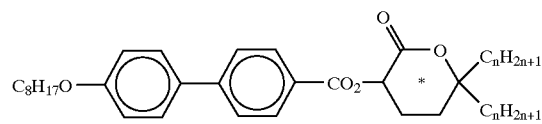

V-10: n=1
V-11: n=2
V-12: n=3
V-13: n=4
V-14: n=6
V-15: n=10

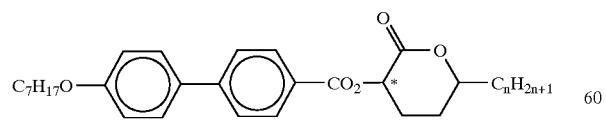

V-1: n=6, 2R, 5R
V-2: n=6, 2S, 5R

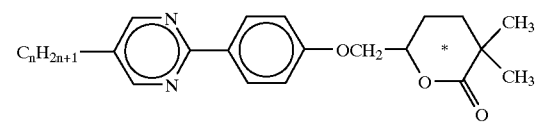

V-16: n=8
V-17: n=10

Formula (VI)

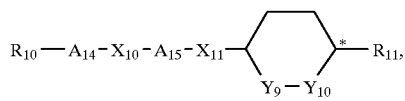

in which $R_{10}$ is hydrogen or linear or branched alkyl group having 1–18 carbon atom capable of including at least one —$CH_2$— group which can be replaced by —$Y_2$—, —$Y_2CO$—, —$COY_2$—, —$CO$—, —$OCOO$—, —$CH=CH$— or —$C\equiv C$— wherein $Y_2$ is O or S;

$R_{11}$ is hydrogen, a linear or branched alkyl group having 1–18 carbon atoms or a trialkylsilyl group independently having a linear or branched alkyl group having 1–10 carbon atoms, alkyl group of $R_{11}$ being capable of including at least one —$CH_2$— group which can be replaced by —$Y_3$—, —$Y_3CO$—, —$COY_3$—, —$CO$—, —$OCOO$—, —$CH=CH$— or —$C\equiv C$— wherein $Y_3$ is O or S;

$A_{14}$ and $A_{15}$ independently denote 1,4-phenylene capable of having one or two substituents comprising F, Cl, Br, $CH_3$, $CF_3$ and/or CN; 1,4-cyclohexylene; pyrimidine-2,5-diyl; pyridine-2,5-diyl; thiadiazole-2,5-diyl; thiazole-2,5-diyl; thiophene-2,5-diyl; or 2,6-naphthylene;

$X_{10}$ and $X_{11}$ independently denote a single bond, —COO—, —OCO—, —$CH_2O$— or —$OCH_2$—;

either one of $Y_9$ and $Y_{10}$ is

and the other is —O—; and

* denotes an optically active center.

Specific examples of the compound (b) of the formula (VI) may include those (Ex. Comp. Nos. VI-7 to VI-8) shown below.

VI-1: (2,5-cis)

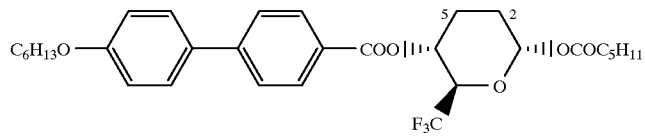

VI-2: (2,5-cis)
VI-3: (2,5-trans)

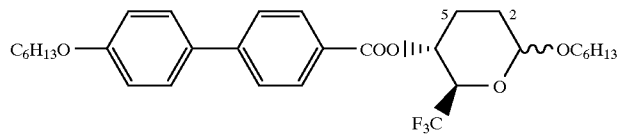

VI-4: (2,5-cis)
VI-5: (2,5-trans)

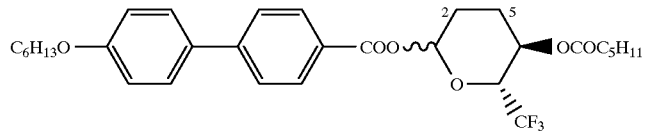

VI-6: (2,5-cis)
VI-7: (2,5-trans)

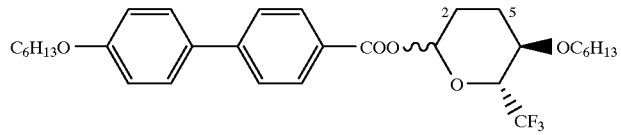

VI-8:

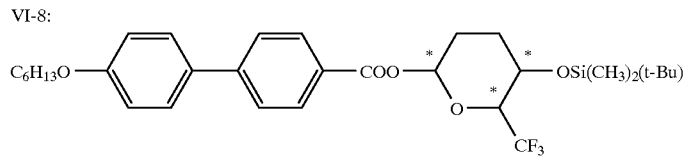

Formula (VII)

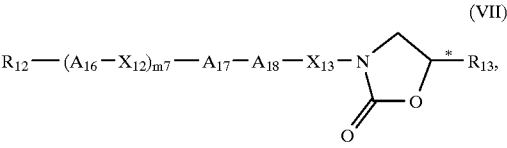

in which $R_{12}$ and $R_{13}$ independently denote hydrogen, or a linear or branched alkyl group having 1–18 carbon atoms capable of including at least one —$CH_2$— group which can be replaced by —$Y_4$—, —$Y_4CO$—, —$COY_4$—, —$CO$—, —$OCOO$—, —$CH=CH$— or —$C\equiv C$— wherein $Y_4$ is O or S;

$A_{16}$, $A_{17}$ and $A_{18}$ independently denote a single bond; 1,4-phenylene capable of having one or two substituents comprising F, Cl, Br, $CH_3$, $CF_3$ and/or CN; pyridine-2,5-diyl; pyrimidine-2,5-diyl; pyrazine-2,5-diyl; pyridazine-3,6- diyl; 1,4-cyclohexylene; 1,3-dioxane-2,5-diyl; 1,3-dithiane-2,5-diyl; thiophene-2,5-diyl, thiazole-2,5-diyl; thiadiazole-2,5-diyl; benzoxazole-2,6-diyl; benzothiazole-2,5-diyl; benzothiazole-2,6-diyl; benzofuran-2,5-diyl; benzofuran-2,6-diyl; quinoxaline-2,6-diyl; quinoline-2,6-diyl; 2,6-naphthylene; indan-2,5-diyl; 2-alkylindan-2,5-diyl having a linear or branched alkyl group having 1–18 carbon atom; indanone-2,6-diyl; 2-alkylindanone-2,6-diyl having a linear or branched alkyl group having 1–18 carbon atoms; coumaran-2,5-diyl; or 2-alkylcoumaran-2,5-diyl having a linear or branched alkyl group having 1–18 carbon atoms;

$X_{12}$ is a single bond, —O—, —COO—, —OCO—,

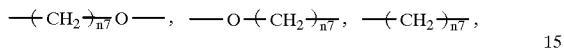

—C≡C—, —CONR$_{14}$—, —NR$_{14}$CO—, —NR$_{14}$—, —CH=N—, —N=CH—, —CH=CH—, —COS— or —SCO— wherein $R_{14}$ is an alkyl group having 1–5 carbon atoms, and n7 is an integer of 1–10;

$X_{13}$ is a single bond or an alkylene group having 1–6 carbon atoms;

m7 is 0, 1 or 2; and

* denotes an optically active center.

Specific examples of the compound (b) of the formula (III) may include those represented by the following structural formulae (Ex. Comp. Nos. VII-1 to VII-123 indicated as Nos. 1–123 in Table 2 below) including abbreviations used for respective cyclic groups listed below.

The Table 2, m7 is 1 for Ex. Comp. Nos. VII-1 to VII-105 and m7 is 2 for Ex. Comp. Nos. VII-106 to VII-123.

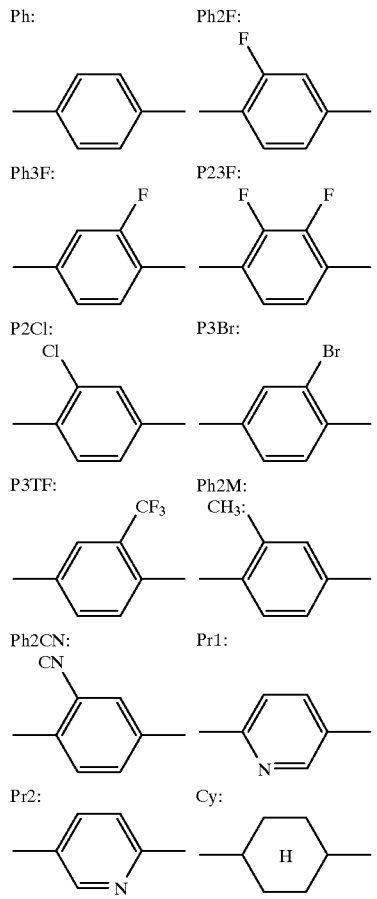

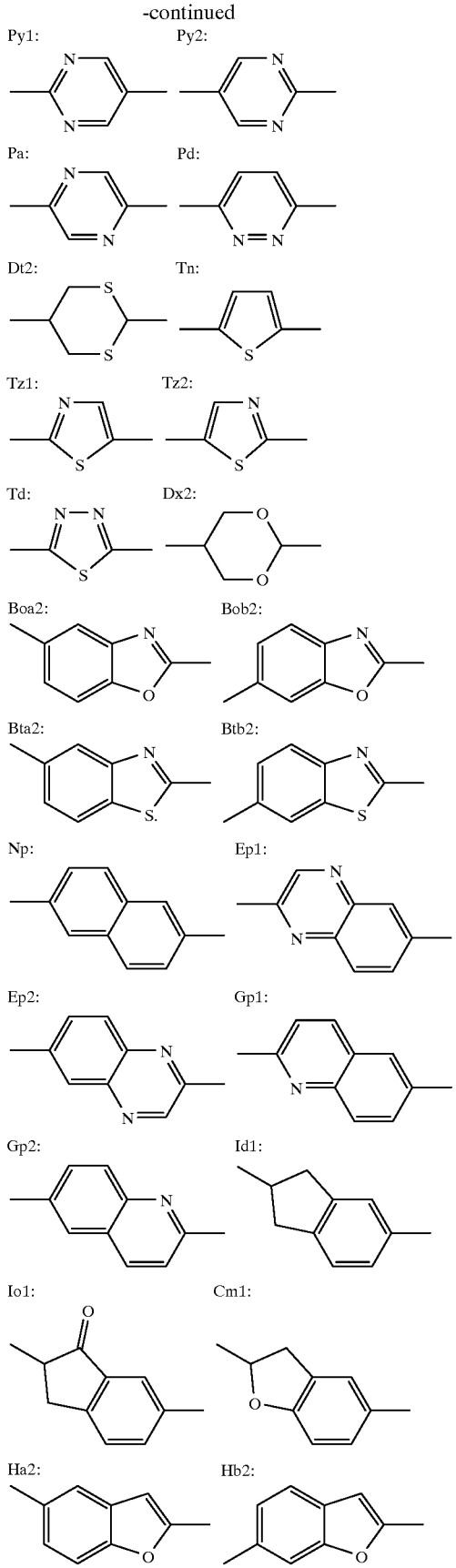

TABLE 2

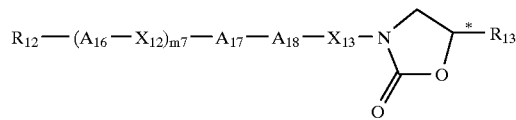

(VII)

| No. | R$_{12}$ | A$_{16}$ | X$_{12}$ | A$_{17}$ | A$_{18}$ | X$_{13}$ | R$_{13}$ |
|---|---|---|---|---|---|---|---|
| 1 | C$_6$H$_{13}$ | Ph | — | Ph | — | — | C$_8$H$_{17}$ |
| 2 | C$_8$H$_{17}$O | Ph | — | Ph | — | — | C$_8$H$_{17}$ |
| 3 | C$_5$H$_{11}$O | Ph | — | Ph2F | — | — | C$_6$H$_{13}$ |
| 4 | CH$_3$O | Ph | — | Ph | — | — | C$_6$H$_{13}$ |
| 5 | C$_6$H$_{13}$CH(CH$_3$)(CH$_2$)$_2$O | Ph | — | Ph | — | — | C$_6$H$_{13}$ |
| 6 | C$_7$H$_{15}$O | Ph | — | P23F | — | — | C$_6$H$_{13}$ |
| 7 | C$_6$H$_{13}$ | Ph | — | Ph | — | — | C$_9$H$_{19}$ |
| 8 | C$_7$H$_{15}$O | Ph | — | Ph | — | — | C$_5$H$_{11}$ |
| 9 | C$_8$H$_{17}$O | Ph | — | Ph | — | — | C$_6$H$_{13}$ |
| 10 | C$_8$H$_{17}$ | Pr1 | — | Ph | — | — | C$_8$H$_{17}$ |
| 11 | C$_{10}$H$_{21}$ | Pr2 | — | Ph | — | — | C$_4$H$_9$ |
| 12 | C$_{11}$H$_{23}$ | Pr2 | — | Ph | — | — | C$_6$H$_{13}$ |
| 13 | C$_{12}$H$_{25}$ | Pr2 | — | Ph | — | — | C$_8$H$_{17}$ |
| 14 | C$_4$H$_9$O | Py1 | — | Ph | — | — | C$_{10}$H$_{21}$ |
| 15 | C$_{13}$H$_{27}$ | Py2 | — | Ph | — | — | C$_5$H$_{11}$ |
| 16 | C$_6$H$_{13}$ | Py2 | — | Ph | — | — | C$_8$H$_{17}$ |
| 17 | C$_6$H$_{13}$CH(CH$_3$)CH$_2$O | Py2 | — | Ph | — | — | C$_9$H$_{19}$ |
| 18 | C$_5$H$_{11}$O | Py2 | — | P23F | — | — | C$_4$H$_9$ |
| 19 | C$_{10}$H$_{21}$ | Py2 | — | Ph | — | — | C$_6$H$_{13}$ |
| 20 | C$_8$H$_{17}$ | Py2 | — | Ph3F | — | — | C$_8$H$_{17}$ |
| 21 | C$_6$H$_{13}$ | Cy | — | Ph | — | — | C$_4$H$_9$ |
| 22 | C$_3$H$_7$ | Cy | — | Ph | — | — | C$_5$H$_{11}$ |
| 23 | C$_5$H$_{11}$ | Cy | — | Ph | — | — | C$_4$H$_9$ |
| 24 | C$_{10}$H$_{21}$ | Cy | — | Ph | — | — | C$_{10}$H$_{21}$ |
| 25 | C$_6$H$_{13}$ | Pa | — | Ph | — | — | C$_{10}$H$_{21}$ |
| 26 | C$_7$H$_{15}$OCO | Pd | — | Ph | — | — | C$_3$H$_7$ |
| 27 | C$_6$H$_{13}$ | Dt2 | — | Ph | — | — | C$_6$H$_{13}$ |
| 28 | C$_8$H$_{17}$ | Tn | — | Ph | — | — | C$_9$H$_{19}$ |
| 29 | C$_5$H$_{11}$ | Tz1 | — | Ph | — | — | C$_9$H$_{19}$ |
| 30 | C$_9$H$_{19}$O | Tz2 | — | Ph | — | — | C$_6$H$_{13}$ |
| 31 | C$_2$H$_5$ | Td | — | Ph | — | — | C$_7$H$_{15}$ |
| 32 | C$_{10}$H$_{21}$ | Dx2 | — | Ph | — | — | C$_8$H$_{17}$ |
| 33 | C$_6$H$_{13}$ | Boa2 | — | Ph | — | — | C$_{10}$H$_{21}$ |
| 34 | C$_{15}$H$_{31}$ | Bob2 | — | Ph | — | — | C$_{10}$H$_{21}$ |
| 35 | C$_7$H$_{15}$ | Bta2 | — | Ph | — | — | C$_6$H$_{13}$ |
| 36 | C$_{16}$H$_{33}$O | Btb2 | — | Ph | — | — | C$_9$H$_{19}$ |
| 37 | C$_6$H$_{13}$ | Np | — | Ph | — | — | C$_6$H$_{13}$ |
| 38 | C$_5$H$_{11}$ | Np | — | Ph | — | — | C$_4$H$_9$ |
| 39 | C$_8$H$_{17}$CH(CH$_3$)CH$_2$O | Ep1 | — | Ph | — | — | C$_6$H$_{13}$ |
| 40 | C$_4$H$_9$ | Ep2 | — | Ph | — | — | C$_8$H$_{17}$ |
| 41 | C$_6$H$_{13}$ | Gp1 | — | Ph | — | — | C$_6$H$_{13}$ |
| 42 | C$_7$H$_{15}$ | Gp2 | — | Ph | — | — | C$_2$H$_5$ |
| 43 | C$_6$H$_{13}$ | Cm1 | — | Ph | — | — | C$_{10}$H$_{21}$ |
| 44 | C$_8$H$_{17}$ | Io1 | — | Ph | — | — | C$_2$H$_5$ |
| 45 | C$_{18}$H$_{37}$ | Id1 | — | Ph | — | — | C$_6$H$_{13}$ |
| 46 | C$_{11}$H$_{23}$ | Id1 | — | Ph | — | — | C$_5$H$_{11}$ |
| 47 | C$_8$H$_{17}$ | Id1 | — | Ph | — | — | C$_5$H$_{11}$ |
| 48 | C$_5$H$_{11}$ | Id1 | — | Ph2F | — | — | C$_6$H$_{13}$ |
| 49 | C$_6$H$_{13}$ | Tn | — | Ph | — | — | C$_6$H$_{13}$ |
| 50 | C$_4$H$_9$O | Tz2 | — | Ph | — | — | C$_8$H$_{17}$ |
| 51 | C$_{12}$H$_{25}$ | Btb2 | — | Ph | — | — | C$_{10}$H$_{21}$ |
| 52 | C$_6$H$_{13}$O | Btb2 | — | Ph | — | — | C$_6$H$_{13}$ |
| 53 | CH$_2$=CH(CH$_2$)$_3$O | Ep2 | — | Ph | — | — | C$_5$H$_{11}$ |
| 54 | C$_9$H$_{19}$ | Gp2 | — | Ph | — | — | C$_6$H$_{13}$ |
| 55 | C$_5$H$_{11}$ | Np | — | Ph | — | — | C$_6$H$_{13}$ |
| 56 | C$_6$H$_{13}$ | Ph | — | Ph | Ph | — | C$_6$H$_{13}$ |
| 57 | C$_8$H$_{17}$COO | Pr2 | — | Ph | Ph | — | C$_5$H$_{11}$ |
| 58 | C$_3$H$_7$ | Py2 | — | Ph | Ph | — | C$_4$H$_9$ |
| 59 | C$_5$H$_{11}$ | — | — | Ha2 | Ph | — | C$_4$H$_9$ |
| 60 | C$_6$H$_{13}$ | Ph | COO | Py2 | Ph | — | C$_6$H$_{13}$ |
| 61 | C$_9$H$_{19}$ | Ph | — | Py1 | Ph | — | C$_6$H$_{13}$ |
| 62 | C$_{13}$H$_{27}$ | Ph | — | Cy | P3Br | — | C$_5$H$_{11}$ |
| 63 | C$_{10}$H$_{21}$O | Ph | — | Py1 | Ph | — | C$_6$H$_{13}$ |
| 64 | C$_7$H$_{15}$ | Ph | OCH$_2$ | Py2 | Ph | — | C$_5$H$_{11}$ |
| 65 | C$_4$H$_9$ | Ph3TF | COO | Pa | Ph | — | C$_6$H$_{13}$ |
| 66 | CH$_3$ | Hb2 | — | Ph | — | — | C$_8$H$_{17}$ |
| 67 | C$_8$H$_{17}$ | Ph | — | Tn | Ph | — | (CH$_2$)$_3$CH(CH$_3$)$_2$ |
| 68 | C$_2$H$_5$ | Ph | — | Tz1 | Ph2M | — | C$_8$H$_{17}$ |

TABLE 2-continued

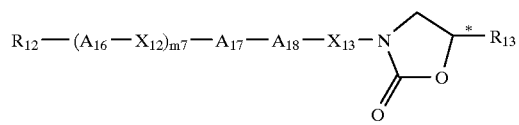

(VII)

| No. | R$_{12}$ | A$_{16}$ | X$_{12}$ | A$_{17}$ | A$_{18}$ | X$_{13}$ | R$_{13}$ |
|---|---|---|---|---|---|---|---|
| 69 | C$_6$H$_{13}$ | Ph | — | Ph | Ph | — | C$_8$H$_{17}$ |
| 70 | C$_{10}$H$_{21}$ | Ph | — | Td | Ph | — | (CH$_2$)$_3$CH(CH$_3$)$_2$ |
| 71 | C$_{10}$H$_{21}$ | Ph | — | Py1 | — | — | C$_6$H$_{13}$ |
| 72 | C$_6$H$_{13}$ | Ph | — | Py1 | — | — | C$_4$H$_9$ |
| 73 | C$_6$H$_{13}$OCO | Ph | — | Py1 | — | — | C$_6$H$_{13}$ |
| 74 | C$_7$H$_{15}$ | Ph | — | Pr2 | — | — | C$_5$H$_{11}$ |
| 75 | C$_9$H$_{19}$ | Ph | — | Pr2 | — | — | (CH$_2$)$_3$CH(CH$_3$)$_2$ |
| 76 | C$_7$H$_{15}$ | Ph | — | Pr2 | — | — | C$_6$H$_{13}$ |
| 77 | C$_5$H$_{11}$O | Py2 | — | Cy | — | — | C$_{10}$H$_{21}$ |
| 78 | C$_4$H$_9$ | Ph | — | Cy | — | — | C$_2$H$_5$ |
| 79 | C$_{12}$H$_{25}$ | Ph | — | Cy | — | CH$_3$ | C$_5$H$_{11}$ |
| 80 | C$_6$H$_{13}$C≡C | Ph | — | Pa | — | — | C$_{10}$H$_{21}$ |
| 81 | C$_8$H$_{17}$O | Ph | — | Pd | — | — | C$_6$H$_{13}$ |
| 82 | C$_3$H$_7$ | Ph2Cl | — | Tn | — | — | C$_{10}$H$_{21}$ |
| 83 | C$_4$H$_9$ | Ph | — | Tn | — | — | C$_8$H$_{17}$ |
| 84 | C$_8$H$_{17}$ | Ph | — | Tz1 | — | — | C$_8$H$_{17}$ |
| 85 | C$_4$H$_9$OCH(CH$_3$)COO | Ph | — | Tz1 | — | — | C$_7$H$_{15}$ |
| 86 | C$_6$H$_{13}$ | Ph2F | — | Td | — | — | (CH$_2$)$_3$CH(CH$_3$)C$_6$H$_{13}$ |
| 87 | C$_5$H$_{11}$ | Py2 | — | Np | — | — | C$_9$H$_{19}$ |
| 88 | CH$_3$ | Ph | — | Np | — | — | C$_2$H$_5$ |
| 89 | C$_{11}$H$_{23}$ | Ph | — | Np | — | — | C$_6$H$_{13}$ |
| 90 | C$_5$H$_{11}$ | Py1 | — | Ep1 | — | — | C$_5$H$_{11}$ |
| 91 | C$_8$H$_{17}$OC$_2$H$_4$ | Ph | — | Ep1 | — | — | C$_5$H$_{11}$ |
| 92 | C$_6$H$_{13}$ | Ph | — | Ep1 | — | — | C$_8$H$_{17}$ |
| 93 | C$_9$H$_{19}$ | Py1 | — | Gp1 | — | — | C$_5$H$_{11}$ |
| 94 | C$_8$H$_{17}$ | Ph | — | Gp1 | — | — | C$_6$H$_{13}$ |
| 95 | C$_3$H$_7$COO | Ph | — | Gp1 | — | — | C$_8$H$_{17}$ |
| 96 | C$_4$H$_9$ | Ph | — | Id1 | — | — | C$_8$H$_{17}$ |
| 97 | C$_{12}$H$_{25}$ | Ph | — | Io1 | — | CH$_2$ | C$_6$H$_{13}$ |
| 98 | C$_{10}$H$_{21}$ | Ph | — | Cm1 | — | — | C$_8$H$_{17}$ |
| 99 | C$_6$H$_{13}$ | Ph | — | Ph | — | — | C$_8$H$_{17}$ |
| 100 | C$_3$H$_7$ | Ph | OCH$_2$ | Ph | Py1 | — | C$_2$H$_5$ |
| 101 | C$_4$H$_9$ | Ph2CN | — | Ph | Pr1 | — | C$_{10}$H$_{21}$ |
| 102 | C$_5$H$_{11}$ | Ph | OCH$_2$ | Ph3F | Tz1 | — | C$_6$H$_{13}$ |
| 103 | C$_6$H$_{13}$ | Ph | — | Ph | Tn | — | C$_8$H$_{17}$ |
| 104 | C$_7$H$_{15}$ | Tn | — | Ph | Py1 | — | C$_8$H$_{17}$ |
| 105 | C$_{10}$H$_{21}$ | Ph | — | Ph | Cy1 | — | C$_5$H$_{11}$ |
| 106 | C$_6$H$_{13}$ | Ph | — | — | Tn | — | C$_8$H$_{17}$ |
| 107 | C$_7$H$_{15}$ | Tn | — | — | Py1 | — | C$_8$H$_{17}$ |
| 108 | C$_{10}$H$_{21}$ | Ph | — | — | Cy1 | — | C$_5$H$_{11}$ |
| 109 | C$_6$H$_{13}$ | Ph | —COO— | — | — | — | C$_8$H$_{17}$ |
| 110 | C$_7$H$_{15}$ | Ph | —COO— | — | Tn | — | C$_8$H$_{17}$ |
| 111 | C$_{10}$H$_{21}$ | Ph | —COO— | — | Cy | — | C$_5$H$_{11}$ |
| 112 | C$_6$H$_{13}$ | Ph | —COO— | — | Np | — | C$_8$H$_{17}$ |
| 113 | C$_7$H$_{15}$ | Py2 | — | — | Np | — | C$_8$H$_{17}$ |
| 114 | C$_{10}$H$_{21}$ | Py1 | —COO— | — | Ph | — | C$_5$H$_{11}$ |
| 115 | C$_6$H$_{13}$ | Pr1 | — | — | Ph | — | C$_8$H$_{17}$ |
| 116 | C$_7$H$_{15}$ | Ph | —COO— | — | Ph | — | C$_8$H$_{17}$ |
| 117 | C$_{10}$H$_{21}$ | Ph | —O— | — | Np | — | C$_5$H$_{11}$ |
| 118 | C$_6$H$_{13}$ | Cy | —CONMe— | — | Gp2 | — | C$_8$H$_{17}$ |
| 119 | C$_7$H$_{15}$ | Ph | —COO— | — | Hb1 | — | C$_8$H$_{17}$ |
| 120 | C$_{10}$H$_{21}$ | Ph | —COO— | — | Pz | — | C$_5$H$_{11}$ |
| 121 | C$_6$H$_{13}$ | Ph | —COO— | — | Ph | — | C$_8$H$_{17}$ |
| 122 | C$_7$H$_{15}$ | Ph | —COO— | — | Pr1 | — | C$_8$H$_{17}$ |
| 123 | C$_{10}$H$_{21}$ | Ph | —O— | — | Pr2 | — | C$_5$H$_{11}$ |

The compound (b) represented by the formulae (III) to (VII) can be synthesized through processes as described in the following documents, respectively.

Compound of the Formula (III)

U.S. patent application Ser. No. 371854 or Japanese Patent Application No. 6-14119

Compound of the Formula (IV) or (IV')

JP-A 2-91065 or Japanese Patent Application No. 4-315557

Compound of the Formula (V)

JP-A 4-364176

Compound of the Formula (VI)

JP-A 5-230051 or JP-A 5-310725

Compound of the Formula (VII)

JP-A 3-151371

Specific examples of the compound (b) other than those of the formulae (III) to (VII) may include the following optically active compounds.

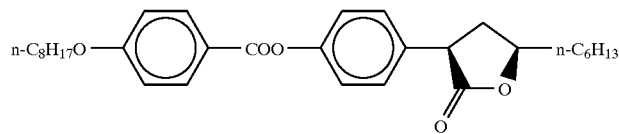
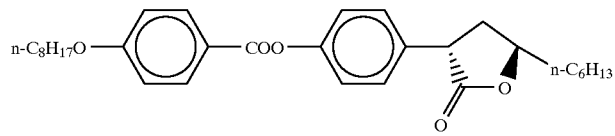
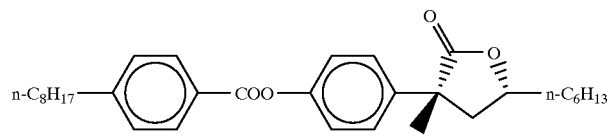
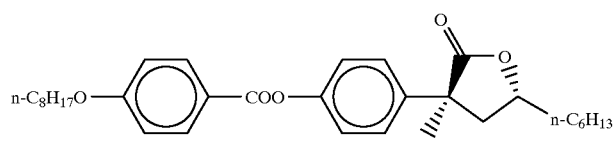
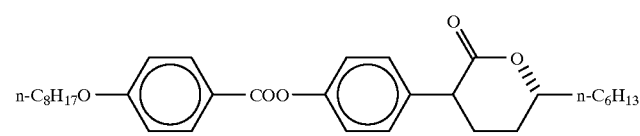
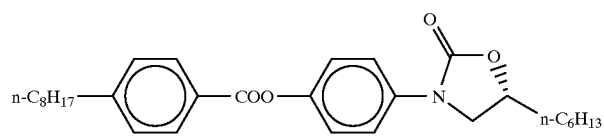
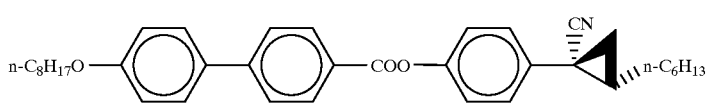
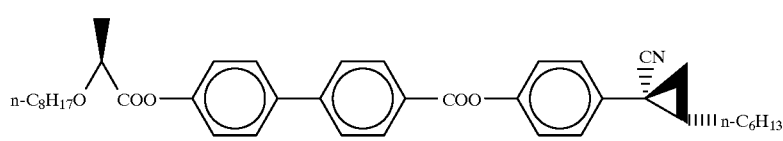
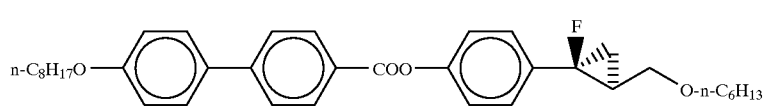

-continued
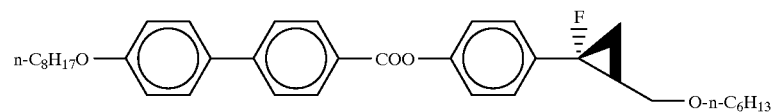
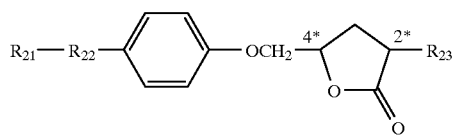
| R21 | R22 | R23 | Configuration |
|---|---|---|---|
|  cyclohexyl | C5H11 | C4H9 | 2S, 4S (cis) |
| cyclohexyl | C5H11 | C4H9 | 2R, 4S (trans) |
| phenyl | C8H17 | C3H7 | 2S, 4S (cis) |
| phenyl | C8H17 | C3H7 | 2R, 4S (trans) |
| pyrimidinyl | C8H17O | C4H9 | 2S, 4S (cis) |
| pyrimidinyl | C8H17O | C4H9 | 2R, 4S (trans) |
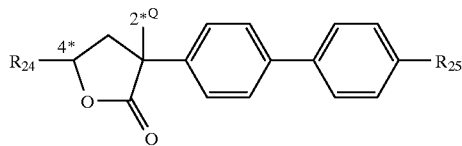
| R24 | R25 | Q | Configuration |
|---|---|---|---|
| C5H11 | C7H15 | H | 2R, 4R (cis) |
| C5H11 | C7H15 | H | 2S, 4R (trans) |
| C7H15 | OC9H19 | H | 2R, 4R (cis) |
| C7H15 | OC9H19 | H | 2S, 4R (trans) |
| C6H13OCH2 | C7H15 | H | 2R, 4S (cis) |
| C6H13OCH2 | C7H15 | H | 2S, 4S (trans) |
| C6H13OCH2 | OC9H19 | H | 2R, 4S (cis) |
| C6H13OCH2 | OC9H19 | H | 2S, 4S (trans) |
| C7H15 | OC9H19 | CH3 | 2R, 4R (cis) |
| C7H15 | OC9H19 | CH3 | 2S, 4R (trans) |
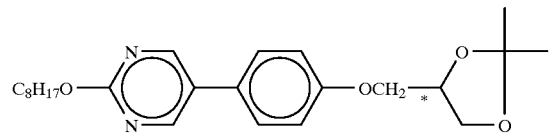

-continued
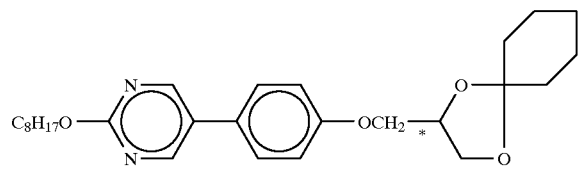
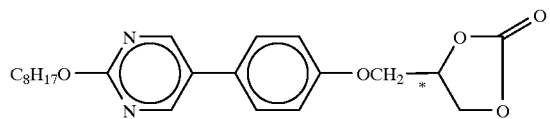
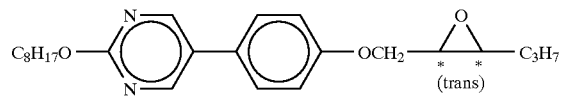
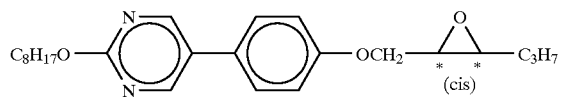
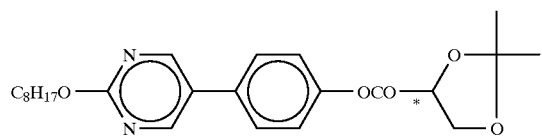
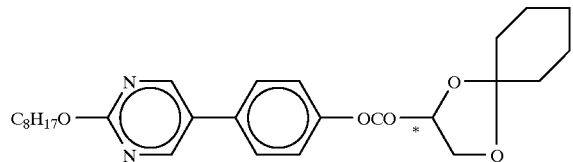
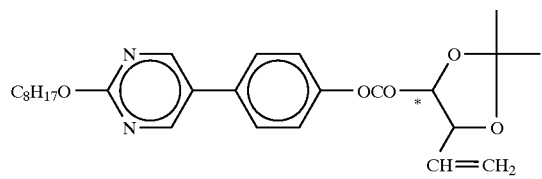
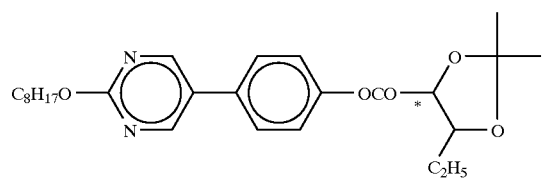
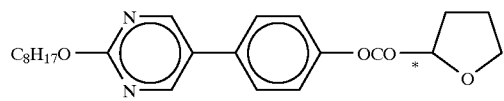
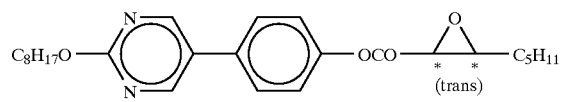

-continued

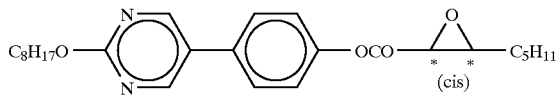
(cis)

The liquid crystal composition according to the present invention may preferably contain at least 20 wt. %, more preferably at least 30 wt. %, particularly at least 50 wt. %, of at least one species of a fluorine-containing mesomorphic compound (a) preferably represented by the formula (I). If the mesomorphic compound (a) is contained in the liquid crystal composition in proportion of below 20 wt. %, the liquid crystal composition provides undesirable properties in respects of a tilt angle, a viscosity and a layer inclination angle in some cases.

The liquid crystal composition of the invention may preferably contain at most 50 wt. %, more preferably 0.1–50 wt. %, of at least one species of an optically active compound (b) (i.e., a cyclic chiral compound) preferably represented by the formula (II). Above 50 wt. %, the compound (b) adversely affects a viscosity, a temperature range of chiral smectic phase, etc., of the liquid crystal composition in some cases.

The liquid crystal composition of the invention may further contain at least one mesomorphic compound different from those described above and additives such as an antioxidant, an ultraviolet ray-absorbing agent, a colorant and a pigment.

The liquid crystal device according to the present invention may preferably be a chiral smectic liquid crystal device using the above-mentioned liquid crystal composition.

Hereinbelow, an embodiment of the liquid crystal device of the present invention will be explained with reference to FIG. 1.

FIG. 1 is a schematic sectional view of an embodiment of the chiral smectic liquid crystal device for explanation of the structure thereof.

Referring to FIG. 1, the liquid crystal device includes a liquid crystal layer 1 comprising a chiral smectic liquid crystal composition disposed between a pair of substrates 2 each having thereon a transparent electrode 3 and an alignment control layer 4. In the present invention, the transparent electrode 3 may be formed on one of the substrates 2. The substrates 2 are placed or arranged opposite each other. The periphery of the substrates 2 is sealed up with a sealing agent 5. Lead wires 6 are connected to the electrodes so as to apply a driving voltage to the liquid crystal layer 1 from a signal power supply 7. Outside the substrates 2, a pair of polarizers 8 are disposed so as to modulate incident light $I_0$ from a light source 9 in cooperation with the liquid crystal 1 to provide modulated light I.

The liquid crystal layer 1 may preferably have a thickness of at most 5 pm in order to exhibit bistability. Each of two substrates 2 comprise glass or plastic and is coated with a transparent electrode 3 comprising a film of $SnO_2$, $In_2O_3$, $SnO_2$ or ITO (indium-tin-oxide) to form an electrode plate. Further thereon, the alignment control layer 4 is formed by applying a solution containing a material for the alignment control layer or by vapor deposition or sputtering of a material for the alignment control layer. Examples of the material for the alignment control layer 4 may include: an inorganic material, such as silicon monoxide, silicon dioxide, aluminum oxide, zirconium oxide, magnesium fluoride, cerium oxide, cerium fluoride, silicon nitride, silicon carbide, or boron nitride; and an organic material, such as polyvinyl alcohol, polyimide, polyamide-imide, polyester, polyamide, polyester-imide, polyparaxylylene, polycarbonate, polyvinyl acetal, polyvinyl chloride, polyvinyl acetate, polystyrene, cellulose resin, melamine resin, urea resin or acrylic resin. The surface of thus prepared alignment control layer 4 is subjected to uniaxial alignment treatment by rubbing the surface with a fibrous material such as velvet, cloth or paper. The uniaxial alignment treatment (rubbing treatment) may preferably be performed to one of the alignment control films 4. The alignment control layer 4 may be formed by an oblique vapor deposition method wherein a film of an oxide such as $SiO_2$ or an nitride is vapor-deposited on the electrode plate(s) from the oblique direction to the electrode plate.

In view of ease of formation and a high alignment control ability, the alignment control layer 4 may preferably comprise a polyimide film or a polyamide film formed by applying, e.g., a polyimide precursor solution or a polyamic acid solution and curing the solution, followed by uniaxial alignment treatment, particularly rubbing treatment of the resultant film. Examples of a polyimide and a polyamide used for forming the alignment control layer 4 may preferably include those having a molecular structure with a high rigidity, a high linear property and a high crystallinity in order to uniformly align the chiral smectic liquid crystal composition. Such a polyimide and polyamide may preferably be represented by the following formula (VIII) and formula (IX), respectively.

Formula (VIII)

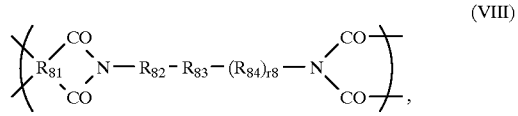

in which $R_{81}$ is

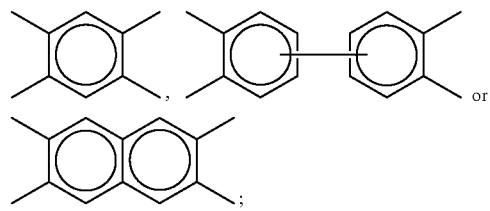

$R_{82}$ and $R_{84}$ independently denote

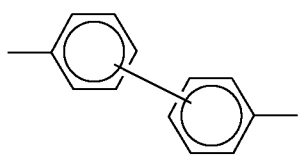

or

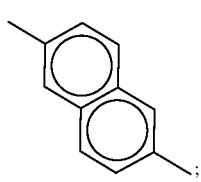

$R_{83}$ is a single bond or —O—; and r8 is 0, 1 or 2.

Formula (IX)

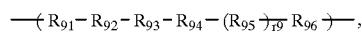  (IX)

in which
$R_{91}$ is an alkylene group having 1–20 carbon atoms,

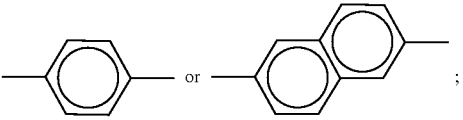

$R_{92}$ and $R_{96}$ are independently —CONH— or —NHCO—;
$R_{93}$ and $R_{95}$ are independently

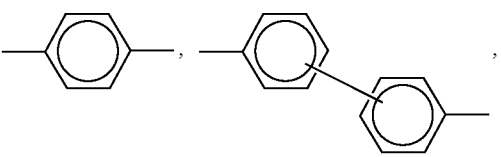

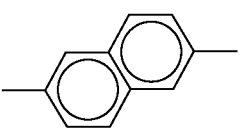

or an alkylene group having 1–20 carbon atoms:
$R_{94}$ is a single bond or —O—; and
r9 is 0, 1 or 2.

Specific examples of the polyimide of the formula (VIII) and the polyamide of the formula (IX) may include those having the following recurring units shown below.

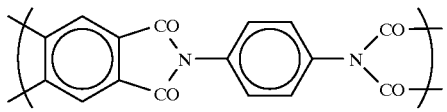

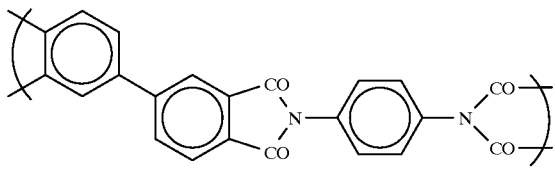

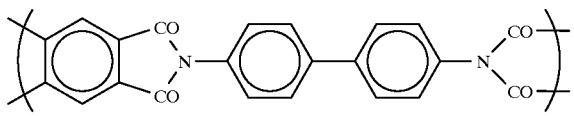

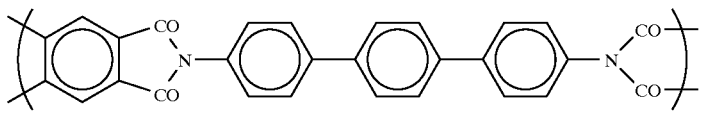

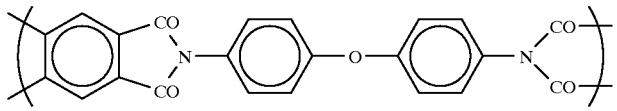

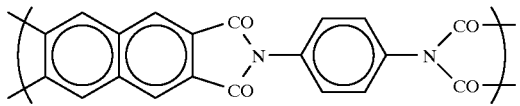

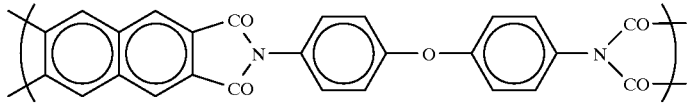

-continued

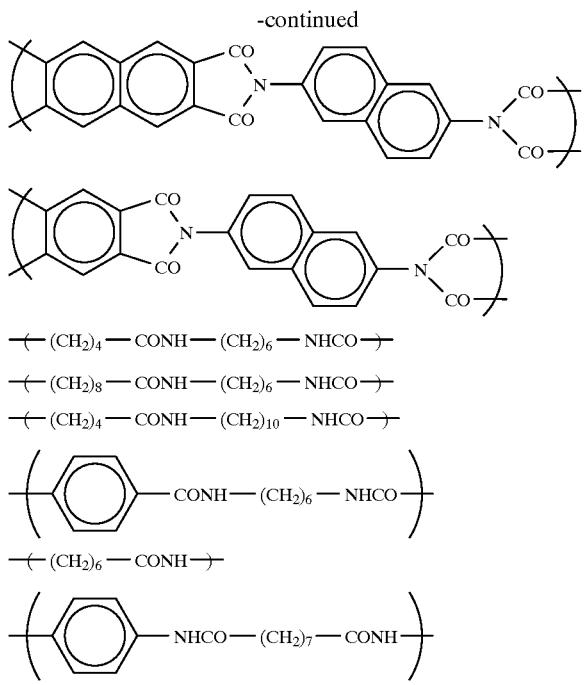

$-(-(CH_2)_4-CONH-(CH_2)_6-NHCO-)-$ $-(-(CH_2)_8-CONH-(CH_2)_6-NHCO-)-$ $-(-(CH_2)_4-CONH-(CH_2)_{10}-NHCO-)-$ $-(-\langle\bigcirc\rangle-CONH-(CH_2)_6-NHCO-)-$ $-(-(CH_2)_6-CONH-)-$ $-(-\langle\bigcirc\rangle-NHCO-(CH_2)_7-CONH-)-$ One of the alignment control layers formed on one substrate may comprise a material therefor which is different from that for the other alignment control layer in order to improve an alignment characteristic in the case of providing a bookshelf structure.

The liquid crystal device of the invention may further comprise a short circuit-preventing layer for the pair of substrates such as an insulating layer, an inorganic material layer and an organic material layer other than those for the above-mentioned alignment control layer. The pair of substrates 2 are held to have a prescribed (but arbitrary) gap with a gap-controlling spacer (not shown) of, e.g., silica beads or alumina beads. A voltage is applied to the liquid crystal layer 1 through the transparent electrode 3 in accordance with a switching signal from the signal power supply 7, thus effecting switching. As a result, the liquid crystal device functions as a light valve such a display device. Further, in case where two electrodes are arranged in matrix on the pair of substrates, it is possible to perform pattern display and pattern exposure, so that the liquid crystal device is used as a display device for a personal computer, a word processor, etc., or a light valve for a printer. The liquid crystal device may be arranged in various modes or forms as long as it uses a liquid crystal compositions containing the mesomorphic compound (a) and the optically active compound (b) as essential components thereby to impart required functions.

The liquid crystal device according to the present invention is used as an active element, particularly an active display element, for various liquid crystal apparatus, one embodiment of which is described below.

Figure 2:
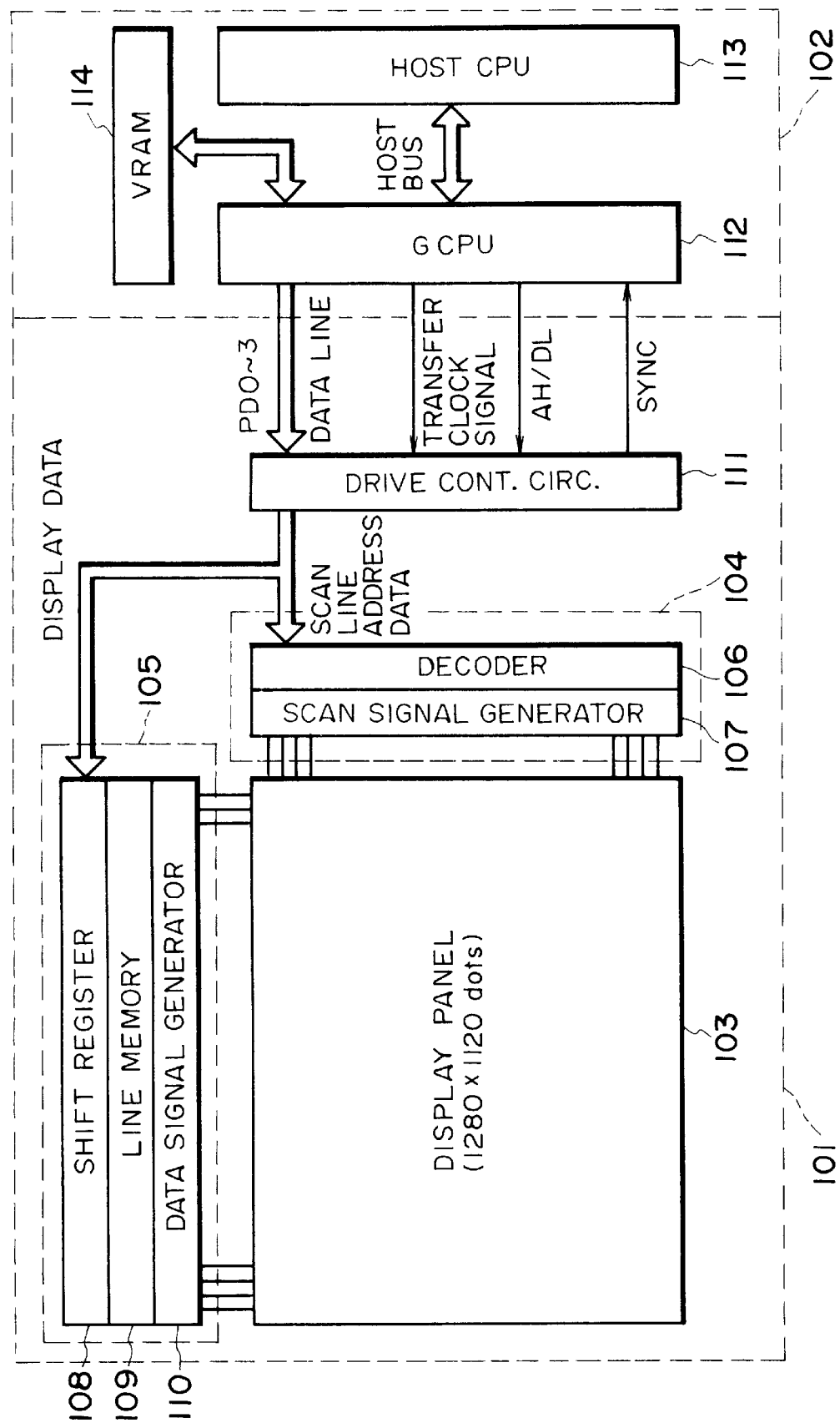
FIG. 2 is a block diagram showing a display apparatus comprising a liquid crystal device utilizing a liquid crystal composition and a graphic controller.
Figure 3:
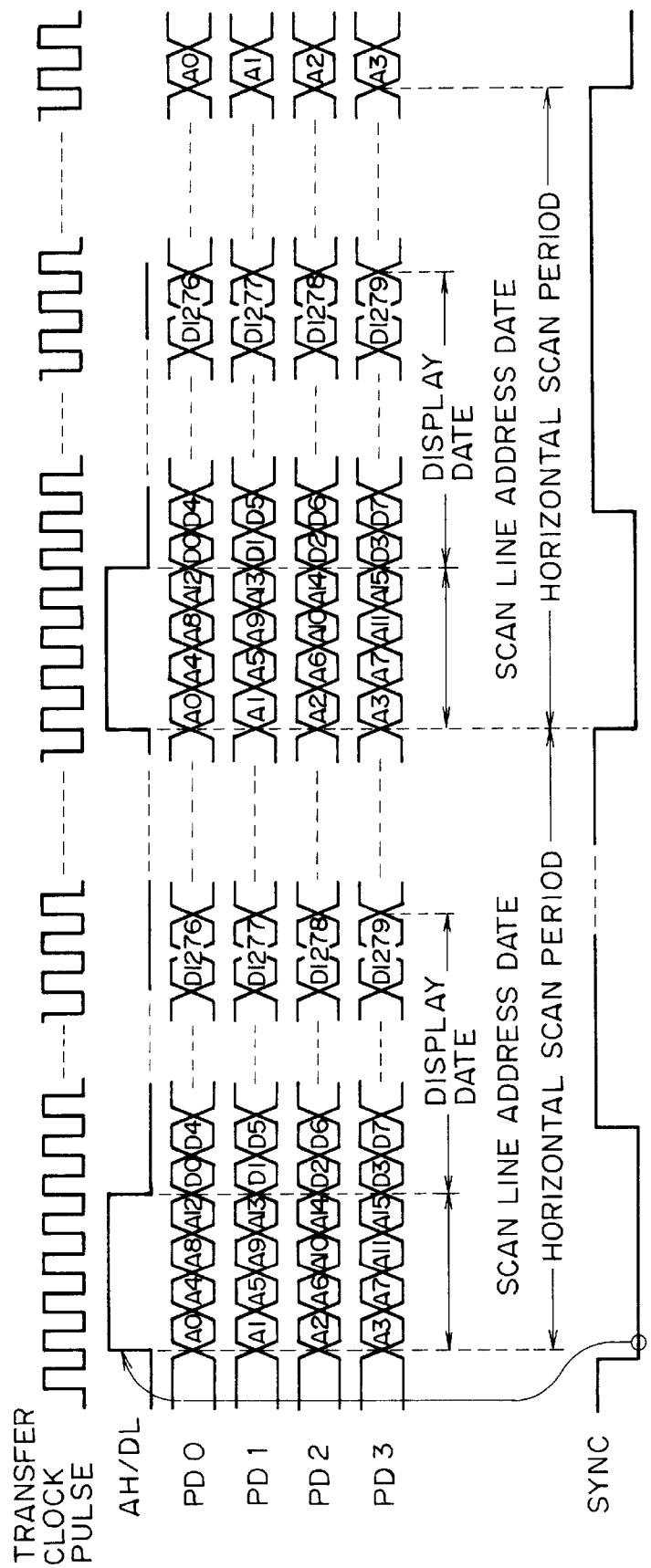
FIG. 3 is a time chart of image data communication showing time correlation between signal transfer and driving with respect to a liquid crystal display apparatus and a graphic controller.

Based on an arrangement appearing hereinbelow and data format comprising image data accompanied with scanning line address data and by adopting communication synchronization using a SYNC signal as shown in FIGS. 2 and 3, these is provided a liquid crystal display apparatus of the present invention which uses the liquid crystal device according to the present invention as a display panel portion.

Referring to FIG. 2, a liquid crystal display apparatus 101 includes a graphic controller 102, a display panel 103, a scanning line drive circuit 104, a data line drive circuit 105, a decoder 106, a scanning signal generator 107, a shift resistor 108, a line memory 109, a data signal generator 110, a drive control circuit 111, a graphic central processing unit (GCPU) 112, a host central processing unit (host CPU) 113, and an image data storage memory (VRAM) 114.

Image data are generated in the graphic controller 102 in an apparatus body and transferred to a display panel 103 by signal transfer means. The graphic controller 102 principally comprises a CPU (central processing unit, hereinafter referred to as "GCPU") 112 and a VRAM (video-RAM, image data storage memory) 114 and is in charge of management and communication of image data between a host CPU 113 and the liquid crystal display apparatus (FLCD) 101. The control of the display apparatus is principally performed by the graphic controller 102. A light source (not shown) is disposed at the back of the display panel 103.

Hereinbelow, the present invention will be explained more specifically with reference to examples. It is however to be understood that the present invention is not restricted to these examples.

In the following examples, liquid crystal devices (cells) used were prepared as follows.

Each of liquid crystal compositions was prepared by mixing the following compounds (having the indicated structural formulae and phase transition temperatures (°C.))) and compounds appearing hereinafter in the proportions indicated hereinafter.

Compound (a)

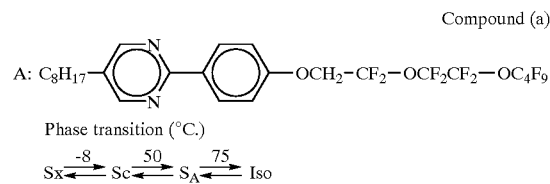

Phase transition (°C.)

$Sx \xrightleftharpoons{-8} Sc \xrightleftharpoons{50} S_A \xrightleftharpoons{75} Iso$ -continued B$_1$: C$_8$H$_{17}$—[pyridine ring]—[benzene ring]—OCH$_2$–C$_7$F$_{15}$ Phase transition (°C.)

$$Sx \xrightarrow{71} Sc \xrightarrow{80} S_A \xrightarrow{117} Iso$$

B$_2$: C$_9$H$_{19}$—[pyridine ring]—[benzene ring]—OCH$_2$C$_7$F$_{15}$

Phase transition (°C.)

$$Sx \xrightarrow{71} Sc \xrightarrow{85} S_A \xrightarrow{112} Iso$$

B$_3$: C$_{10}$H$_{21}$—[pyridine ring]—[benzene ring]—OCH$_2$C$_7$F$_{15}$

Phase transition (°C.)

$$Sx \xrightarrow{75} Sc \xrightarrow{87} S_A \xrightarrow{104} Iso$$

Compound (b)

C (chiral dopant):

C$_{10}$H$_{21}$—[pyridine ring]—[benzene ring]—(CH$_2$)$_2$—*[lactone ring]*—C$_6$H$_{13}$ In the above phase transition series, Sx denotes a smectic phase (unidentified); Sc denotes a smectic C phase; S$_A$ denotes a smectic A phase; and Iso denotes an isotropic phase.

Each of the thus prepared liquid crystal compositions was disposed between a bank cell to provide a liquid crystal cell (device) whereby various characteristics including a spontaneous polarization at 25° C. (Ps), a contrast ratio and a layer inclination angle (degrees) were evaluated.

The blank cell was prepared as follows.

To one glass plate provided with an ITO film, a solution of a polyimide precursor (providing a polyimide having a recurring unit of the formula (VIII') shown below) in a mixture solvent (n-methylpyrrolidone (NMP)/n-butylcarbitol (nBC)=2/1) was applied by spin coating. The thus coated glass plate was subjected to hot curing treatment and a rubbing treatment.

Formula (VIII')

[chemical structure of polyimide repeating unit]

To another glass plate provided with an ITO film, a solution of a silane coupling agent comprising octadecyltriethoxysilane was applied by spin coating, followed by hot curing.

After silica beads as a spacer were dispersed on one of the above-treated two glass plates, the two glass plates were applied to each other to form a blank cell having a cell gap of 1.8 pm.

The respective characteristics were evaluated or measured as follows.

Layer Inclination Angle δ

The layer inclination angle δ was measured according to a method described in Jpn. J. Appl. Phys. 27, p. L725 (1988).

Contrast Ratio

Figure 4:
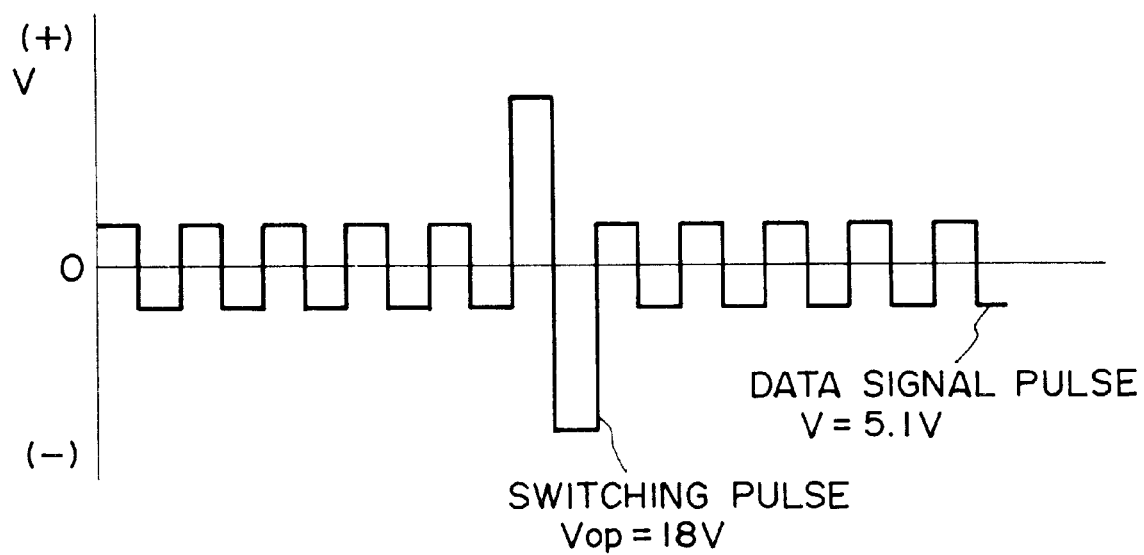
FIG. 4 is a view showing a switching signal used in driving conditions adopted in Examples appearing hereinafter.

The contrast ratio was measured by fixing a stage providing the darkest optical axis by means of a photomultiplier under observation through a polarizing microscope and under application of a switching signal shown in FIG. 4, thereby to find an output value for a dark (black) state and an output value for a bright (white) state. The contrast ratio was determined by dividing the output value for the white state by the output value for the black state.

EXAMPLE 1

Two liquid crystal compositions (1) and (2) were prepared by mixing the following compounds in the indicated proportions, respectively.

| (composition) | (components) | (mixing ratio by weight) |
|---|---|---|
| (1) | A/B$_1$/B$_2$/B$_3$/C | 80/3/3/4/5 |
| (2) | A/B$_1$/B$_2$/B$_3$/C | 50/15/10/15/5 |

Both of the two liquid crystal compositions showed a high homogeneity or uniformity due to an excellent mutual solubility between the respective components.

Two liquid crystal devices were prepared and evaluated in the above-described manner by using the liquid crystal compositions (1) and (2), respectively.

The results are shown in Table 3 below.

TABLE 3

| Composition | Contrast | Ps (nC/cm$^2$) | Inclination angle (deg.) |
|---|---|---|---|
| (1) | 120 | 26 | 0 (at 20° C.) |
| (2) | 65 | 28 | — |

EXAMPLE 2

Eight liquid crystal compositions (3)–(8) were prepared and evaluated in the same manner as in Example 1 except that the compound (b), i.e., the chiral dopant C was changed to the following compounds (b) of Ex. Comp. Nos. IV-7, V-16, III-42 and IV-205, respectively.

All the liquid crystal compositions (3)–(8) showed a high homogeneity based on an excellent mutual solubility between the respective components.

The results are shown in Table 4 below.

TABLE 4

| Comp. No. | Ex. Comp. for compound (b) | Corresponding composition | Contrast | Ps (nC/cm) |
|---|---|---|---|---|
| (3) | VI-7 | (1) | 119 | 22 |
| (4) | VI-7 | (2) | 67 | 28 |
| (5) | V-16 | (1) | 122 | 24 |
| (6) | V-16 | (2) | 70 | 27 |
| (7) | III-42 | (1) | 99 | 21 |
| (8) | III-42 | (2) | 55 | 22 |
| (9) | IV-205 | (1) | 88 | 20 |
| (10) | IV-205 | (2) | 50 | 25 |

EXAMPLE 3

Seven liquid crystal compositions (11)–(17) were prepared and evaluated in the same manner as in Example 1 except that the chiral dopant C used as an optically active compound (b) was changed to any one of the following chiral dopants, α, β, γ and ν, respectively.

<Chiral Dopant>

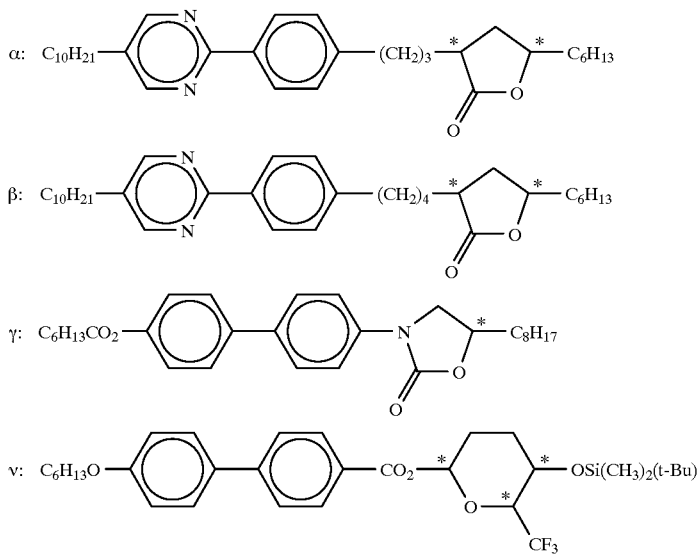

In any of the liquid crystal compositions, the components of the respective composition were sufficiently compatible with or mutually soluble to each other to provide a high homogeneity (uniformity) system.

The results are shown in Table 5 below.

TABLE 5

| Comp. No. | Chiral dopant | Corresponding composition | Contrast | Ps (nC/cm$^2$) |
|---|---|---|---|---|
| (11) | α | (1) | 107 | 22 |
| (12) | α | (2) | 65 | 27 |
| (13) | β | (1) | 88 | 20 |
| (14) | γ | (1) | 98 | 20 |
| (15) | γ | (2) | 60 | 27 |
| (16) | ν | (1) | 120 | 24 |
| (17) | ν | (2) | 65 | 29 |

EXAMPLE 4

Liquid crystal compositions (18)–(34) each were prepared in the same manner as in Example 1 except that the polyimide alignment film used in Example 1 was changed to a 6,6-nylon film (formed by applying a formic acid solution) and the liquid crystal compositions (1)–(17) used in Examples 1–3 were used, respectively.

Each of the liquid crystal compositions (18)–(34) was injected into a blank cell to prepare a liquid crystal cell in the same manner as described above. When each of the thus prepared liquid crystal cell was subjected to observation of an alignment state, all of the liquid crystal cells showed a uniform and good alignment state over the entire cell. Further, all of the liquid crystal compositions (18)–(34) showed a uniform system due to a high mutual solubility between the respective components.

Comparative Example 1

Two comparative liquid crystal compositions (1)' and (2)' were prepared and evaluated in the same manner as in Example 1 except that the chiral dopant (c) for the compound (b) was changed to the following optically active compound.

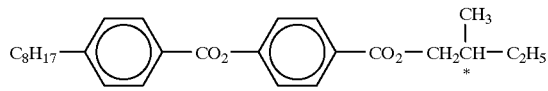

Both of the resultant liquid crystal cells using the comparative liquid crystal compositions (1)' and (2)' showed a contrast ratio of 6.2.

Comparative Example 2

In order to prepare a (chiral smectic) liquid crystal composition, the following optically active compound below was used instead of the chiral dopant C and was mixed with compounds A, $B_1$, $B_2$ and $B_3$ in the same proportions and manner as in Example 1.

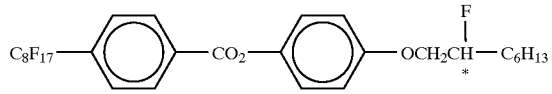

However, the above optically active compound was not mutually soluble in other components, thus failing to provide a homogeneous or uniform system.

Comparative Example 3

A comparative liquid crystal composition was prepared by mixing the following compounds (having no fluorocarbon terminal portion) including the chiral dopant C used in Example 1 in the indicated proportions.

| Structural formula | wt. parts |
|---|---|
| $C_6H_{13}$—Py2—Ph—$OC_{12}H_{25}$ | 4.2 |
| $C_8H_{17}$—Py2—Ph—$OC_9H_{19}$ | 8.4 |
| $C_8H_{17}$—Py2—Ph—$OC_{10}H_{21}$ | 8.4 |
| $C_9H_{19}$—Py2—Ph—$OC_8H_{17}$ | 4.2 |
| $C_{10}H_{21}O$—Ph—COO—Ph—$OCH_2CH(CH_3)C_2H_5$ | 27.5 |
| $C_6H_{13}$—Btb2—Ph—$OC_8H_{17}$ | 21.1 |

-continued

| Structural formula | wt. parts |
|---|---|
| $C_5H_{11}$—Ph—Td—Ph—$C_5H_{11}$ | 5.3 |
| $C_6H_{13}$—Ph—Td—Ph—$C_4H_9$ | 5.3 |
| $C_{11}H_{23}$—Py2—Ph—$OC_O$—Tn—$C_4H_9$ | 5.3 |
| $C_{11}H_{23}$—Py2—Ph3F—OCO—Tn—$C_4H_9$ | 5.3 |
| Chiral dopant C | 5.0 |

In the above formulae, the abbreviations (Py2, Ph, etc.) are identical to those for the compound (b) of the formula (III).

The resultant liquid crystal device provided a spontaneous polarization of 11 ($nC/cm^2$).

EXAMPLE 5

Liquid crystal compositions were prepared in the same manner as in Example 1 except that the polyimide alignment film was changed to a polyimide film having a recurring unit (P1) below or a recurring unit (P2) below and the liquid crystal compositions (1)–(10) used in Examples 1 and 2 were used.

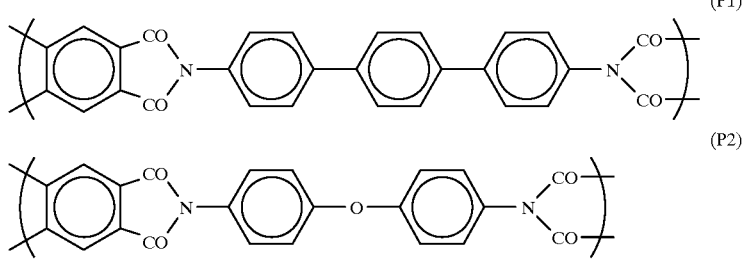

All of the resultant liquid crystal cells (devices) using the polyimide film having the recurring unit (P1) or (P2) showed a very good alignment state over the entire cell.

As described above, according to the invention, there is provided a liquid crystal composition, particularly a chiral smectic liquid crystal composition, showing a high mutual solubility between components thereof, providing a liquid crystal molecular layer having a bookshelf structure or a structure closer thereto having a small layer inclination angle, and exhibiting a good alignment state of the liquid crystal layer. As a result, a (chiral smectic or ferroelectric) liquid crystal device using the liquid crystal composition according to the present invention provides various improved properties such as a high responsiveness (due to a large spontaneous polarization), a high contrast ratio, a high definition, a high brightness and a large picture area.

In addition, when the liquid crystal device is used as a display device in combination with a light source, drive circuit, etc., a liquid crystal apparatus, such as a liquid crystal display apparatus, providing good display characteristics can be realized.

What is claimed is:

1. A liquid crystal composition, comprising:

(I) at least one fluorine-containing mesomorphic compound (a) having smectic phase or having latent smectic phase, wherein the compound (a) is represented by the following formula (I):

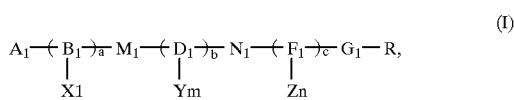

in which $B_1$, $D_1$ and $F_1$ independently denote

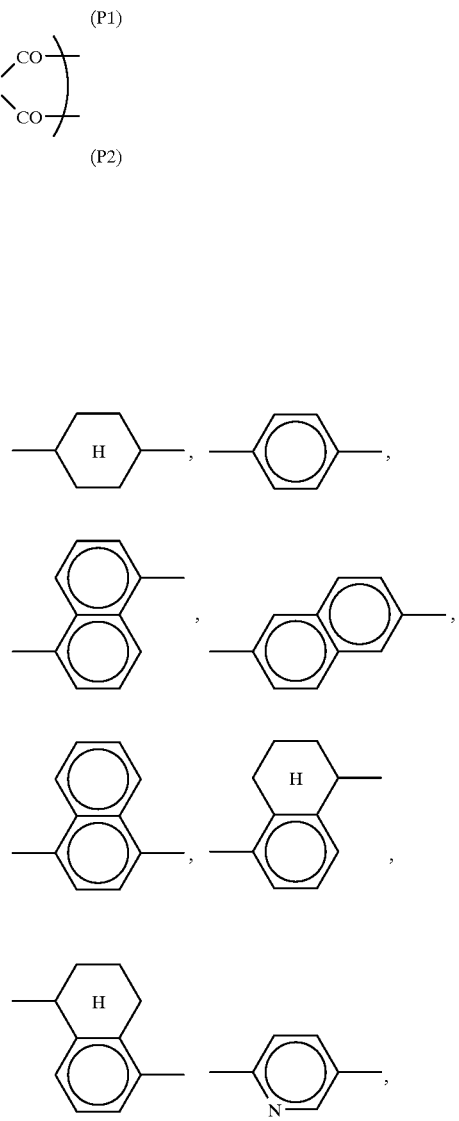

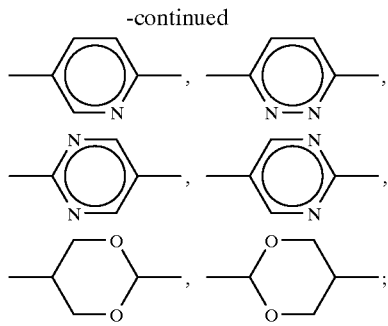

a, b and c independently denote an integer of 0–3 with the proviso that a+b+c is at least 2;

$M_1$ and $N_1$ independently denote —COO—, —OCO—, —COS—, —SCO—, —COSe—, —SeCO—, —COTe—, —TeCO—, —CH$_2$CH$_2$—, —CH=CH—, —C≡C—, —CH=N—, —N=CH—, —CH$_2$O—, —OCH$_2$—, —CO—, —O— or a single bond;

X, Y and Z independently denote —H, —Cl, —F, —Br, —I, —OH, —OCH$_3$, —CN or —NO$_2$ and l, m and n independently denote an integer of 0–4;

$G_1$ is —COO—$C_eH_{2e}$—, —O—$C_eH_{2e}$—, —$C_eH_{2e}$—, —OSOO—, —OOSO—, —OOSO—SOO$C_eH_{2e}$—, —O$C_eH_{2e}$—O$C_{e'}H_{2e'}$—, —$C_eH_{2e}$—N($C_pH_{2p+1}$)—SO$_2$—, —$C_eH_{2e}$—N($C_pH_{2p+1}$)—CO— wherein e and e' independently denote an integer of 1–20 and p is an integer of 0–4;

$A_1$ is a linear or branched group represented by —O—$C_fH_{2f}$—O—$C_gH_{2g+1}$, —$C_fH_{2f}$—O—$C_gH_{2g+1}$, —$C_fH_{2f}$—R', —O—$C_fH_{2f}$—R', —COO—$C_fH_{2f}$—R', —OCO—$C_fH_{2f}$—R' wherein R' is —Cl, —F, —CF$_3$, —NO$_2$, —CN, —H, —COO—$C_{f'}H_{2f'+1}$ or —OCO—$C_{f'}H_{2f'+1}$ in which f' is an integer of 1–20, and f and g independently denote an integer of 1–20; and R is —$C_xF_{2x+1}$ or —($C_{x'}F_{2x'}$O—)$_z$$C_yF_{2y+1}$ wherein x is an integer of 1–20, x' is independently an integer of 1–10 for each $C_{x'}F_{2x'}$O group, y is an integer of 1–10, and z is an integer of 1–6; and (II) at least one optically active compound (b), wherein the compound (b) is represented by the following formula (II):

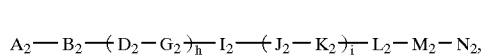
(II)

in which $D_2$, $I_2$ and $K_2$ independently denote a group having an aromatic ring, a group having a heteroaromatic ring, an alicyclic group, a group have a fused ring comprising these rings, or a group formed by connecting these rings, each of these rings being optionally substituted with an appropriate group;

$B_2$, $G_2$, $J_2$ and $L_2$ independently denote a single bond, —O—, —COO—, —OCO—, —C≡C—, —CONR$_2$—, —NR$_2$CO—, —NR$_2$—, —CH$_2$—, —CH=N—, —N=CH—, —CH=CH—, —COS—, —SCO—, —(CH$_2$)$_{n3}$—, —CH$_2$O— or —OCH$_2$— wherein $R_2$ is an alkyl group having 1–5 carbon atoms and n3 is an integer of 1–20;

$A_2$ and $N_2$ independently denote hydrogen or linear or branched alkyl group capable of including at least one —CH$_2$— group which can be replaced by —$Y_1$—, —$Y_1$CO—, —CO$Y_1$—, —CO—, —OCOO—, —CH=CH— or —C≡C— wherein $Y_1$ is O or S;

h and i are independently 0, 1 or 2; and $M_2$ is a divalent group having 3 to 7 membered ring comprising carbon atom, oxygen atom or nitrogen atom each of which has sp hybrid orbital, Sp$^2$ hybrid orbital or Sp$^3$ hybrid orbital and can be substituted with hydrogen or other elements, the ring having at least one asymmetric carbon atom.

2. A composition according to claim 1, wherein the fluorocarbon terminal portion of the compound (a) is —D$C_xF_{2x+1}$ or —D($C_{x'}F_{2x'+1}$O)$_z$$C_yF_{2y+1}$ in which x is 1–20;

x' is independently 1–10 for each $C_{x'}F_{2x'+1}$O group;

y is 1–10;

z is 1–10; and

D is a single bond, —COO—$C_rH_{2r}$—, —OC$_rH_{2r}$—, —OC$_rH_{2r}$O—$C_{r'}H_{2r'}$—, —OSO$_2$—, —SO$_2$—, —SO$_2$—$C_rH_{2r}$—, —$C_rH_{2r}$—N($C_pH_{2p+1}$)—SO$_2$—, or —$C_rH_{2r}$—N($C_pH_{2p+1}$)—CO— wherein r and r' are independently 1–20, and p is 0–4.

3. A composition according to claim 1, wherein R in the formula (I) is —($C_{x'}F_{2x'}$O—)$_z$$C_yF_{2y+1}$ in which x', y and z have the same meanings as defined in claim 1.

4. A composition according to claim 1, wherein the compound (a) of the formula (I) is a fluorine-containing mesomorphic compound represented by the following formula (I'):

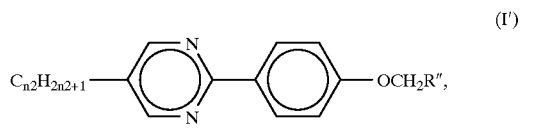
(I')

in which n2 is an integer of 5–10; and

R'' is —$C_xF_{2x+1}$ or —($C_{x''}F_{2x''}$O—)$_{z'}$$C_{y'}F_{2y'+1}$ wherein x is an integer of 1–20, x'' is independently an integer of 1–3 for each $C_{x''}F_{2x''}$O group, y' is an integer of 1–4, and z' is an integer of 1–3.

5. A composition according to claim 1, wherein the compound (b) of the formula (II) is an optically active compound represented by the following formula (III):

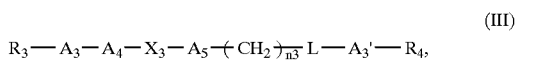
(III)

in which $R_3$ is hydrogen, —CN, or a linear or branched alkyl group having 1–20 carbon atoms, and $R_4$ is a linear or branched alkyl group having 1–18 carbon atoms, each alkyl groups of $R_3$ and $R_4$ being capable of including at least one —CH$_2$— group which can be replaced by —O—, —S—, —CO—, —CH(CN)—, —CH=CH—, —C≡C—, —COO— or —OCO— with the proviso that heteroatoms are not connected with each other;

$A_5$ is 1,4-phenylene capable of having one or two substituents comprising F, Cl, Br, CH$_3$, CF$_3$ or CN; pyridine-2,5-diyl; pyrimidine-2,5-diyl; pyrazine-2,5-diyl; pyridazine-3,6-diyl; 1,4-cyclohexylene; 1,3-dioxane-2,5-diyl; 1,3-dithiane-2,5-diyl; thiophene-2,5-diyl, thiazole-2,5-diyl; thiadizaole-2,5-diyl; benzoxazole-2,5-diyl; benzoxazole-2,6-diyl;

benzothiazole-2,5-diyl; benzothiazole-2,6-diyl; benzofuran-2,5-diyl; benzofuran-2,6-diyl; quinoxaline-2,6-diyl; quinoline-2,6-diyl; 2,6-naphthylene; indan-2,5-diyl; 2-alkylindan-2,5-diyl having a linear or branched alkyl group having 1–18 carbon atoms; indanone-2,6-diyl; 2-alkylindanone-2,6-diyl having a linear or branched alkyl group having 1–18 carbon atoms; coumaran-2,5-diyl; or 2-alkylcourmaran-2,5-diyl having a linear or branched alkyl group having 1–18 carbon atoms;

$A_3$, $A_3'$ and $A_4$ independently denote a single bond or a group selected from those for $A_5$ independently of $A_5$;

$X_3$ is a single bond, —COO—, —OCO—, —CH$_2$O—, —OCH$_2$—, —CH$_2$CH$_2$—, —CH=CH— or —C≡C—;

n3 is an integer of 1–20; and

L is optically active butanolide-2,4-diyl; optically active 4-alkylbutanolide-2,4-diyl having a linear or branched alkyl group having 1–5 carbon atoms; or optically active 2-alkylbutanolide-2,4-diyl having a linear or branched alkyl group having 1–5 carbon atoms.

6. A composition according to claim 5, wherein the optically active compound of the formula (III) satisfies any one of the following conditions (IIIa), (IIIb) and (IIIc):

(IIIa) $A_3$ and $A_4$ are independently selected from the group consisting of a single bond;

1,4-phenylene capable of having one or two substituents comprising F, Cl, Br, CH$_3$, CF$_3$ and/or CN; pyridine-2,5-diyl; pyrimidine-2,5-diyl; pyrazine-2,5-diyl; pyridazine-3,6-diyl; 1,4-cyclohexylene; thiophene-2,5-diyl, thiazole-2,5-diyl; thiadiazole-2,5-diyl; benzoxazole-2,6-diyl; benzothiazole-2,5-diyl; benzothiazole-2,6-diyl; benzofuran-2,5-diyl; benzofuran-2,6-diyl; quinoxaline-2,6-diyl; quinoline-2,6-diyl; 2,6-naphthylene; indan-2,5-diyl; and coumaran-2,5-diyl; and $A_5$ is 1,4-phenylene capable of having one or two substituents comprising F, Cl, Br, CH$_3$, CF$_3$ and/or CN;

(IIIb) $X_3$ is A single bond;

$A_4$ is pyridine-2,5-diyl; pyrimidine-2,5-diyl; 1,4-cyclohexylene; thiophene-2,5-diyl; thiazole-2,5-diyl; thiadiazole-2,5-diyl; benzothiazole-2,6-diyl; quinoxaline-2,6-diyl; quinoline-2,6-diyl; 2,6-naphthylene; or indan-2,5-diyl; and $A_3$ is 1,4-phenylene capable of having one or two substituents comprising F, Cl, Br, CH$_3$, CF$_3$ and/or CN; and (IIIc) $A_3$ and $X_3$ are a single bond;

$A_4$ is pyrimidine-2,5-diyl or indan-2,5-diyl; and $A_5$ is 1,4-phenylene.

7. A composition according to claim 1, wherein the compound (b) of the formula (II) is an optically active compound represented by the following formula (IV);

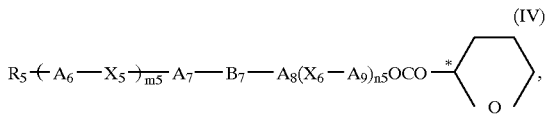

(IV)

in which $R_5$ is a linear or branched alkyl group having 1–18 carbon atoms;

$A_6$ and $A_9$ independently denote 1,4-phenylene capable of having one or two substituents comprising F, Cl, Br, CH$_3$, CF$_3$ and/or CN; 1,4-cyclohexylene; pyrimidine-2,5-diyl; pyridine-2,5-diyl; thiadiazole-2,5-diyl; thiazole-2,5-diyl; thiophene-2,5-diyl; or 2,6-naphthylene;

$A_7$ and $A_8$ independently denote a single bond or any one of the groups for $A_6$ and $A_9$;

$B_7$ is benzoxazole-2,6-diyl, benzothiazole-2,5-diyl or benzothiazole-2,6-diyl;

$X_5$ and $X_6$ independently denote a single bond, —COO—, —OCO—, —CH$_2$O— or —OCH$_2$—;

m5 and n5 are independently 0 or 1; and

* denotes an optically active center.

8. A composition according to claim 1, wherein the compound (b) of the formula (II) is an optically active compound represented by the following formula (IV');

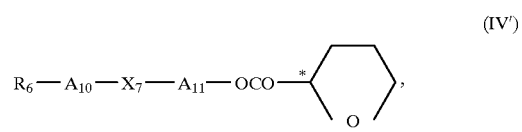

(IV')

in which $R_6$ is a linear or branched alkyl group having 1–18 carbon atoms;

$A_{11}$ is 1,4-phenylene capable of having one or two substituents comprising F, Cl, Br, CH$_3$, CF$_3$ and/or CN; 1,4-cyclohexylene; pyrimidine-2,5-diyl; pyridine-2,5-diyl; thiadiazole-2,5-diyl; benzothiazole-2,6-diyl; thiophene-2,5-diyl; or 2,6-naphthylene;

$A_{10}$ is a single bond or any one of the groups for $A_{11}$;

$X_7$ is a single bond, —COO—, —OCO—, —CH$_2$O— or —OCH$_2$—; and

* denotes an optically active center.

9. A composition according to claim 1, wherein the compound (b) of the formula (II) is an optically active compound represented by the following formula (V):

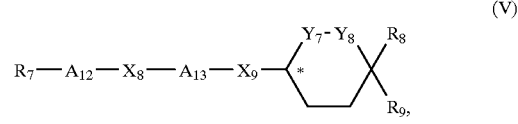

(V)

in which $R_7$, $R_8$ and $R_9$ independently denote hydrogen, or a linear or branched alkyl group having 1–18 carbon atoms;

$A_{12}$ and $A_{13}$ independently denote 1,4-phenylene capable of having one or two substituents comprising F, Cl, Br, CH$_3$, CF$_3$ and/or CN; 1,4-cycloyhexylene; pyrimidine-2,5-diyl; pyridine-2,5-diyl; thiadiazole-2,5-diyl; thiazole-2,5-diyl; thiophene-2,5-diyl; or 2,6-naphthylene;

$X_8$ and $X_9$ independently denote a single bond, —COO—, —OCO—, —CH$_2$O— or —OCH$_2$—;

* denotes an optically active center; and either one of $Y_7$ and $Y_8$ is —CO— and the other is —O—.

10. A composition according to claim 1, wherein the compound (b) of the formula (II) is an optically active compound represented by the following formula (VI);

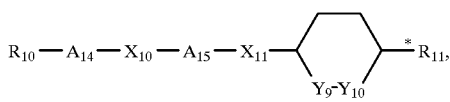

(VI)

in which

R$_{10}$ is hydrogen or linear or branched alkyl group having 1–18 carbon atom capable of including at least one —CH$_2$— group which can be replaced by —Y$_2$—, —Y$_2$CO—, —COY$_2$—, —CO—, —OCOO—, —CH=CH— or —C≡C— wherein Y$_2$ is O or S;

R$_{11}$ is hydrogen, a linear or branched alkyl group having 1–18 carbon atoms or a trialkylsilyl group independently having a linear or branched alkyl group having 1–10 carbon atoms, alkyl group of R$_{11}$ being capable of including at least one —CH$_2$— group which can be replaced by —Y$_3$—, —Y$_3$CO—, —COY$_3$—, —CO—, —OCOO—, —CH=CH— or —C≡C— wherein Y$_3$ is O or S;

A$_{14}$ and A$_{15}$ independently denote 1,4-phenylene capable of having one or two substituents comprising F, Cl, Br, CH$_3$, CF$_3$ and/or CN; 1,4-cyclohexylene; pyrimidine-2,5-diyl; pyridine-2,5-diyl; thiadiazole-2,5-diyl; thiazole-2,5-diyl; thiophene-2,5-diyl; or 2,6-naphthylene;

X$_{10}$ and X$_{11}$ independently denote a single bond, —COO—, —OCO—, —CH$_2$O— or —OCH$_2$—; either one of Y$_9$ and Y$_{10}$ is

and the other is —O—; and

* denotes an optically active center.

11. A composition according to claim 1, the compound (b) of the formula (II) is an optically active compound represented by the following formula (VII):

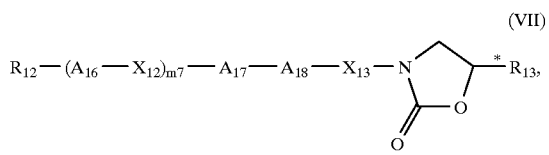

(VII)

in which

R$_{12}$ and R$_{13}$ independently denote hydrogen, or a linear or branched alkyl group having 1–18 carbon atoms capable of including at least one —CH$_2$— group which can be replaced by —Y$_4$—, —Y$_4$CO—, —COY$_4$—, —CO—, —OCOO—, —CH=CH— or —C≡C— wherein Y$_4$ is O or S;

A$_{16}$, A$_{17}$ and A$_{18}$ independently denote a single bond; 1,4-phenylene capable of having one or two substituents comprising F, Cl, Br, CH$_3$, CF$_3$ and/or CN; pyridine-2,5-diyl; pyrimidine-2,5-diyl; pyrazine-2,5-diyl; pyridazine-3,6-diyl; 1,4-cyclohexylene; 1,3-dioxane-2,5-diyl; 1,3-dithiane-2,5-diyl; thiophene-2,5-diyl, thiazole-2,5-diyl; thiadiazole-2,5-diyl; benzoxazole-2,6-diyl; benzothiazole-2,5-diyl; benzothiazole-2,6-diyl; benzofuran-2,5-diyl; benzofuran-2,6-diyl; quinoxaline-2,6-diyl; quinoline-2,6-diyl; 2,6-naphthylene; indan-2,5-diyl; 2-alkylindan-2,5-diyl having a linear or branched alkyl group having 1–18 carbon atom; indanone-2,6-diyl; 2-alkylindanone-2,6-diyl having a linear or branched alkyl group having 1–18 carbon atoms; coumaran-2,5-diyl; or 2-alkylcoumaran-2,5-diyl having a linear or branched alkyl group having 1–18 carbon atoms;

X$_{12}$ is a single bond, —O—, —COO—, —OCO—,

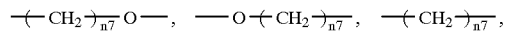

—C≡C—, —CONR$_{14}$—, —NR$_{14}$CO—, —NR$_{14}$—, —CH=N—, —N=CH—, —CH=CH—, —COS— or —SCO— wherein R$_{14}$ is an alkyl group having 1–5 carbon atoms, and n7 is an integer of 1–10;

X$_{13}$ is a single bond or an alkylene group having 1–6 carbon atoms;

m7 is 0, 1 or 2; and

* denotes an optically active center.

12. A composition according to claim 1, which comprises at least 20 wt. % of a fluorine-containing mesomorphic compound (a).

13. A composition according to claim 1, which comprises at least 30 wt. % of a fluorine-containing mesomorphic compound (a).

14. A composition according to claim 1, which comprises at least 50 wt. % of a fluorine-containing mesomorphic compound (a).

15. A composition according to claim 1, which has a chiral smectic phase.

16. A liquid crystal device, comprising a liquid crystal composition according to claim 1.

17. A device according to claim 16, comprising a pair of opposite electrode plates and the liquid crystal composition disposed between the electrode plates.

18. A device according to claim 17, which further comprises an alignment control layer.

19. A device according to claim 18, wherein the alignment control layer comprises a polyimide film which has been subjected to uniaxial alignment treatment, said polyimide having a recurring unit represented by the following formula (VIII):

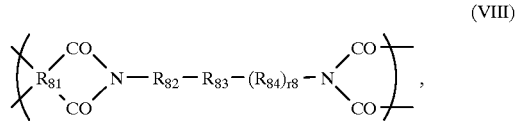

(VIII)

in which

R$_{81}$ is

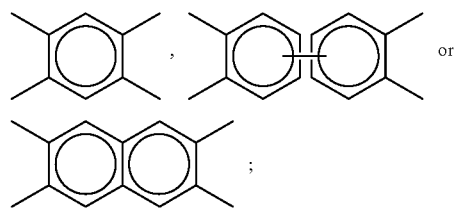

$R_{82}$ and $R_{84}$ independently denote

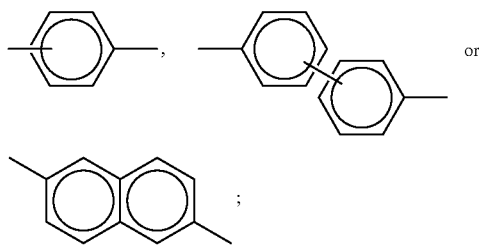

$R_{83}$ is a single bond or —O—; and r8 is 0, 1 or 2.

20. A device according to claim 18, wherein the alignment control layer comprises a polyamide film which has been subjected to uniaxial alignment treatment, said polyamide having a recurring unit represented by the following formula (IX):

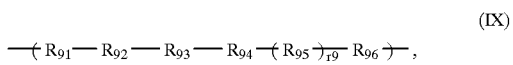

in which $R_{91}$ is an alkylene group having 1–20 carbon atoms,

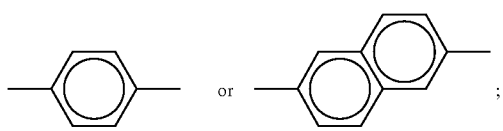

$R_{92}$ and $R_{96}$ are independently —CONH— or —NHCO—;

$R_{93}$ and $R_{95}$ are independently

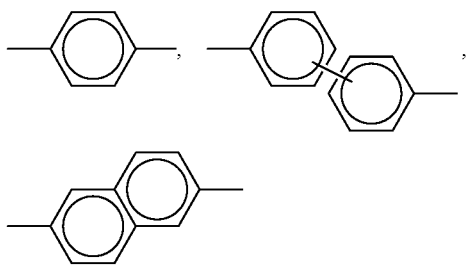

or an alkylene group having 1–20 carbon atoms:

$R_{94}$ is a single bond or —O—; and r9 is 0, 1 or 2.

21. A device according to claim 18, wherein each of the pair of electrode plates is provided with an alignment control layer, at least one of which comprises a polyimide film.

22. A liquid crystal apparatus comprising a liquid crystal device according to claim 16 and drive means for said liquid crystal device.

23. An apparatus according to claim 22, wherein the liquid crystal device is a display device.

24. A display method, comprising:

providing a liquid crystal composition according to claim 1; and controlling the alignment direction of liquid crystal molecules in accordance with image data to effect display.

* * * * *

UNITED STATES PATENT AND TRADEMARK OFFICE
CERTIFICATE OF CORRECTION

PATENT NO.   : 5,948,317
DATED        : September 7, 1999
INVENTOR(S)  : Koichi Sato et al.

It is certified that error appears in the above-identified patent and that said Letters Patent is hereby corrected as shown below:

Title page,
Item [56], References Cited, FOREIGN PATENT DOCUMENTS,
"2091065" should read -- 2-091065 --;
"3151371" should read -- 3-151371 --;
"4364176" should read -- 4-364176 --;
"5230051" should read -- 5-230051 --;
"5310725" should read -- 5-310725 --; and
"6145158" should read -- 6-145158 --.

Column 1,
Line 24, "outputs" should read -- outputting --;
Line 37, "as a" should read -- as -- and "device" should read -- devices --; and
Line 52, "uses" should read -- use --.

Column 2,
Line 37, "(Editor))" should read -- (Editor) --; and
Line 40, "(Japan)." should read -- (Japan)). --; and "methods" should read -- the methods --.

Column 3,
Line 5, "other" should read -- many --;
Line 6, "many" should read -- other --;
Line 9, "there have" should read -- it has --; and
Line 14, "exhibit" should read -- which exhibits --.

Column 4,
Line 55, "has not" should read -- does not have --.

Column 5,
Line 42, "in which" should read -- in which ¶ $B_1$, $D_1$ and $F_1$ independently denote

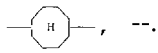, --.

Column 6,
Line 42, "1-20; and" should read -- 1-20; and ¶ R is $-C_xF_{2x+1}$ or ¶ --;
Line 58, "provide" should read -- provides --; and
Line 64, "descried" should read -- described --.

Column 7,
I-10, "$CF_8CH_2O-$" should read -- $CF_3CH_2O—$ --.

UNITED STATES PATENT AND TRADEMARK OFFICE
CERTIFICATE OF CORRECTION

PATENT NO.     : 5,948,317
DATED          : September 7, 1999
INVENTOR(S)    : Koichi Sato et al.

It is certified that error appears in the above-identified patent and that said Letters Patent is hereby corrected as shown below:

Column 13,
I-47, "—$C_7H_{16}$" should read -- —$C_7H_{15}$ --.

Column 21,
I-83, "—$OCH_2C_7F_{16}$" should read -- —$OCH_2C_7F_{15}$ --.

Column 23,
Line 57, "As a result, a" should read -- A --.

Column 25,
Line 19, "pyrazine-2, 5diyl;" should read -- pyrazine-2, 5-diyl; --; and
Line 28, "atoms" should read -- atoms; --.

Column 28,
Table 1, "15 $C_5H_{11}O$" should read -- 15 $C_6H_{11}O$ --.

Column 29,
Table 1, No. 29, "$C_7H_{16}$" should read -- $C_7H_{15}$ --;
Table 1, No. 49, "$C_5H_{11}$" should read -- $C_6H_{11}$ --; and
Table 1, No. 82, "$C_5H_{11}$" should read -- $C_6H_{11}$ --.

Column 34,
Table 1, No. 190, "$C_6H_{13}$" should read -- $C_6H_{11}$ --.

Column 38,
Table 1, No. 326, "$C_6H_{13}$" should read -- $C_6H_{18}$ --;
Table 1, No. 334, "$C_6H_{13}$" should read -- $C_6H_{18}$ --; and
Table 1, No. 370, "Ph" (2nd occurrence, $A_5$) should read -- Pd --.

Column 39,
Line 42, "is A" should read -- is a --;

Column 59,
IV-177,  should read .

Column 61,
IV-187,  should read .

UNITED STATES PATENT AND TRADEMARK OFFICE
CERTIFICATE OF CORRECTION

PATENT NO. : 5,948,317
DATED : September 7, 1999
INVENTOR(S) : Koichi Sato et al.

It is certified that error appears in the above-identified patent and that said Letters Patent is hereby corrected as shown below:

Column 65,
Line 53, "of t he" should read -- of the --.

Column 67,
Line 11, "atom" should read -- atoms --.

Column 69,
Line 7, "atom;" should read -- atoms; --.

Column 81,
Line 56, "5 pm" should read -- 5 $\mu$m --; and
Line 57, "comprise" should read -- comprises --.

Column 82,
Line 22, "an nitride" should read -- a nitride --.

Column 85,
Line 44, "such a" should read -- such as a --;
Line 45, "in case" should read -- in a case --;
Line 51, "uses a" should read -- uses --; and
Line 63, "these is" should read -- there is --.

Column 86,
Line 55, "(°C.)))" should read -- (°C.)) --.

Column 89,
Line 54, "cell" should read -- cells --.

Column 91,
Line 6, "OC$_{O-Tn-C4H9}$" should read -- OCO—Tn—C$_4$H$_9$ --.

Column 93,
Line 53, "have" should read -- having --.

Column 94,
Line 4, "ring" should read -- rings --;
Line 6, "Sp$^2$" should read -- sp$^2$ --;
Line 7, "Sp$^3$" should read -- sp$^3$ --;
Line 55, "groups" should read -- group --; and
Line 65, "thiadizaole" should read -- thiadiazole --.

UNITED STATES PATENT AND TRADEMARK OFFICE
CERTIFICATE OF CORRECTION

PATENT NO.   : 5,948,317
DATED        : September 7, 1999
INVENTOR(S)  : Koichi Sato et al.

It is certified that error appears in the above-identified patent and that said Letters Patent is hereby corrected as shown below:

Column 95,
Line 40, "A single" should read -- a single --.

Column 97,
Line 10, "atom" should read -- atoms --; and
Line 38, "1, the" should read -- 1, wherein the --.

Signed and Sealed this

Fifth Day of August, 2003

JAMES E. ROGAN
*Director of the United States Patent and Trademark Office*